United States Patent
Rieger

(10) Patent No.: US 10,352,498 B2
(45) Date of Patent: Jul. 16, 2019

(54) TOOL FOR MULTI-POSITIONING AND HOLDING A DEVICE

(71) Applicant: Derek Rieger, Denver, CO (US)

(72) Inventor: Derek Rieger, Denver, CO (US)

(73) Assignee: Elephino, LLC, Denver, CO (US)

( * ) Notice: Subject to any disclaimer, the term of this patent is extended or adjusted under 35 U.S.C. 154(b) by 19 days.

(21) Appl. No.: 15/211,951

(22) Filed: Jul. 15, 2016

(65) Prior Publication Data

US 2017/0013950 A1    Jan. 19, 2017

Related U.S. Application Data

(60) Provisional application No. 62/193,298, filed on Jul. 16, 2015, provisional application No. 62/249,548, filed on Nov. 2, 2015, provisional application No. 62/253,101, filed on Nov. 9, 2015.

(51) Int. Cl.
| | | |
|---|---|---|
| *F16M 13/00* | (2006.01) | |
| *H04B 1/3888* | (2015.01) | |
| *H04M 1/04* | (2006.01) | |
| *A45F 5/00* | (2006.01) | |

(52) U.S. Cl.
CPC .......... *F16M 13/00* (2013.01); *H04B 1/3888* (2013.01); *H04M 1/04* (2013.01); *A45F 2005/008* (2013.01); *A45F 2200/0516* (2013.01)

(58) Field of Classification Search
CPC ....... F16M 13/00; H04B 1/3888; H04M 1/04; A45F 2005/008; A45F 2200/0516
USPC ....................................................... 224/222
See application file for complete search history.

(56) References Cited

U.S. PATENT DOCUMENTS

| | | |
|---|---|---|
| 4,530,580 A | 7/1985 | Ueda et al. |
| 8,662,362 B1 | 3/2014 | Bastian et al. |
| 2012/0080462 A1 | 4/2012 | Hajarian |
| 2013/0240578 A1 | 9/2013 | Yu |

OTHER PUBLICATIONS

International Search Report and Written Opinion, PCT/US16/42619, dated Sep. 30, 2016, 12 pages.
Assassin's Creed Hidden Blade Gauntlet Replica (internet advertisement), Jul. 2, 2012, 2 pages.
A collective thread for all them guns, internet article, May 3, 2009, 6 pages.
Card holdout cheating device (internet news article), Jan. 14, 2011, 4 pages.
Wolverine's claws, Jul. 16, 2003 (internet article concerning Xmen movie) 1 page.

*Primary Examiner* — Peter N Helvey
(74) *Attorney, Agent, or Firm* — The Juhasz Law Firm

(57) ABSTRACT

A tool for multi-positioning and holding a device without requiring a user's hands. In one embodiment, a tool, such as a robotic arm, is secured to a user's forearm, such as with a pair of hook-and-loop fasteners attached to the robotic arm that wrap around the arm and then are fastened to each other. The tool has many points of articulation and many degrees of freedom. The tool may include a telescoping or expandable section joined at its distal end with a device support member. The device support member may grasp a mobile device, a smart phone, a camera or other electronic or mechanical device. The device support member may be coupled to the expandable section or an extension member by one or more attitude mechanisms making it possible for a user to flip and orient the device by body motion into many positions or attitudes, as the user desires.

24 Claims, 78 Drawing Sheets

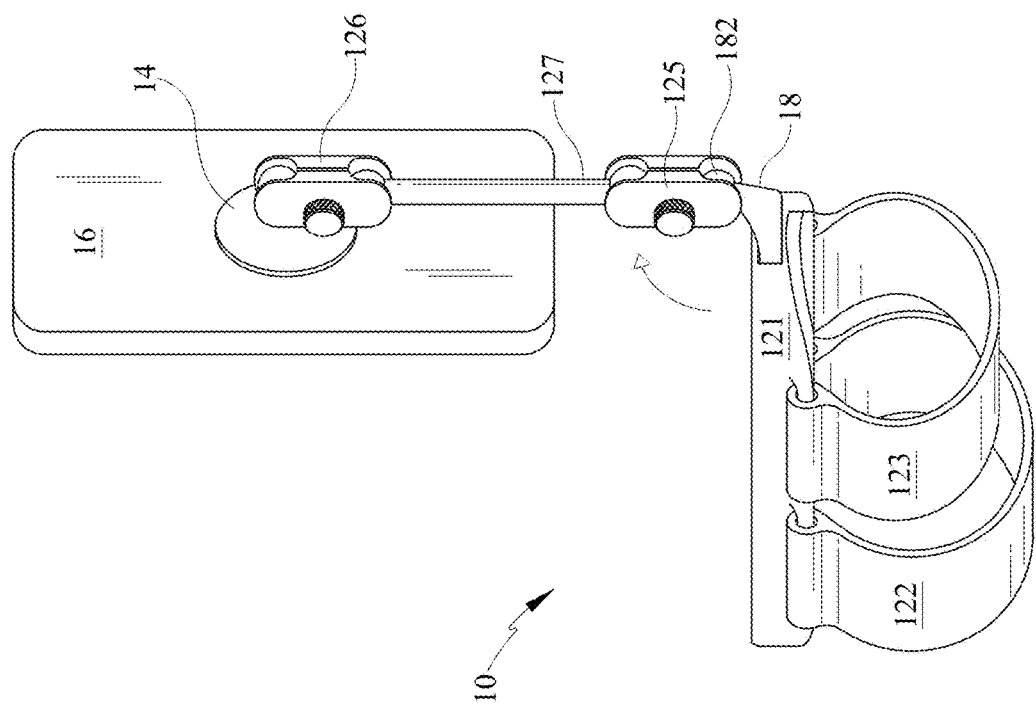

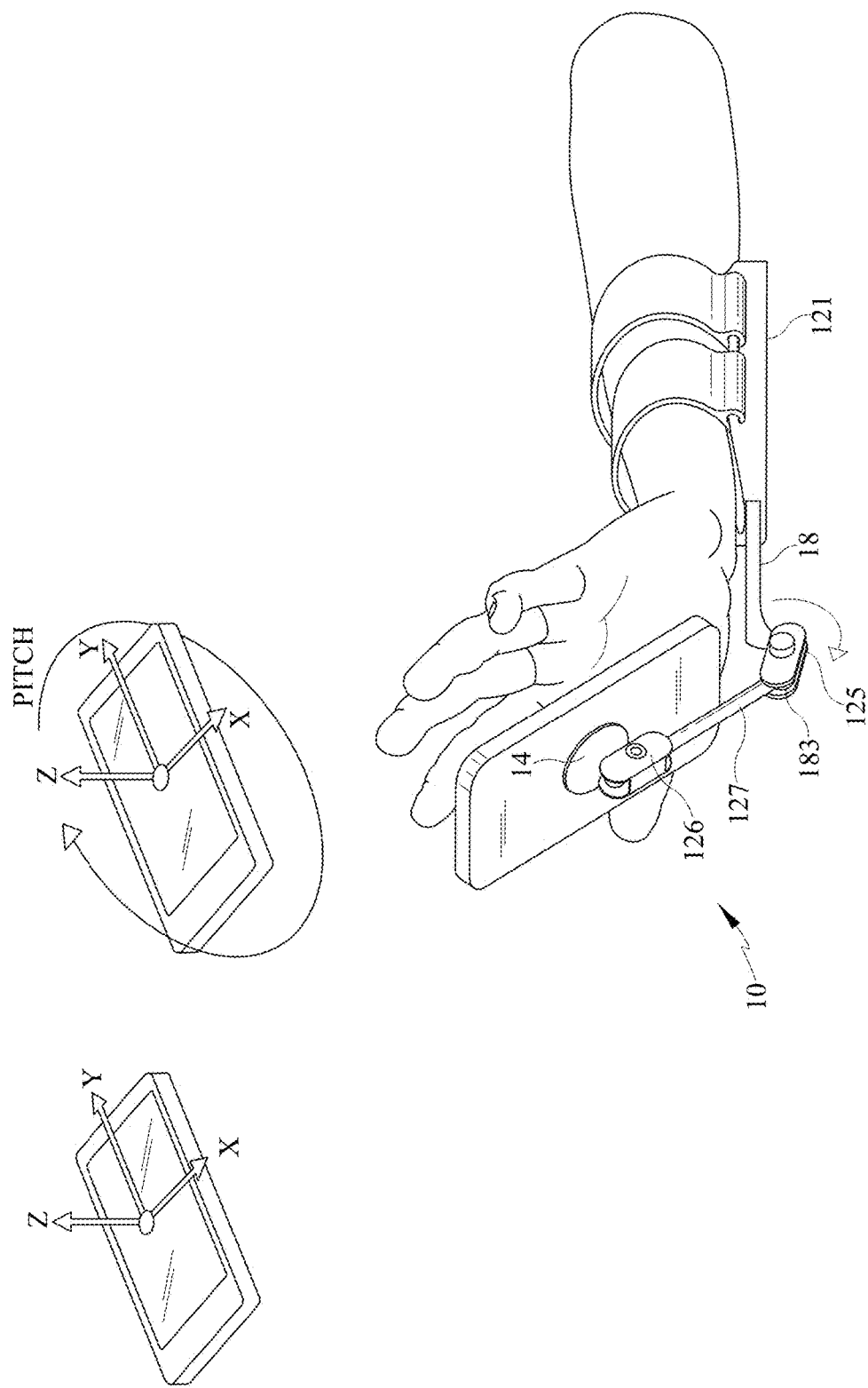

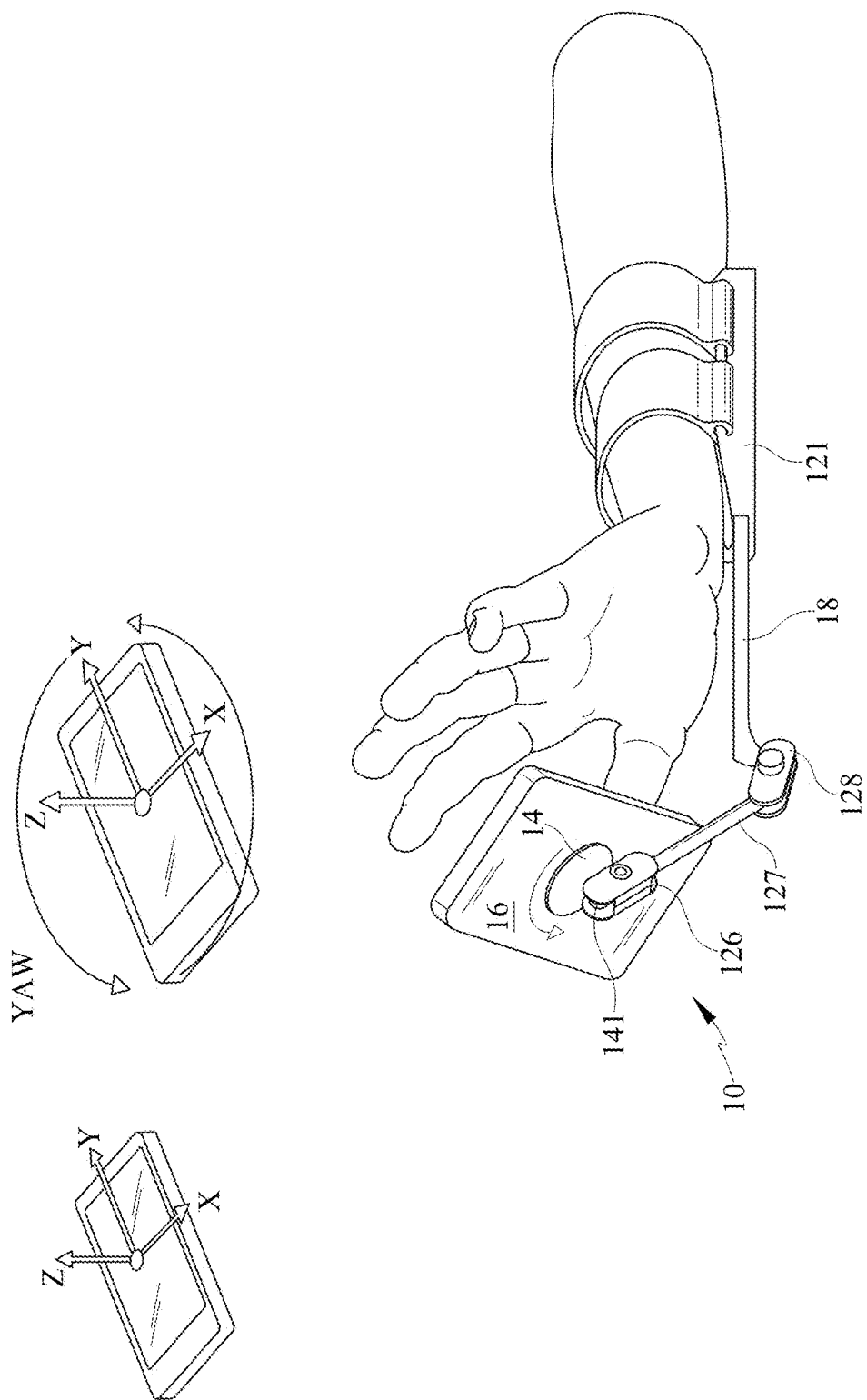

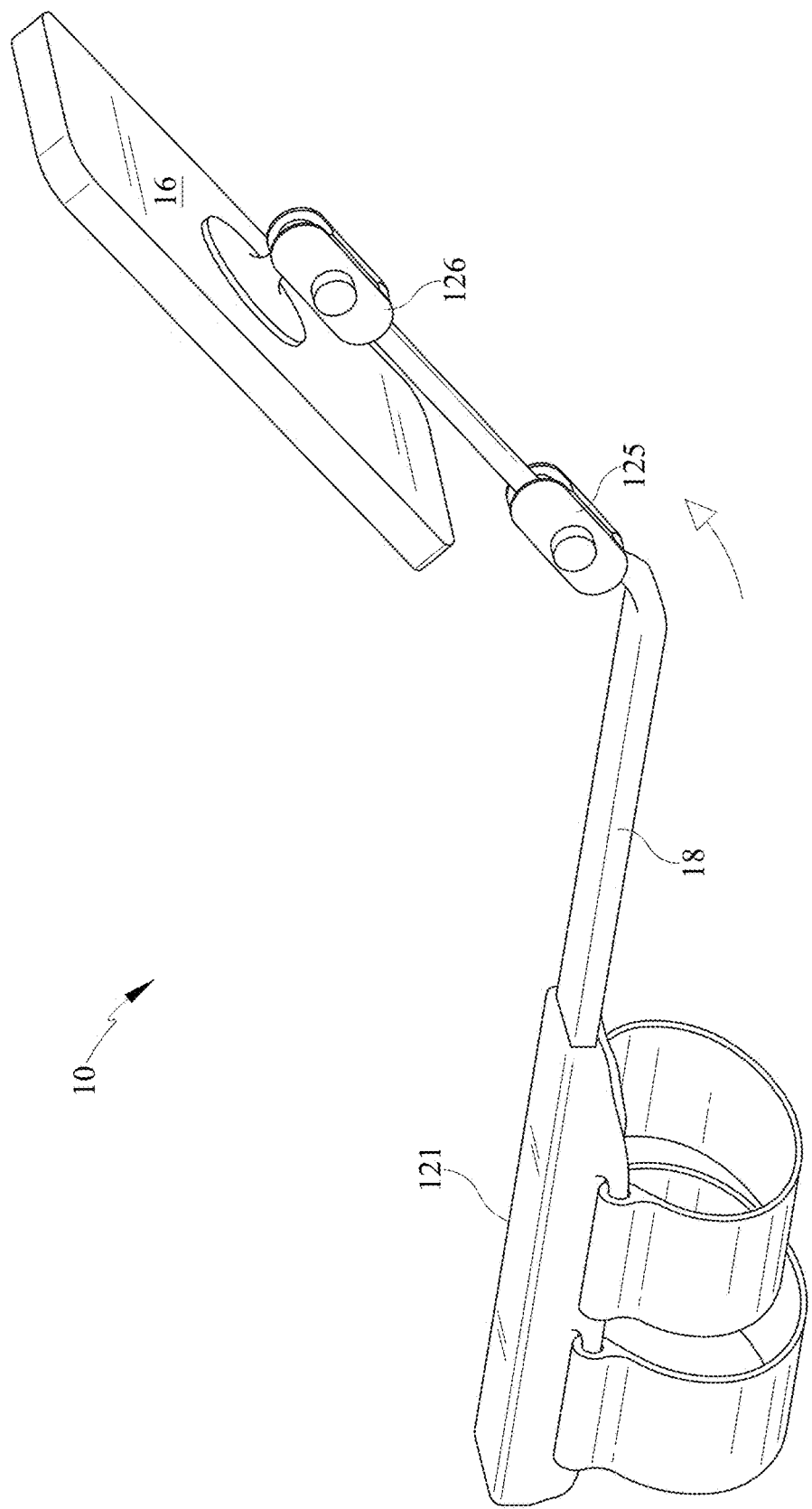

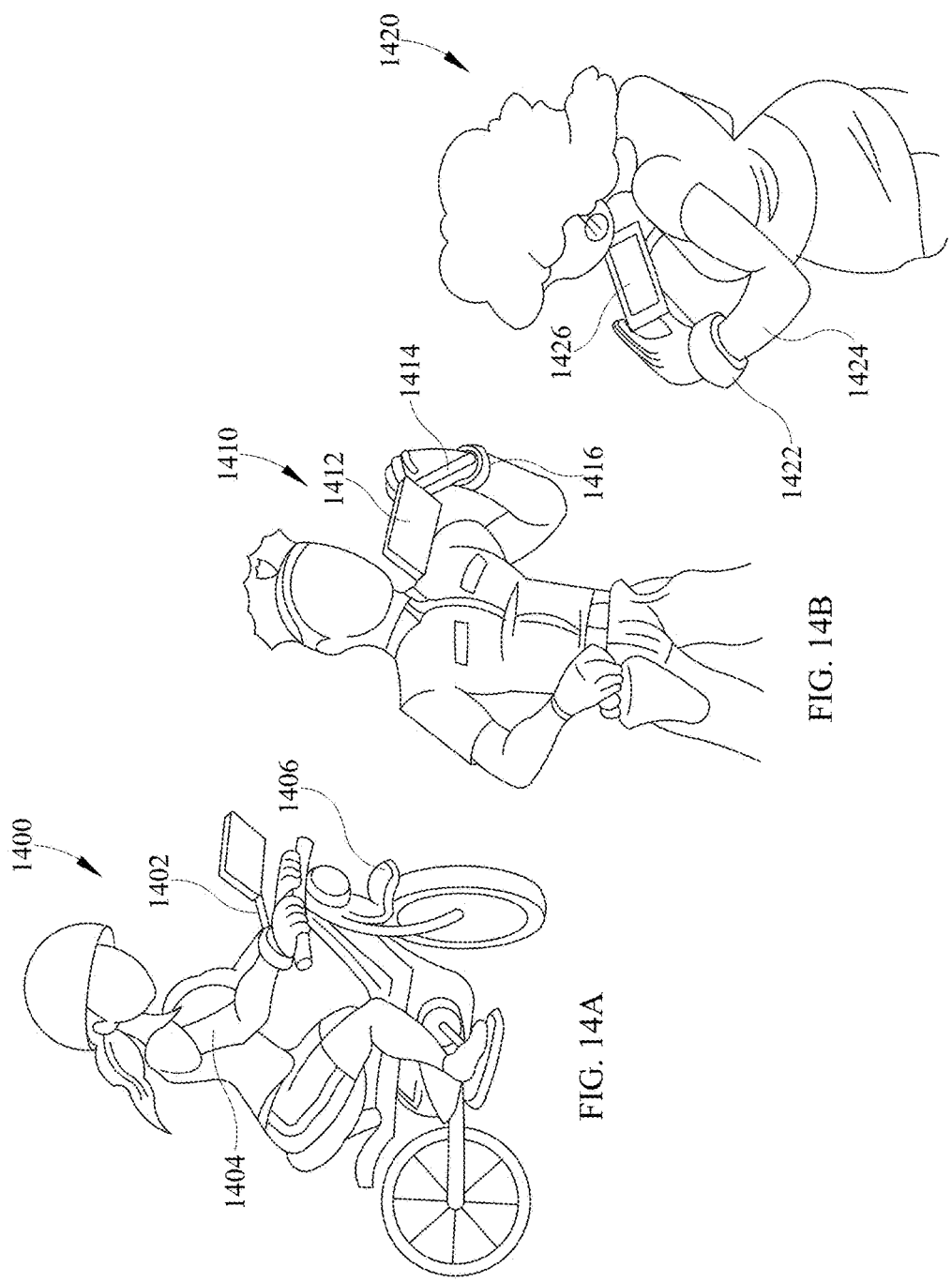

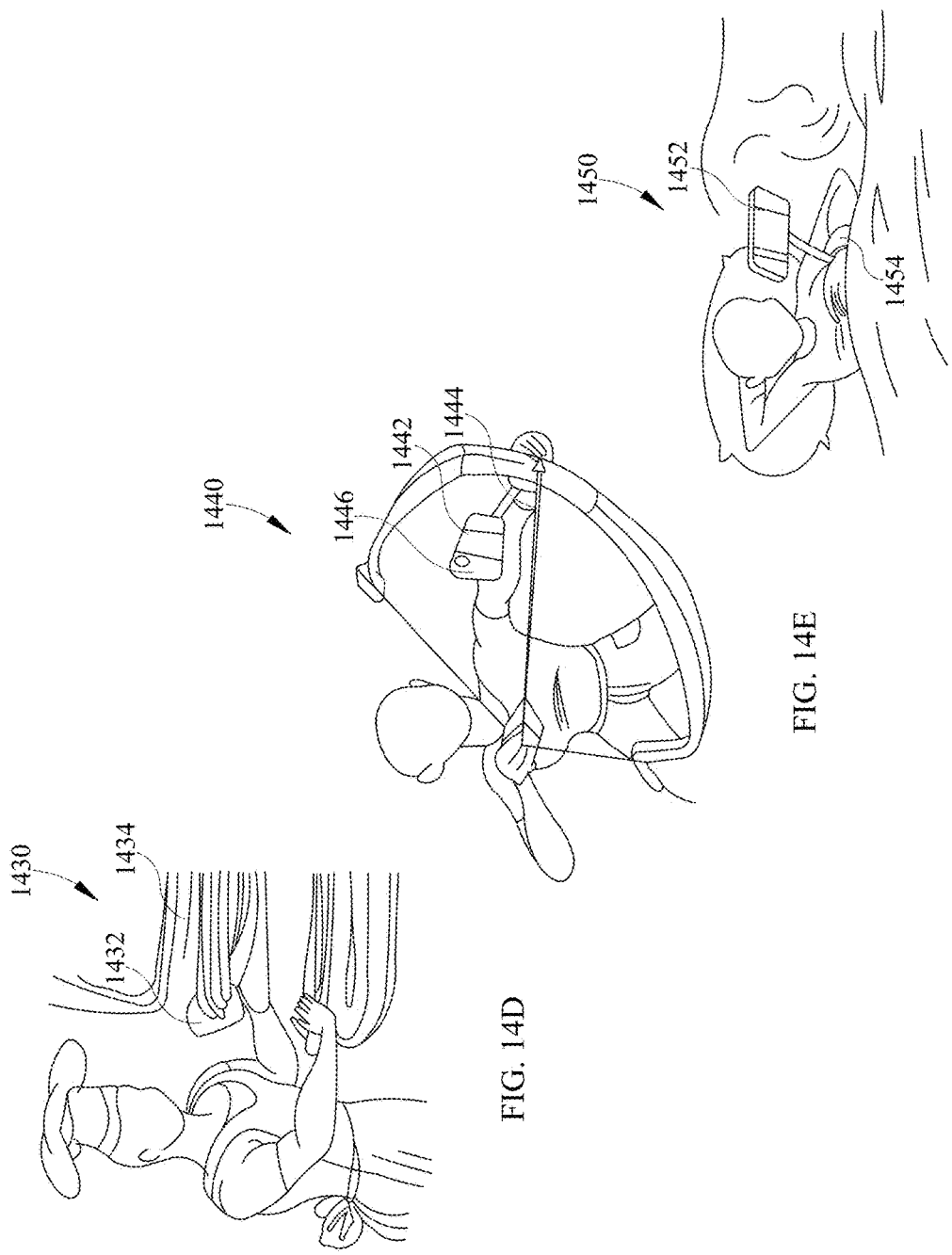

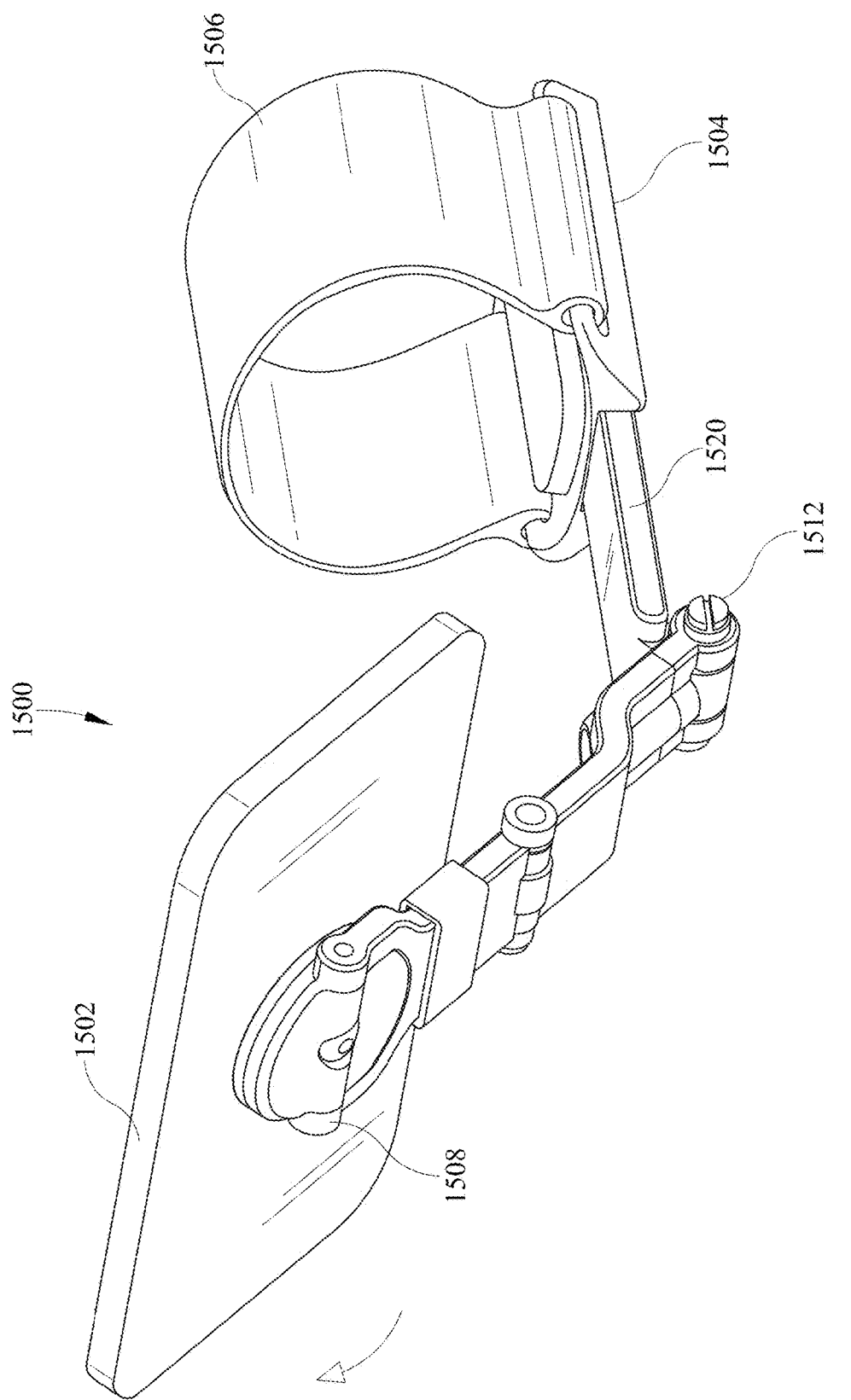

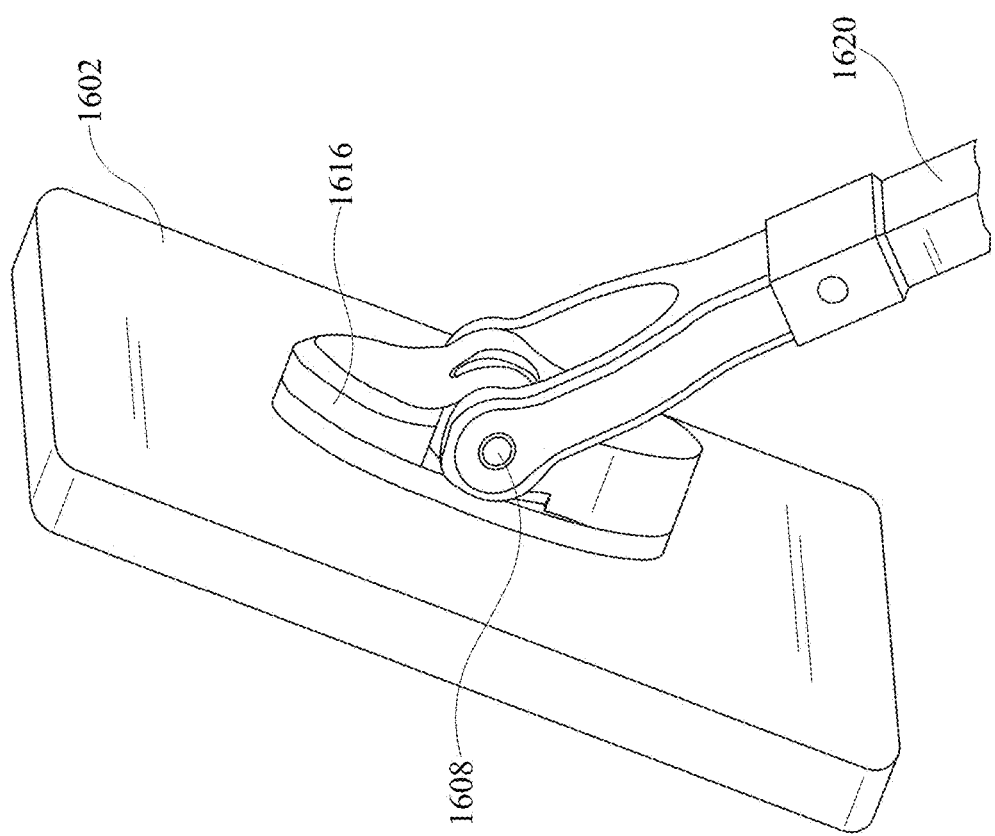

TOOL FOR MULTI-POSITIONING AND HOLDING A DEVICE

RELATED APPLICATIONS

This application claims the benefit of the following provisional applications, which are hereby incorporated by reference in their entirety: U.S. Prov. Appl. 62/193,298, filed Jul. 16, 2015; U.S. Prov. Appl. 62/249,548, filed Nov. 2, 2015; and U.S. Prov. Appl. 62/253,101, filed Nov. 9, 2015.

BACKGROUND

Holding and operating a user device often requires hand manipulation of the device by the user, leaving the user with few options for other uses of his or her hands. Examples of devices requiring hand manipulation include a mobile phone, a smart phone, a personal digital assistant (PDA), an MP3 player, and gaming devices such as an Assassin's Creed™ hidden blade. Other devices that require use of hands while operating a device include a card trick device, a selfie (photograph) stick, the retracting claws of Wolverine in X-Men® and a Derringer pistol holster.

There are numerous devices for mounting a user device to an object such as vehicles, desks, walls, and so on. Such mounting tools are limited in freedom of movement of the device with respect to the user. What is needed is a way to grasp and operate a user device with reduced hand manipulation.

SUMMARY

Disclosed is a tool for multi-positioning and holding a device without requiring a user's hands. In one embodiment, a tool, such as a robotic arm, is attached to a user's forearm, such as with a pair of hook-and-loop fasteners attached to the robotic arm that wrap around the arm and then are fastened to each other. The tool has many points of articulation and many degrees of freedom. The tool may include a telescoping or expandable section joined at its distal end with a device support member. The device support member may grasp a mobile device, a smart phone, a camera or other electronic or mechanical device. The device support member may be coupled to the expandable section or an extension member by one or more attitude mechanisms that make it possible for a user to flip and orient the device support member in many different positions or attitudes, as the user desires. These attitudes may include a yaw, pitch and roll attitude of the device. The coupling mechanism may also include a flip portion for a user to flip or twist the device support member 180 degrees, e.g., to change the mobile device from a closed position to an open position. The user is able to orient the device to a desired position using movements of the user's body, arm and hands, without touching the device support member or the mobile device supported by the device support member.

One embodiment of the disclosure is a tool for multi-positioning and holding a mobile device of a user. In this embodiment, the tool includes a body support member configured for attachment to a body and a telescopic member movably attached to the body support member. The tool also includes a first pivoting mechanism attached to the telescopic member and a mobile device support member, including a support element configured for supporting the mobile device of the user, the mobile device support member configured for movable attachment to the first pivoting mechanism, wherein a motion by the user is effective to adjust an attitude of the mobile device of the user with respect to the body support member, the attitude selected from the group consisting of a linear movement, a pitch, a roll and a yaw.

Another embodiment is a tool for multi-positioning and holding a mobile device. The tool includes a body support member configured for attachment to a body, a telescopic member movably attached to the body support member, a first means for pivoting attached to the telescopic member and a mobile device support member comprising a support element configured for supporting the mobile device of the user, the mobile device support member configured for movable attachment to the first means for pivoting, wherein a motion by the user is effective to adjust an attitude of the mobile device of the user with respect to the body support member, the attitude selected from the group consisting of a linear movement, a pitch, a roll and a yaw.

Another embodiment of the disclosure is a method for holding a mobile device. The method includes a step of providing a tool for multi-positioning and holding a mobile device of a user. In one embodiment, the tool includes a body support member configured for attachment to a body, a telescopic member movably attached to the body support member, a first pivoting mechanism attached to the telescopic member and a mobile device support member comprising a support element configured for supporting the mobile device of the user, the mobile device support member configured for movable attachment to the first pivoting mechanism, wherein a motion by the user is effective to adjust an attitude of the mobile device of the user with respect to the body support member, the attitude selected from the group consisting of a linear movement, a pitch, a roll and a yaw.

In another embodiment, a tool for multi-positioning and holding a mobile device of a user includes: a body support member configured for attachment to a body; a telescopic member movably attached to the body support member; a pivoting mechanism attached to the telescopic member; an extension member pivotably attached by a proximal end of the extension member to the pivoting mechanism, the extension member for supporting the mobile device of the user, wherein a motion by the user is effective to adjust an attitude of the mobile device of the user with respect to the body support member, the attitude selected from the group consisting of a linear movement, a pitch, a roll and a yaw. The tool may include a mobile device support member including a support element configured for supporting the mobile device of the user, the mobile device support member configured for movable attachment to the extension member. The tool pivoting mechanism may include a joint element including a double joint including a first joint for providing a flipping rotation of the joint element around a front end of the telescopic member and a second joint providing rotation of the mobile device support member about its linear axis.

The foregoing summary is illustrative only and is not intended to be in any way limiting. In addition to the illustrative aspects, embodiments, and features described above, further aspects, embodiments, and features will become apparent by reference to the drawings and the following detailed description. There are many embodiments of the disclosure, of which the present examples are only a few of the embodiments that are possible.

DESCRIPTION OF DRAWINGS

The drawings attached to this disclosure depict various embodiments of this disclosure.

FIG. 5B is a front perspective, partly unfolded view of the embodiment of FIG. 1;

FIG. 6D depicts user adjustment of pitch orientation with the embodiment of FIG. 1;

FIGS. 6I-J depict user adjustment with the embodiment of FIG. 1 for yaw adjustment or orientation of the electronic device;

FIG. 8C is a front perspective, now partly unfolded, fully extended view of the embodiment of FIG. 1, depicting a pitch adjustment to the orientation of the device with respect t to the user;

FIGS. 14A-14F are examples of users engaged in ordinary activities made possible by unobtrusive use of the robotic arm;

FIGS. 15A-15I depict another embodiment in several stages of use;

FIGS. 16A-16E depict yet another embodiment showing how the joints of an embodiment similar to FIG. 12 may be articulated;

DETAILED DESCRIPTION

Figure 1:
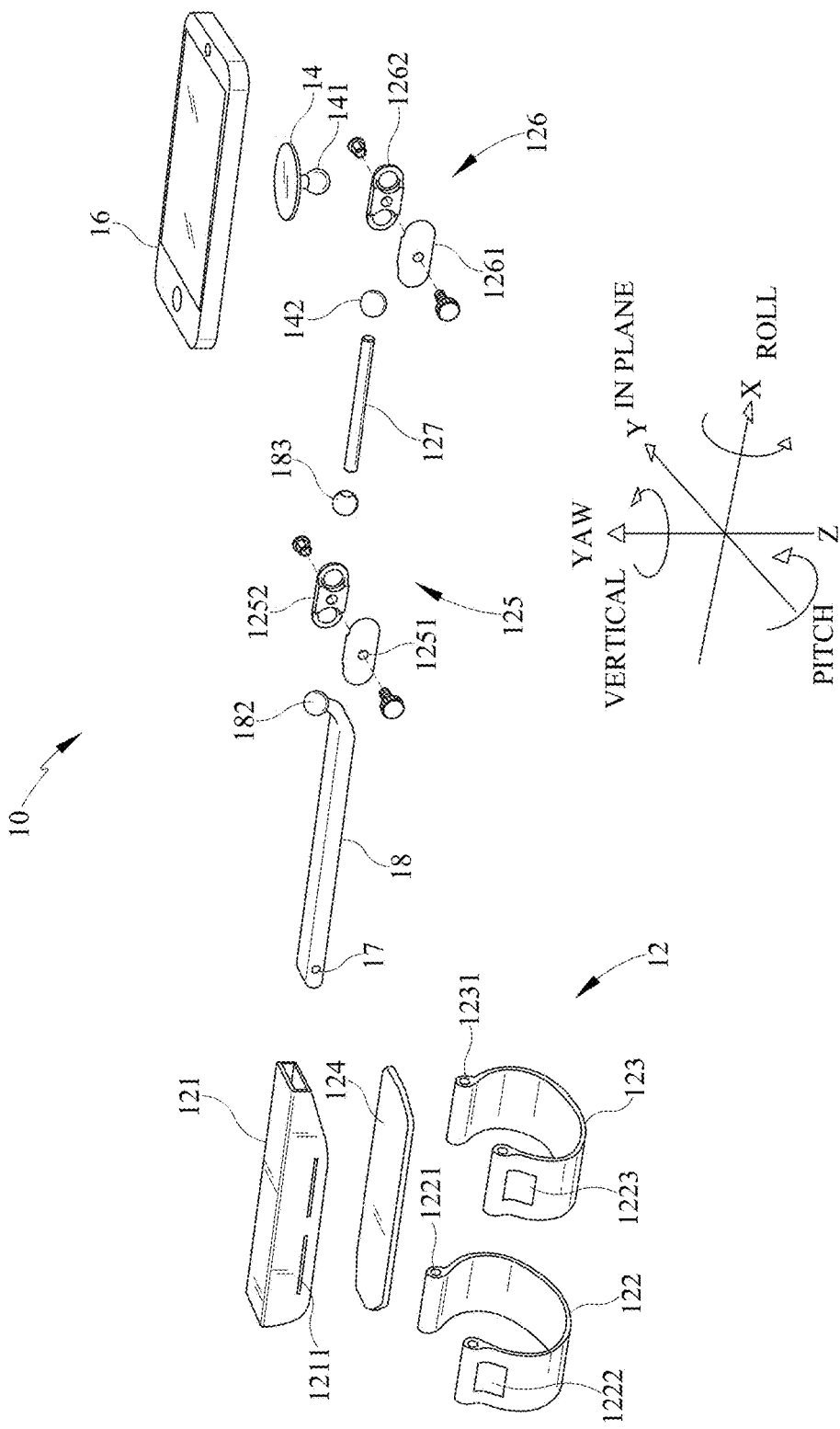
FIG. 1 is an exploded view of an exemplary robotic arm for grasping, extending and viewing an electronic device.

As depicted in the figures, such as FIG. 1, a tool is disclosed. The tool may be described as a robotic arm 10 for multi-positioning and holding a device, such as a mobile electronic device 16. Robotic arm 10 includes a body support member 12, a mobile electronic device support member 14 and a telescopic member 18. The body support member 12 is configured for attachment to a body, such as an arm. Body support member 12 includes an outer sleeve 121 and large and small body support bands 122, 123. On one end, the body support bands 122, 123 connect to one side of body support sleeve with loops 1221, 1231 of the bands, each of which is movably attached to the body support sleeve with a pin therethrough (not shown) in engagement with recesses in the body support sleeve (not shown). Another end of the body support bands 122, 123 thread through openings 1211 in body support member and fold back. Velcro hooks 1222, 1223 on an end portion of the body support bands affixes to Velcro loops located on each of the body support bands 122, 123 to allow the body support member to be firmly held to the arm of the user. Body support sleeve pad 124 may be used to cushion the arm of the user adjacent and lies in between the body support sleeve 121 and the arm of the user.

The telescopic member 18 includes a stop 17 for retaining the member within body support sleeve 121 and a main portion and a ball 182 pivotally associating one end of the telescoping member 18 to an extension member 127. Balls 182, 183 form a first double ball joint 125. The telescopic member 18 is thus pivotally connected to extension member 127 by first double ball joint 125. Extension member 127 is also connected on its first or proximal end by ball 183 to form the first double ball joint 125 and on the distal or second end of extension member 127 to a ball 142. Balls 142, 141 form a second double ball joint 126. At the distal end of extension member 127, second double ball joint 126 pivotally connects the extension member 127 to the electronic device support member 14. Electronic device support member 14 interfaces directly with mobile electronic device 16, also via second double ball joint 126.

Double ball joints 125, 126 are almost identical in this embodiment, but they may be different. Double ball joint 125 includes left and right housings 1251, 1252 to accommodate ball 182 on one side and ball 183 on the other side. The housings are assembled by fasteners as shown and as described infra. Double ball joint 126 includes left and right housings 1261, 1262 to accommodate ball 141 on one side and ball 142 on the opposite side. Housings 1261, 1262 are also assembled with fasteners which will be described below. In this embodiment, balls 141, 142, 182, 183 are highly polished polyethylene or polypropylene, or other suitable lightweight and cost-effective material. Balls 142, 183 may be joined to extension member 127 by threading the extension member and tapping the interior of balls 142, 183. In a similar manner, ball 141 may be tapped and threaded onto electronic device support member 14 and ball 182 may be tapped and threaded onto telescopic member 18. In other embodiments, more sophisticated housings for a double ball joints may be used. These may be used, for example, to lend an ability to more tightly control the ability of teach portion of the double ball joint to move with respect to the two balls of the double ball joint.

In use, and as will be seen below, a user attaches a mobile electronic device 18, such as a smart phone or a cell phone to the electronic device support member 14. The electronic device support member firmly grasps the electronic device. The electronic device support member may be a vacuum suction cup or may grasp the electronic device in any other convenient way. In this embodiment, the electronic device support member also includes ball 141 of double ball joint 126. The ball 141 and double ball joint 126 allow freedom of orientation of mobile electronic device 18 with respect to extension member 127. That is, one may rotate the mobile electronic device 18 in virtually any direction with respect to the arm or extension member 127. Balls 141, 142 are held tightly enough by the housing so that they are retained, but not so tightly held that they cannot rotate when acted on by a force applied to the mobile electronic device 16 and the arm 127. That is, as the wearer moves and flexes an arm or a wrist, or other body part, the mobile electronic device and the arm enjoy limited freedom of movement so that the user can orient the device as desired.

The same freedom of orientation is achieved by double ball joint 125 between the extension member 127 and the telescopic member 20. As noted above, double ball joint 125 includes left and right housings 1251, 1252, joined by fasteners to retain balls 182, 183. Balls 182, 183 are held tightly enough by the housing so that they are retained, but not so tightly held that they cannot rotate when acted on by a force applied to the telescopic member 18 and the extending member 127. The orientation of the components is now described, in which proximal is used to describe a component or item that is nearer to the wearer of the robotic arm, or capable of being nearer, while distal is used to described a component or item that is farther from the wearer, or capable of being farther. Double ball joint 125 is a first double ball joint, joining a distal end of telescopic member 20 to a proximal end of extension member 127. Double ball joint 126 is a second ball joint, joining a distal end of extension member 127 to the ball of device support member 14.

The movement allowed by the robotic arm to orient the mobile electronic device may be explained using three axes, as shown in FIG. 1. An x-axis, as shown, may be thought of as a direction in which a user is facing, e.g., forward, with movement possible in forward and backward directions. A y-axis may be considered at the user's left and right sides, and the z-axis the user's up and down. Movement or rotation in these directions may be thought of as roll, pitch and yaw. Roll is defined here as rotation about the longitudinal or x-axis. Pitch is defined here as rotation about the left-right or y-axis. Yaw is defined as rotation about the vertical or z-axis.

Using the robotic arm and the ball joints described in the embodiment above, the user may orient the mobile electronic device as desired using a variety of roll, pitch and yaw movements with the degrees of freedom allowed by the two double ball joints. Each ball joint includes two independent balls that allow rotation of the members to which they are attached, e.g., ball 141 and the mobile electronic device 16; ball 142 and extension member 127; ball 183 and the extension member; and ball 182 and the telescopic member 18. In addition, telescopic member 18 enjoys linear movement as it telescopes out of and back into body support sleeve 121. Telescopic member 18 need be nothing more than a linear slide that is retained within the body support member by stops (stop 17 on telescopic member 18 depicted in FIG. 1 co-acting with a retaining stop not shown inside body support member 121) to prevent the telescopic device from falling out of the body support member. The functioning of the robotic arm is improved, however, if there is sufficient friction acting on the linear slide, the movable portion, and its mounting, e.g., the body support member, the fixed portion. The friction should be sufficient so that when the user gestures or otherwise positions the mobile electronic device into a desired posture, the mobile electronic device and its mounting has sufficient friction to remain in place, as desired. Many of the following figures depict the possible motions and the possible orientations as a user goes about his or her daily activities, using an embodiment of the robotic arm to assist with holding and orienting the mobile electronic device.

The above is one illustrative embodiment. Other illustrative embodiments are disclosed below.

We now explain the functioning of the multipositioning tool and its advantages to users, especially users of a mobile electronic device. The multipositioning tool or robotic arm is not limited to user for electronic devices, but is particularly useful for a person with a computing device, especially one having a one-way or two-communications capability.

Figure 2A:
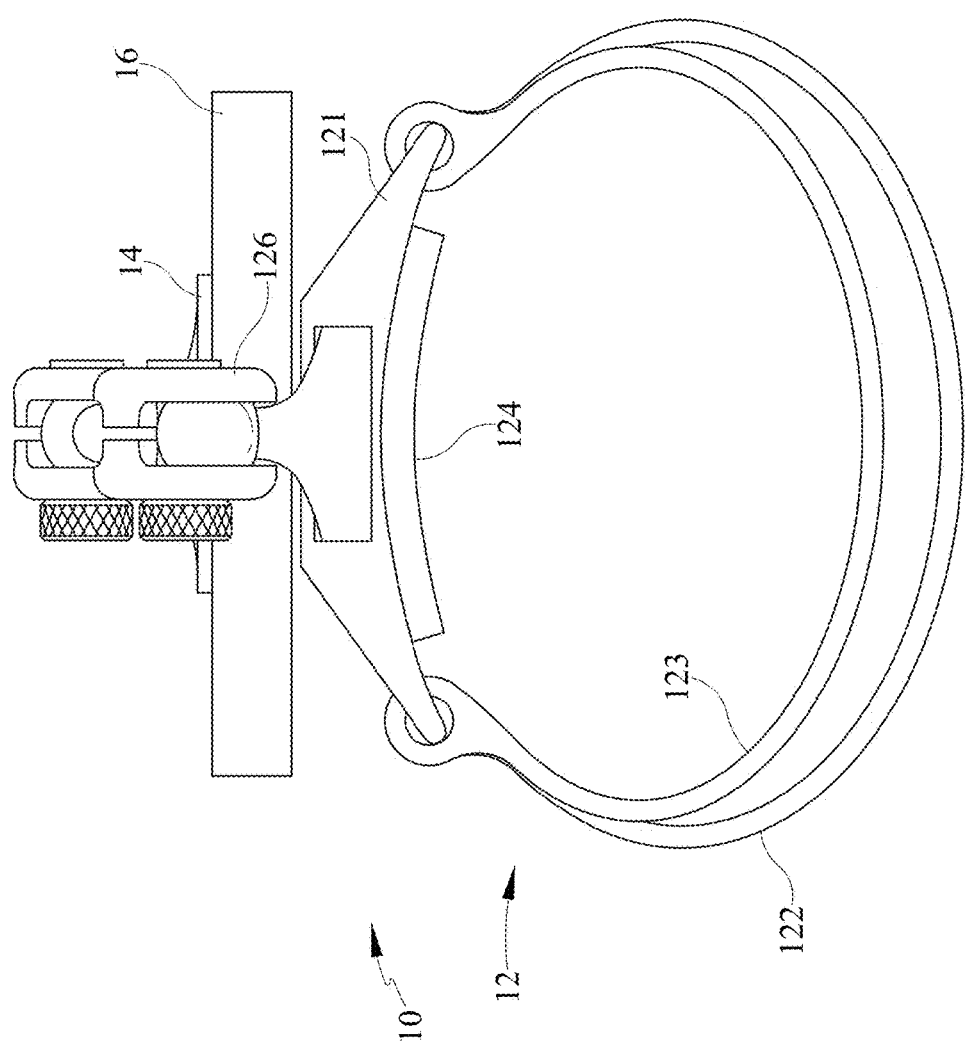
FIG. 2A is a front, folded view of the embodiment of FIG. 1.
Figure 3A:
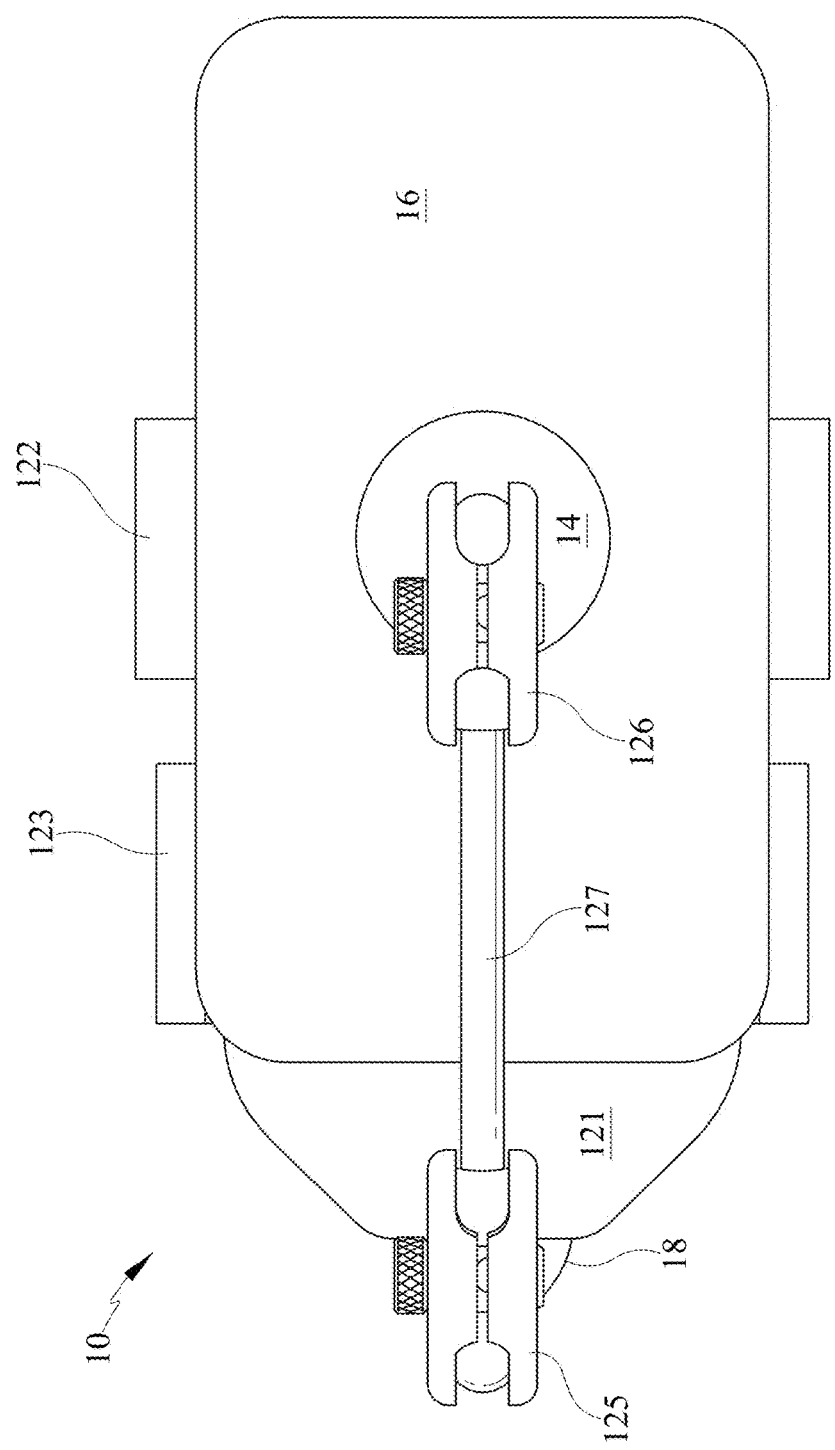
FIG. 3A is a top folded view of the embodiment of FIG. 1.
Figure 4A:
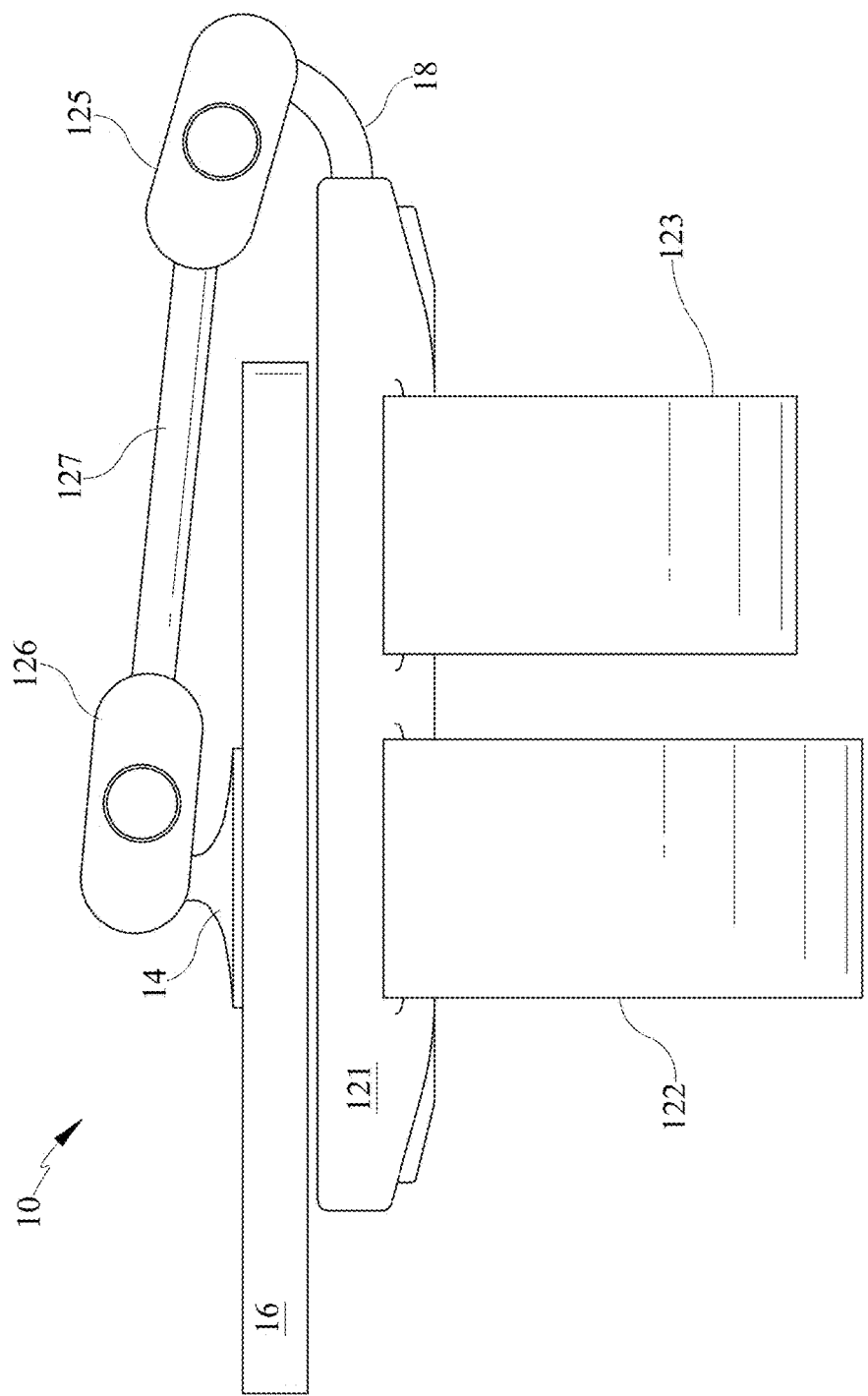
FIG. 4A is a side, folded view of the embodiment of FIG. 1.

FIG. 2A for example, is a front, folded view of the robotic arm 10, as would be seen by an observer to the user's front. Double ball joint 126 is visible but only the bottom of mobile electronic device 16 is visible. For reference, see FIG. 3A, a top folded view of the same embodiment. Note that mobile electronic device 16 is parallel to and above body support sleeve 121. Note how double ball joints 125, 126 are both visible but are on different planes, with double ball joint 125 residing mostly on a lower or arm level and double ball joint 126 on a higher or mobile device level. For further reference, see FIG. 4A, right-side view of the user and the device, in which the mobile electronic device 16 is parallel to the user's arm and to body support sleeve 121.

Figure 2B:
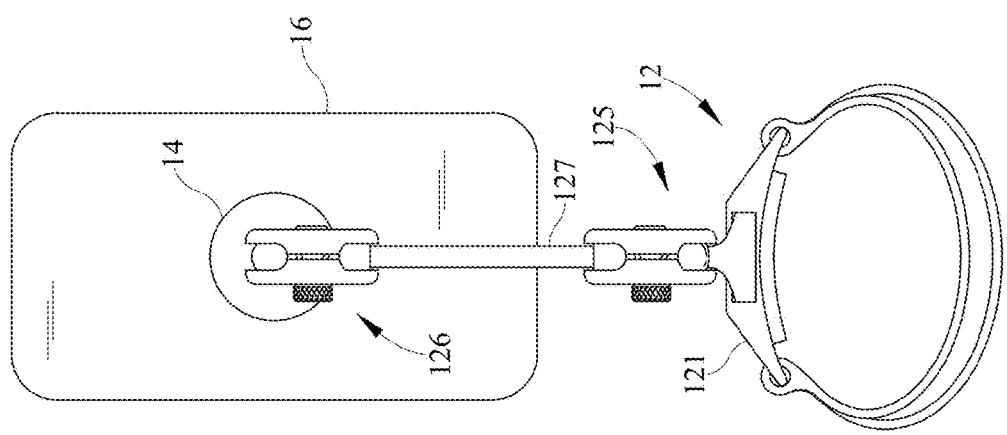
FIG. 2B is a top, unfolded view of the embodiment of FIG. 1.
Figure 2C:
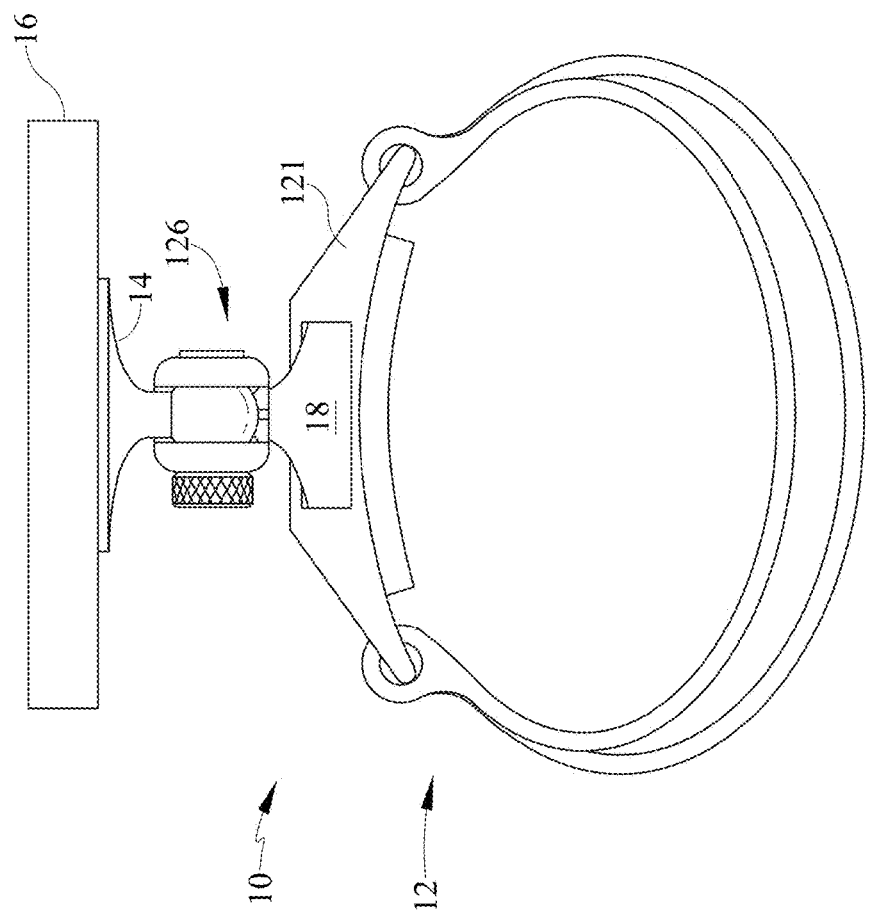
FIG. 2C is a back, unfolded view of the embodiment of FIG. 1.
Figure 3B:
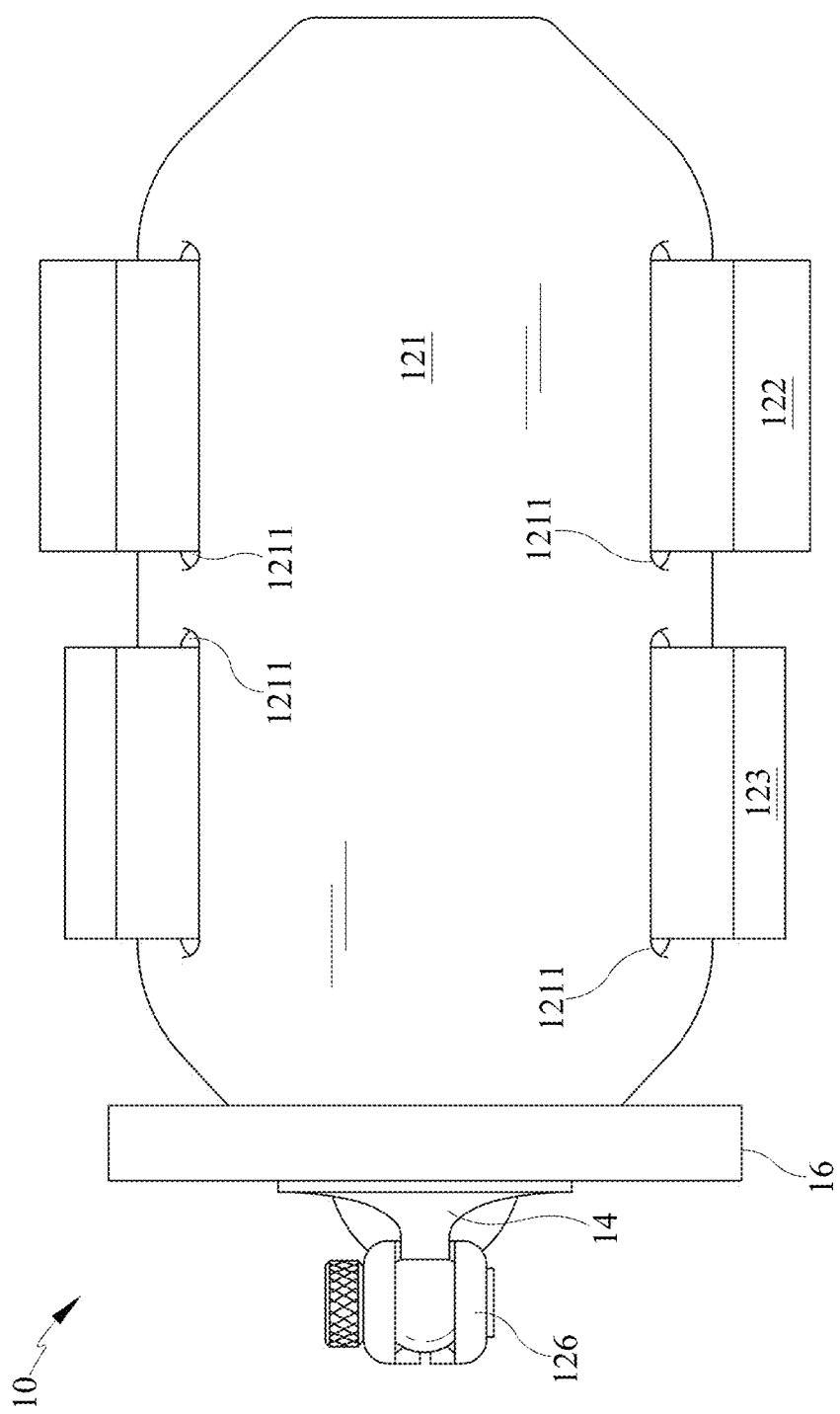
FIG. 3B is a top, partly unfolded view of the embodiment of FIG. 1.
Figure 3C:
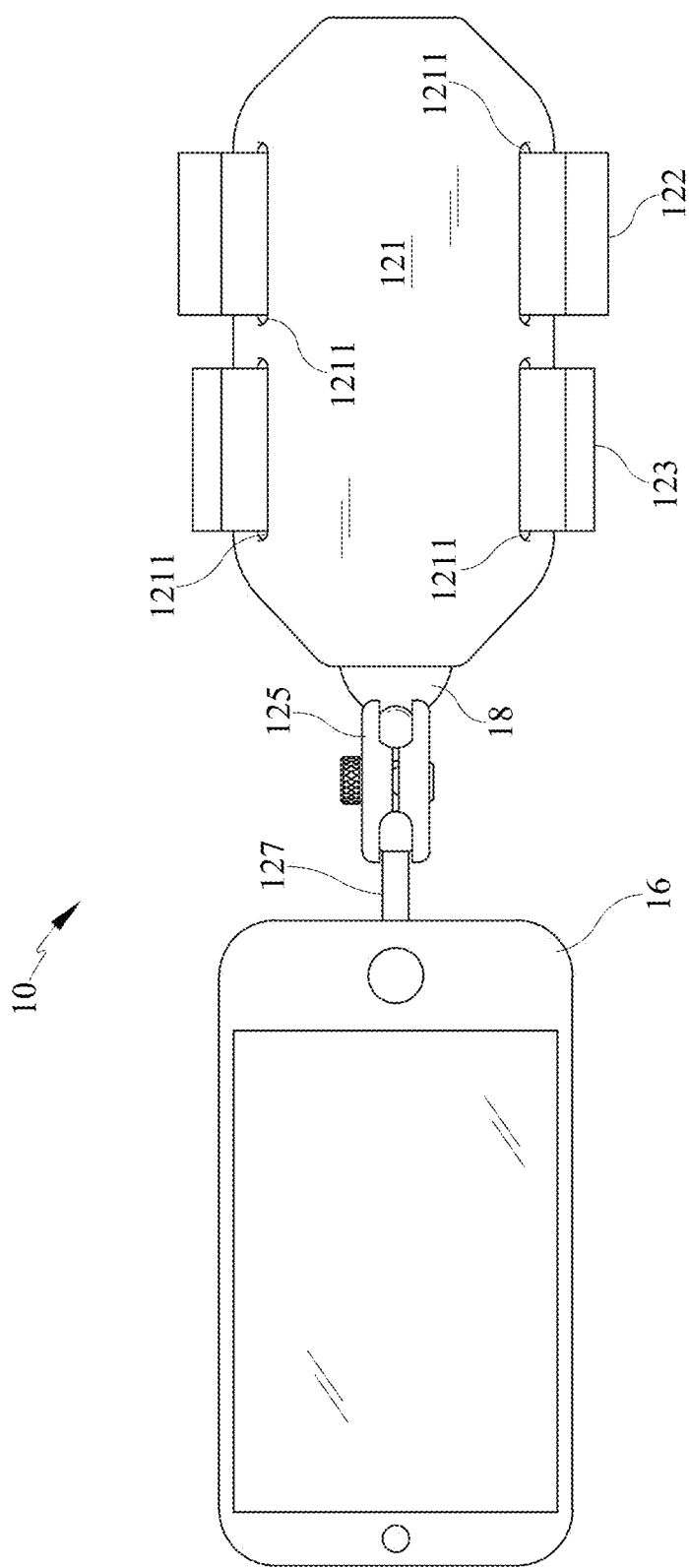
FIG. 3C is a top, unfolded view of the embodiment of FIG. 1.
Figure 4B:
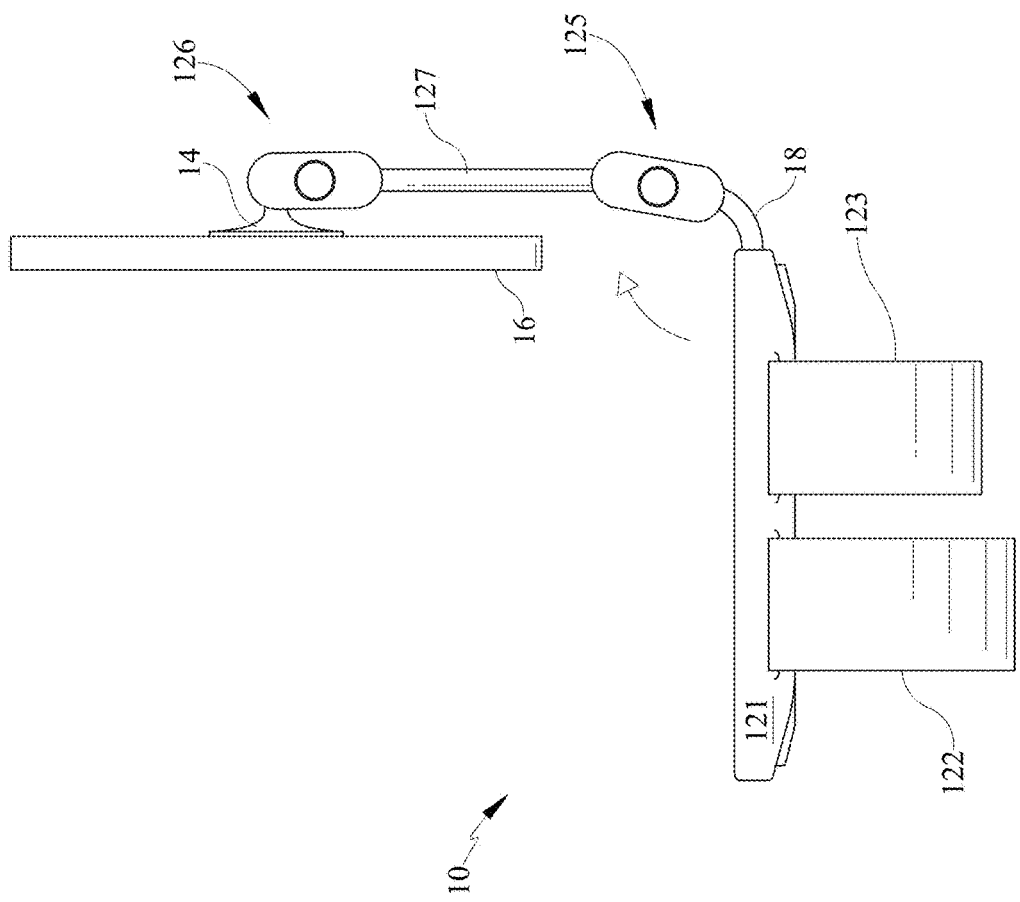
FIG. 4B is a side, partly unfolded view of the embodiment of FIG. 1.
Figure 4C:
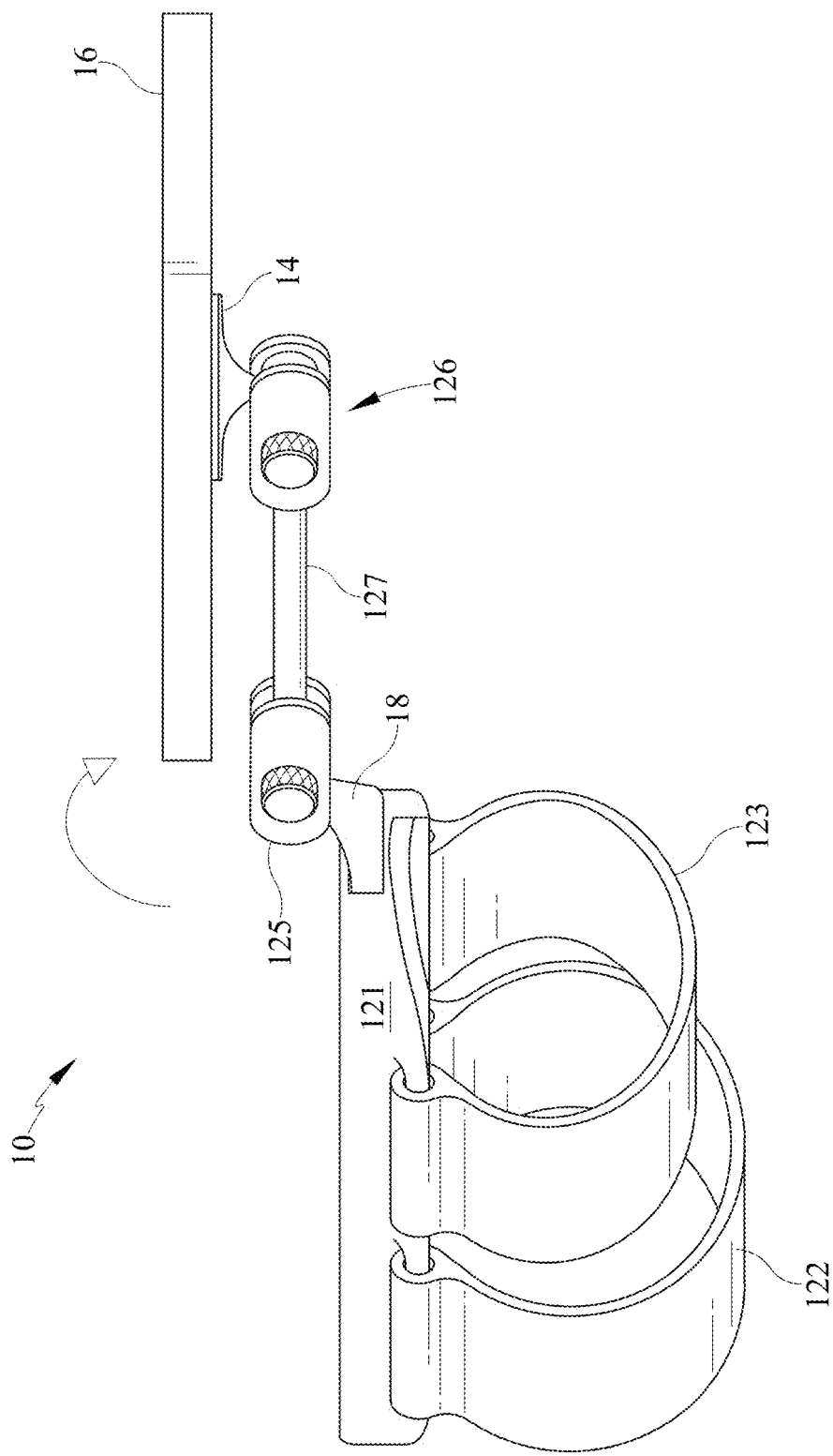
FIG. 4C is a side perspective, fully unfolded view of the embodiment of FIG. 1.

FIG. 2B depicts the device after the user has made a wrist or an arm movement (or positioned the device with the hand if the user so desires), mobile device 16 now unfolded and at a 90-degree angle to the user. For reference, see FIG. 3B, a top view, now with mobile electronic device 16 perpendicular to the body support sleeve 121. For further reference, see FIG. 4B, another right-side view of the user and the device, in which the mobile electronic device 16 is now partly unfolded and is perpendicular to the user's arm and to body support sleeve 121. The arrow in FIG. 4B depicts rotation about double ball joint 125. The movement or rotation is a pitch movement with respect to the user's left-right or y-axis. In FIG. 2C, the user has made another movement and the mobile electronic device is now completely unfolded, with the top of the mobile electronic device now visible from the user's front. For reference, see FIG. 3C, a top view of the same embodiment, with electronic device 16 now again parallel to the body support sleeve 121. Double ball joint 125 is visible while double ball joint 126 is hidden behind the mobile electronic device. For further reference, see FIG. 4C, another right-side view of the user and the device, in which the mobile electronic device 16 is now again parallel to the user's arm and to body support sleeve 121. The movement or rotation of FIG. 2C, indicated by the arrow in the figure, is also a pitch movement with respect to the user's left-right or y-axis.

Figure 3D:
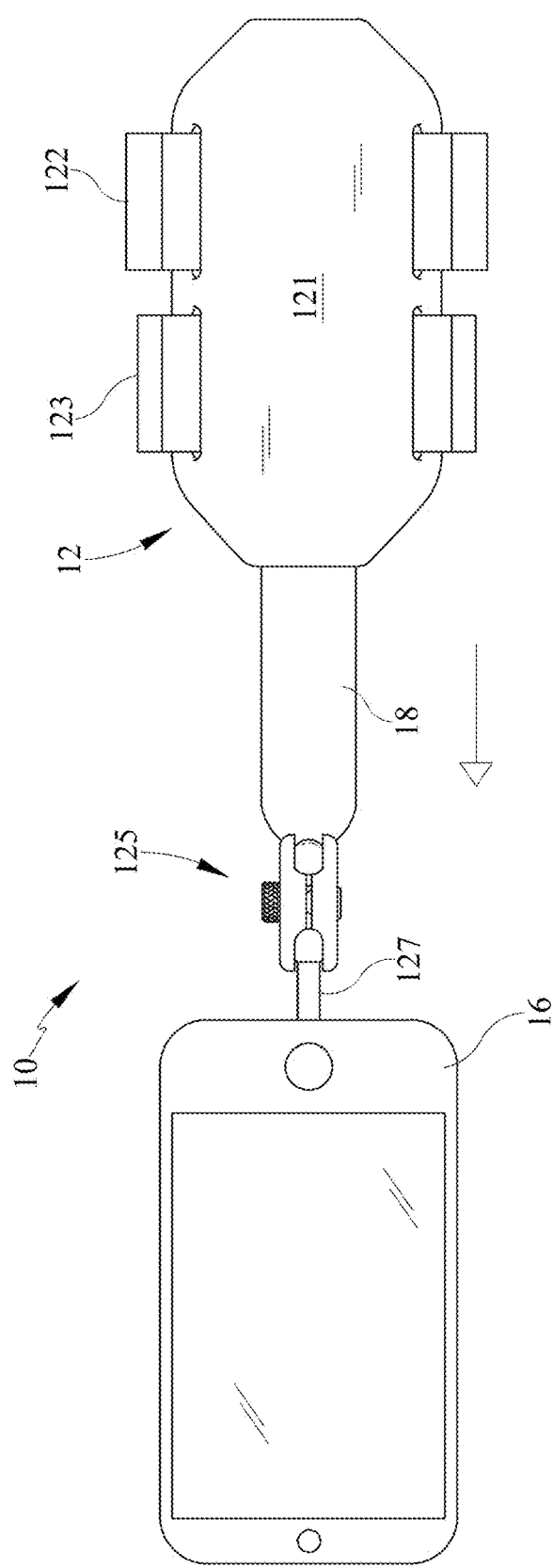
FIG. 3D is a top, unfolded, partly extended view of the embodiment of FIG. 1.
Figure 3E:
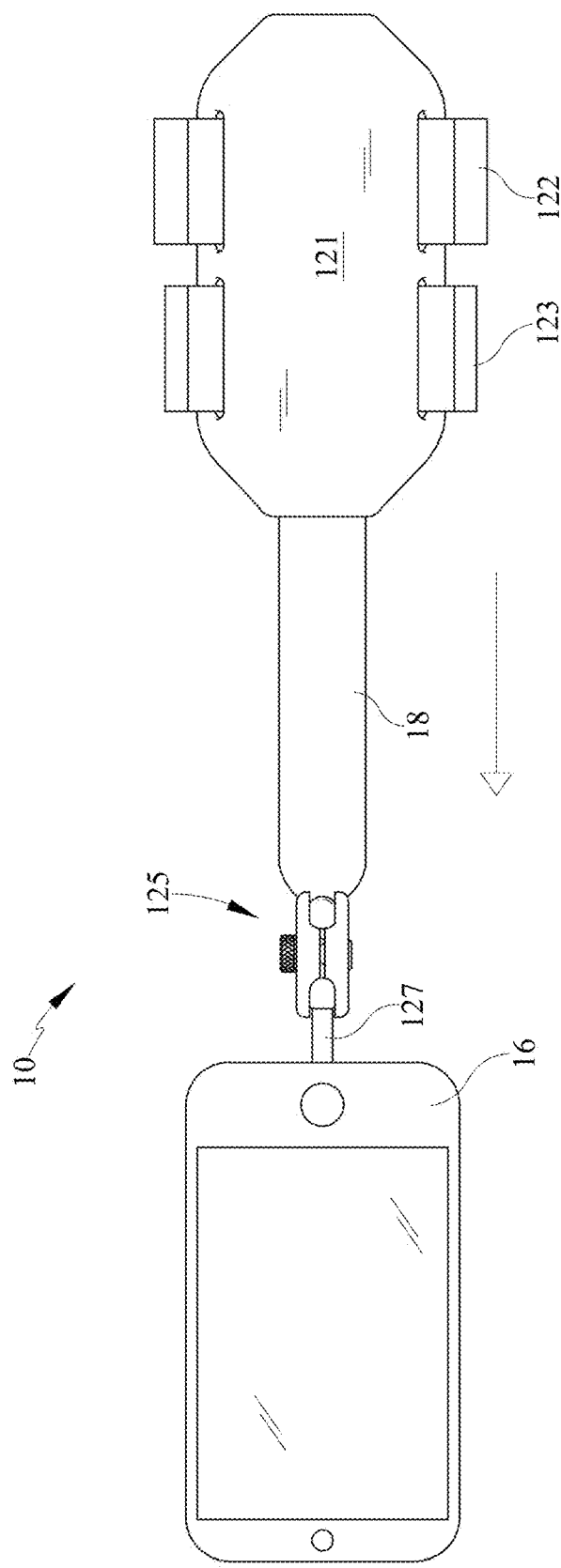
FIG. 3E is a top, unfolded and fully extended view of the embodiment of FIG. 1.
Figure 4D:
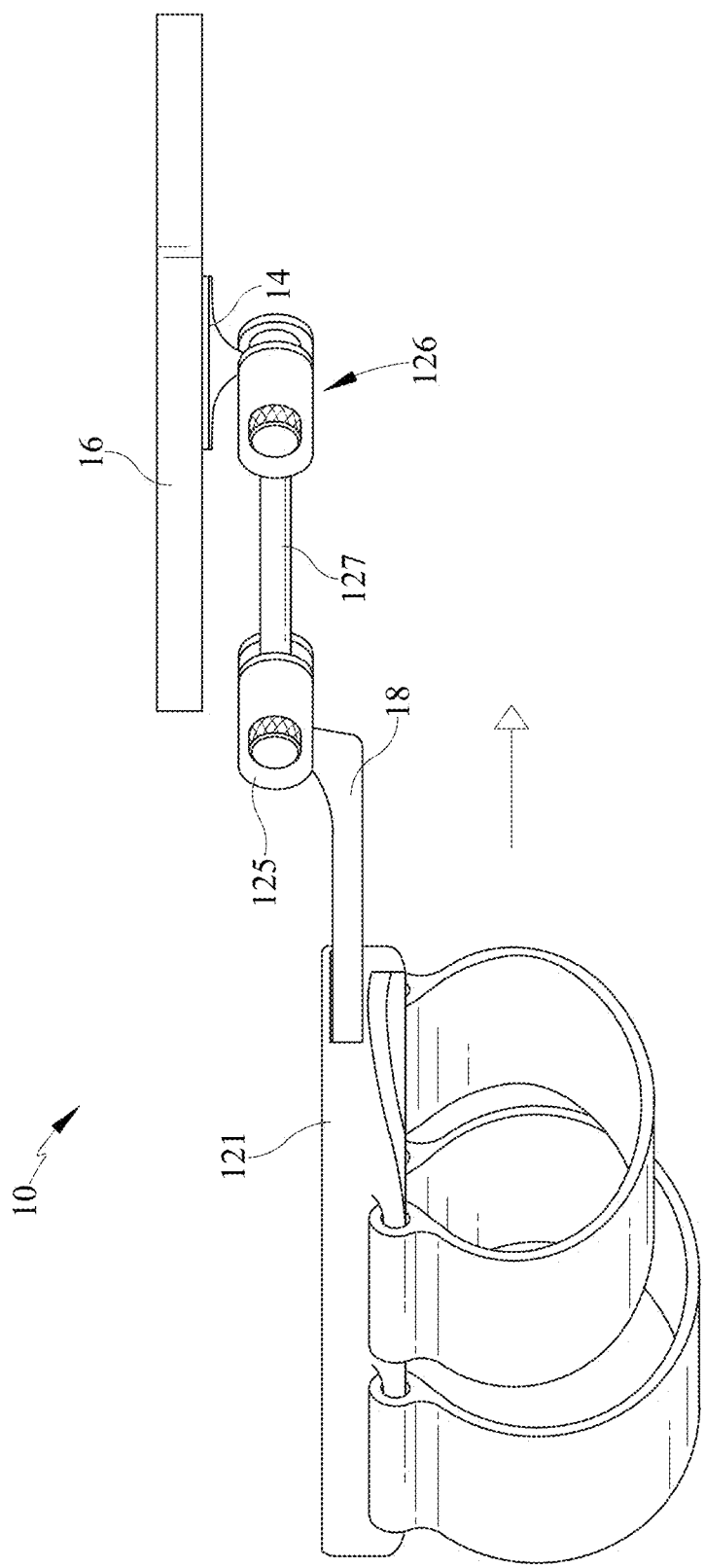
FIG. 4D is a side perspective, unfolded, partly extended view of the embodiment of FIG. 1.
Figure 4E:
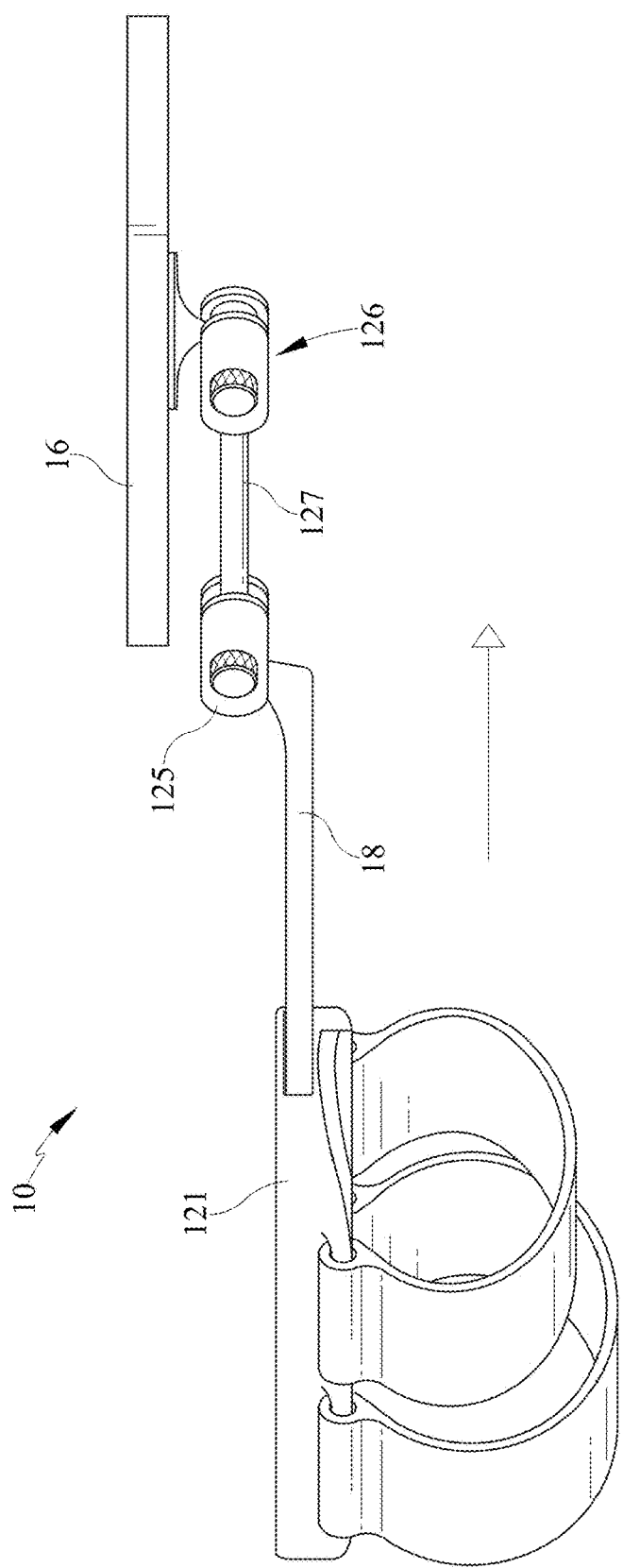
FIG. 4E is a side perspective, unfolded, fully extended view of the embodiment of FIG. 1.

FIGS. 2A-2C, 3A-3C and 4A-4C depict rotation of the mobile electronic device via the double ball joints 125, 126. Linear movement or extension is also possible with this embodiment of the robotic arm, as shown in FIGS. 3D-3E and FIGS. 4D-4E. FIGS. 3D and 4D depict on-axis linear extension along the direction of the arrow, which is parallel to the body support sleeve 121 and in the forward direction, so to speak, of a forward-looking user. The extension is made by telescopic member 18 as it exits from body support sleeve 121. The extension can only go in and out, forward or backward, and no rotation or roll-pitch-yaw movement is possible along this axis or degree of freedom. FIGS. 3D and 4D show partial extension and 3E and 4E show full extension along the same axis. The remainder of the figures shows additional views of the robotic arm.

Figure 5A:
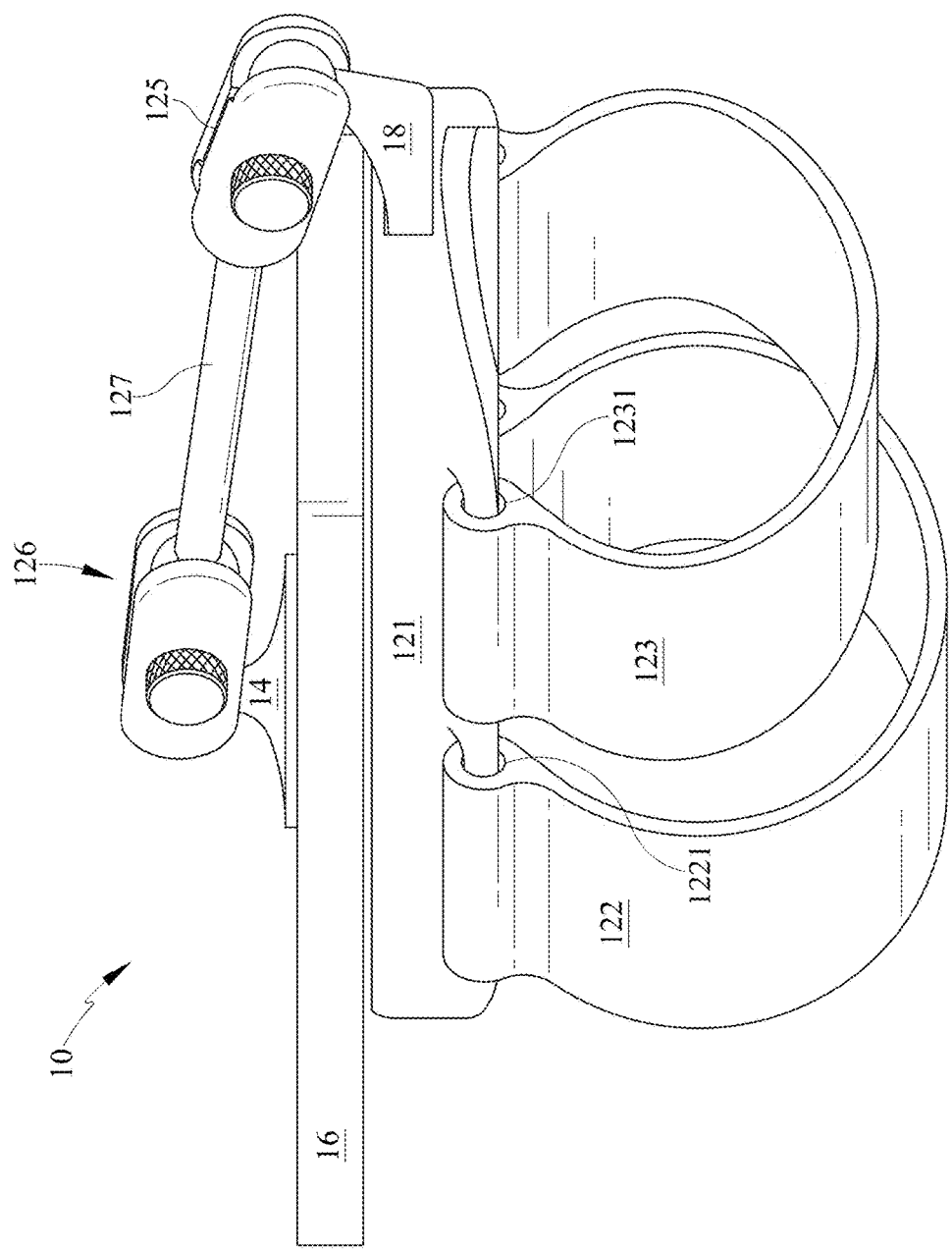
FIG. 5A is a front perspective, folded view of the embodiment of FIG. 1.
Figure 5C:
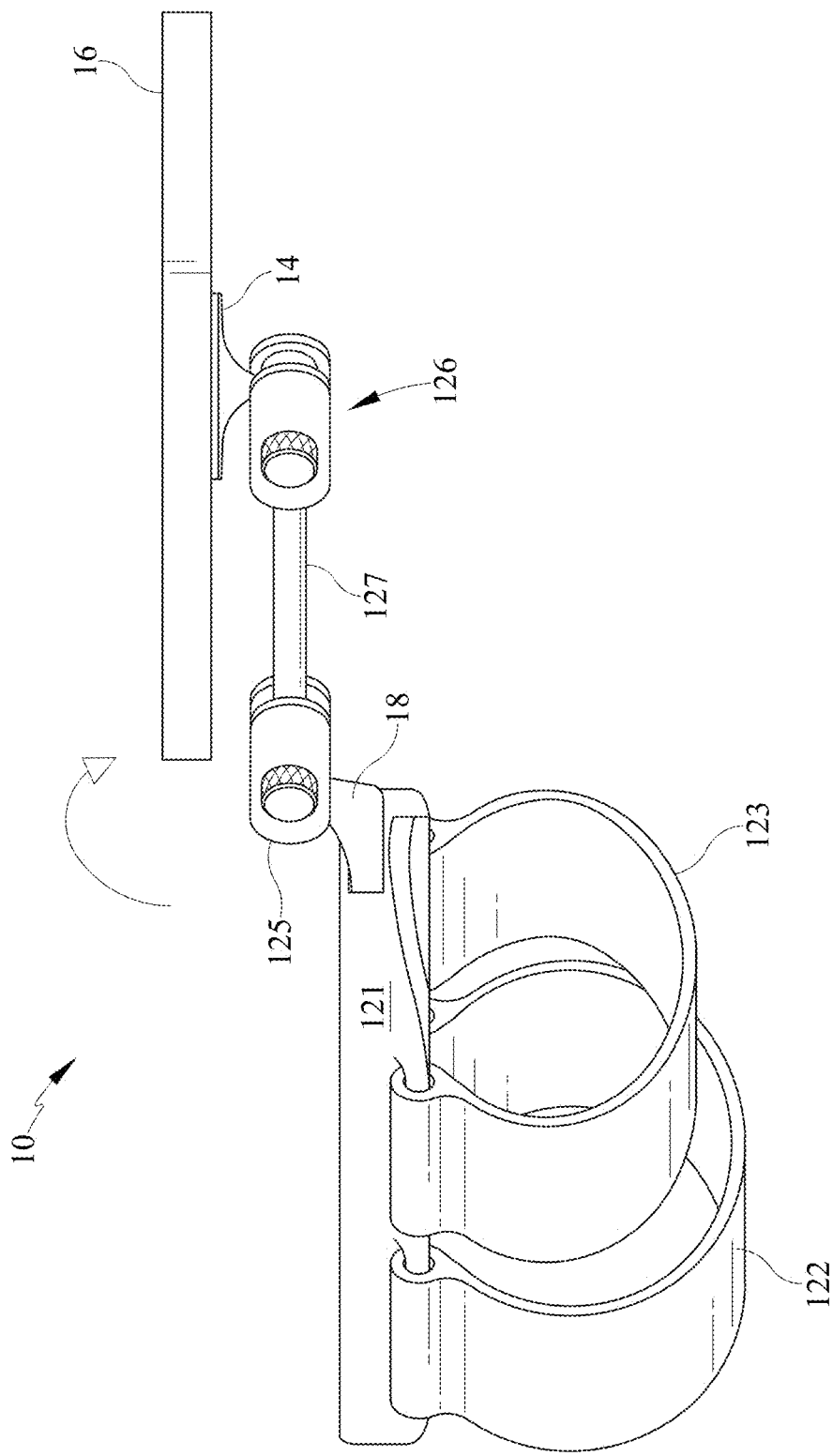
FIG. 5C is a front perspective, fully unfolded, partly expanded view of the embodiment of FIG. 1.
Figure 5D:
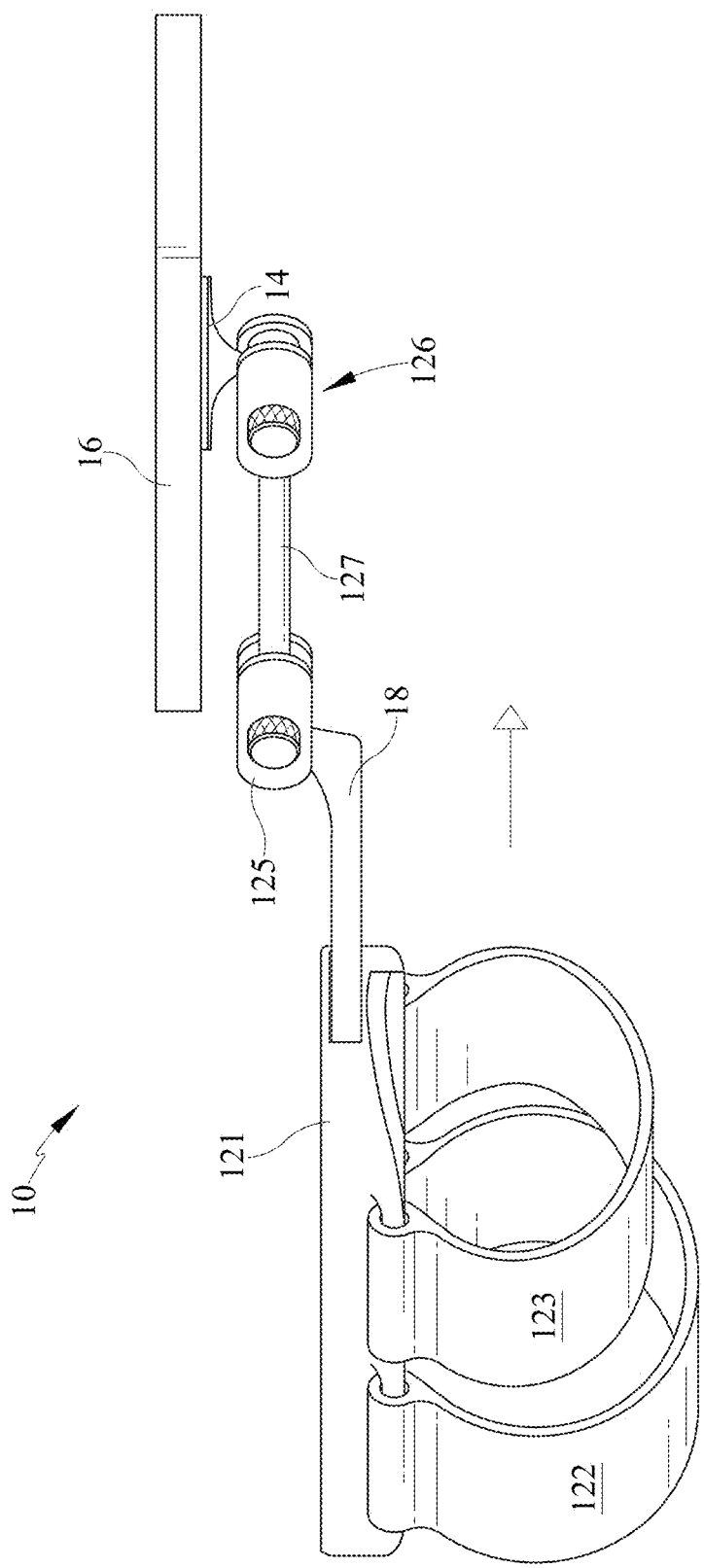
FIG. 5D is a front perspective, unfolded, further expanded view of the embodiment of FIG. 1.
Figure 5E:
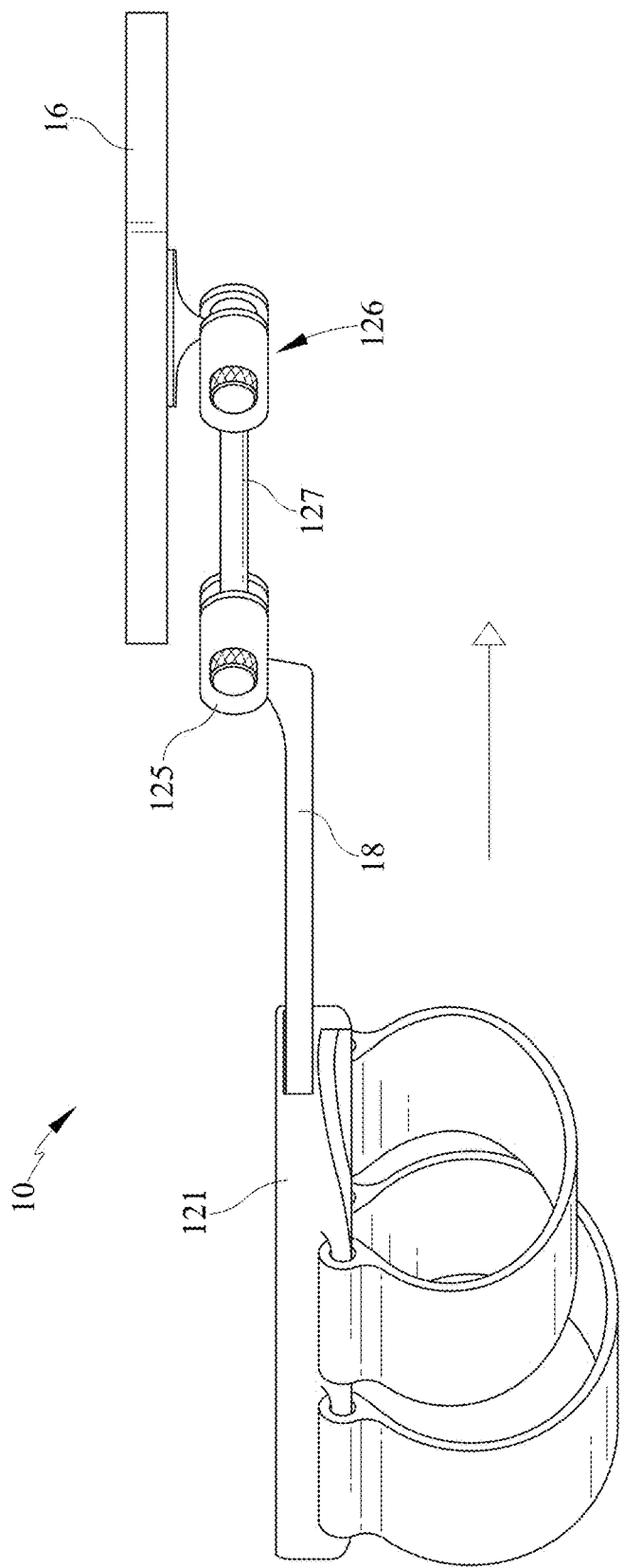
FIG. 5E is a front perspective, unfolded, fully expanded view of the embodiment of FIG. 1.
Figure 5F:
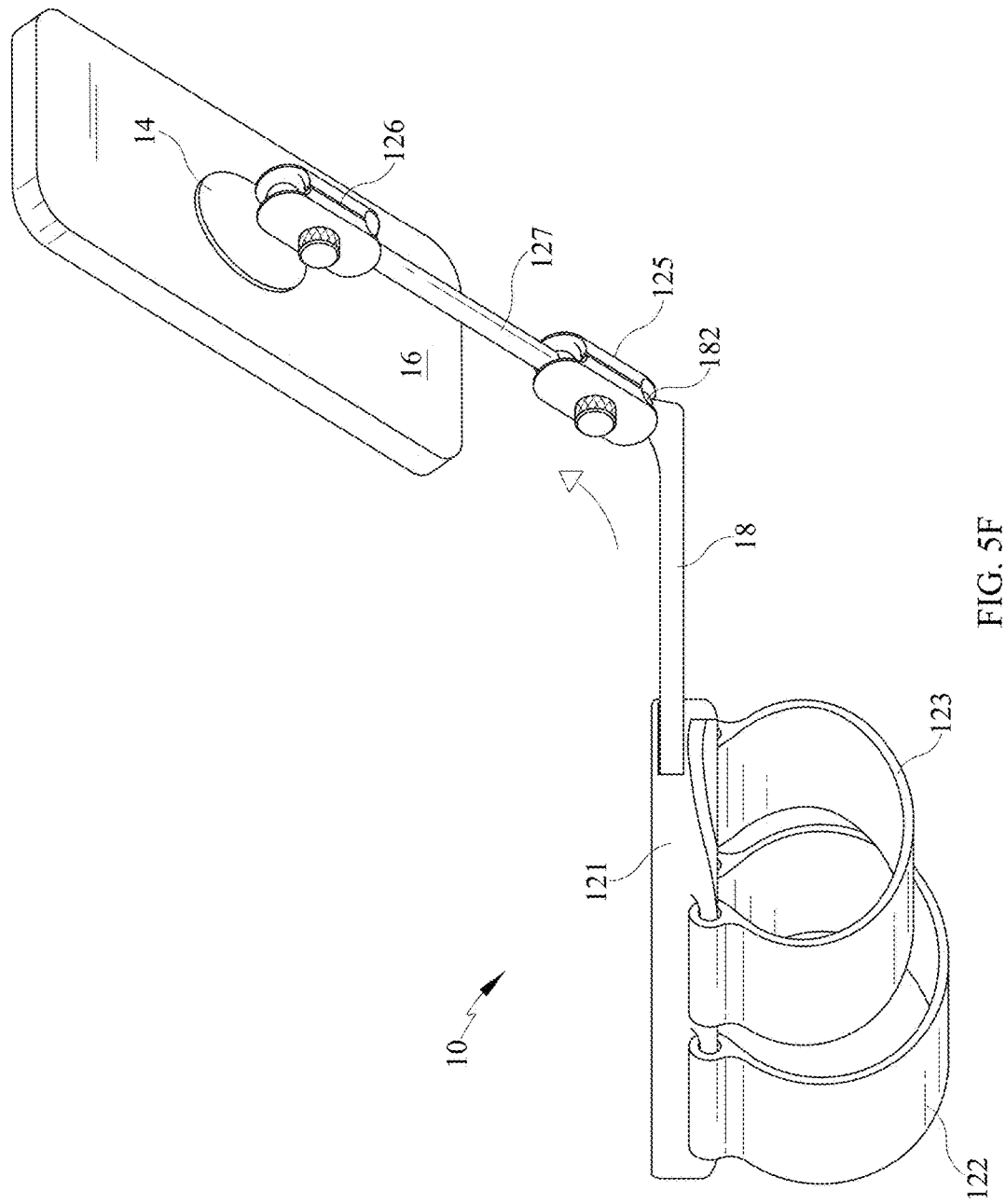
FIG. 5F is a front perspective, fully expanded, partly unfolded view of the embodiment of FIG. 1, with a left sideway orientation.

The views of FIGS. 5A-5F are a front perspective views of the same robotic arm 10 discussed above. FIG. 5A depicts the robotic arm 10 in a folded position. In FIG. 5B, the user has made a wrist or arm movement, as shown by the arrow, resulting in the mobile electronic device unfolding to a 90-degree angle as shown. Other angles are possible, as desired, from zero to full unfolding, a 180-degree angle or more. A 180-degree angle is shown in FIG. 5C, with further rotation from double ball joint 125, allowing this orientation. This is again showing what may be termed a pitch motion, along the longitudinal axis in the direction of the user. FIGS. 5D and 5E show longitudinal extension, in the direction of the arrow shown, by telescopic member 18, similar to the motion depicted above in FIGS. 3D-3E and FIGS. 4D-4E. FIG. 5F now shows motion, indicated by the arrow, in two directions: a pitch movement has rotated the mobile electronics device back to about a 135-degree orientation, as opposed to the 180-degree orientation in FIG. 5E. In addition, the mobile electronic device has now moved a little to the right along a left-right axis, or a yaw movement, for the convenience of the user and as dictated by the user. This orientation is made possible by arm or wrist movements of the user, or both the arm and the wrist. The user may also orient the mobile electronic device using his or her hand.

Figure 6A:
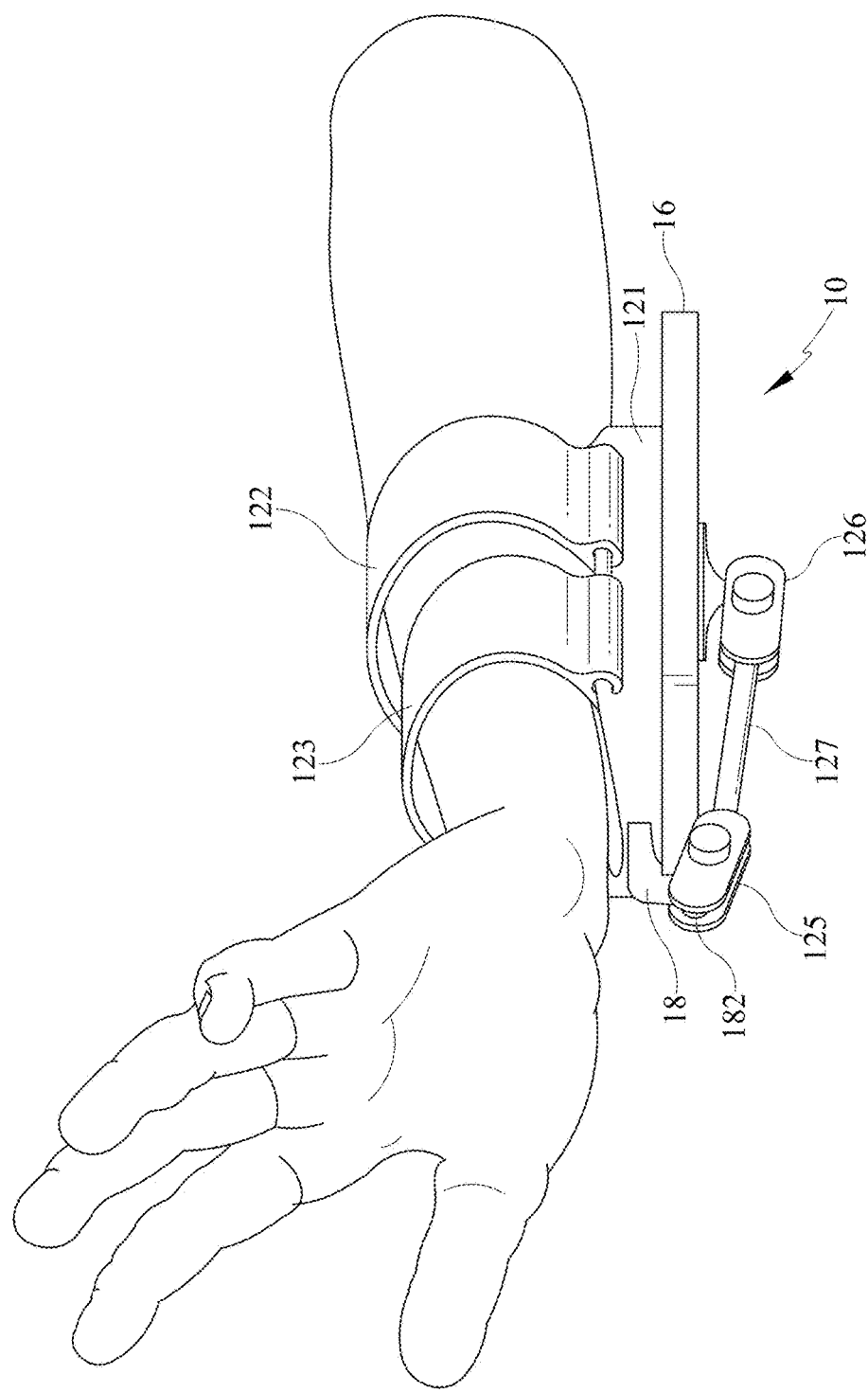
FIGS. 6A-6B are front perspective views of the embodiment of FIG. 1, depicting user action to unfold the electronic device for viewing or using.
Figure 6B:
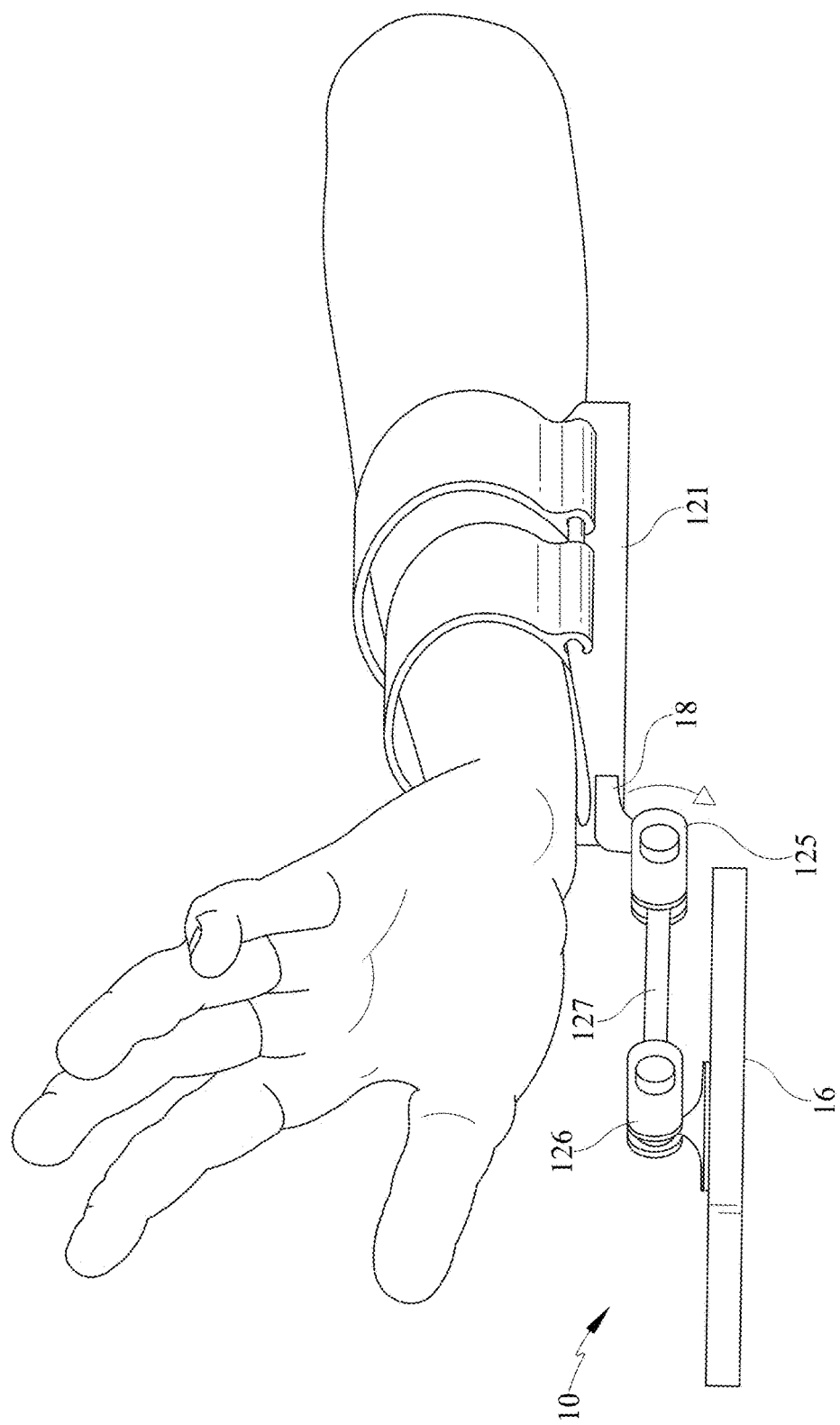
Figure 6C:
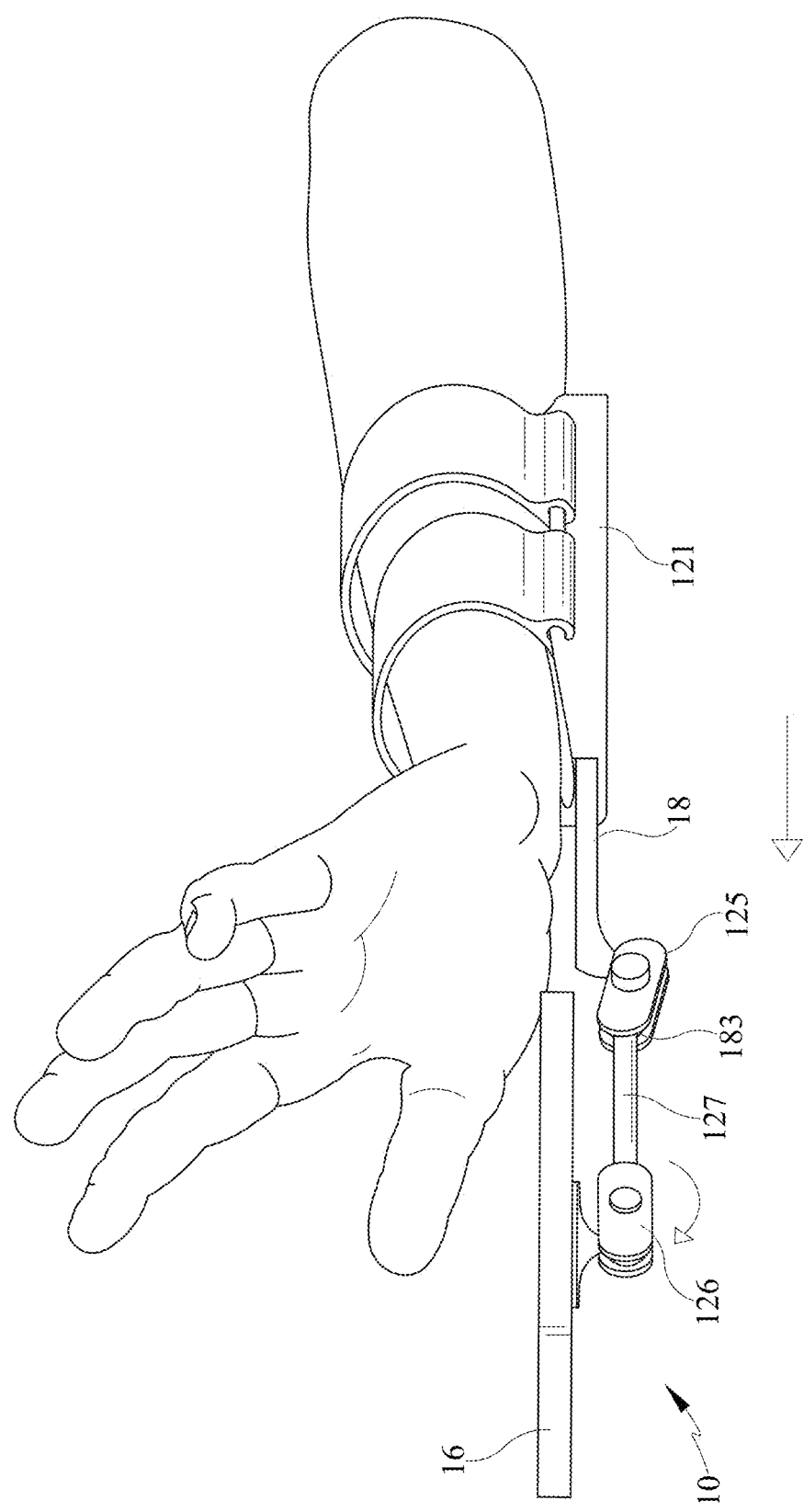
FIG. 6C depicts a user wearing the embodiment of FIG. 1, showing user movement to extend the electronic device for viewing or using.
Figure 6E:
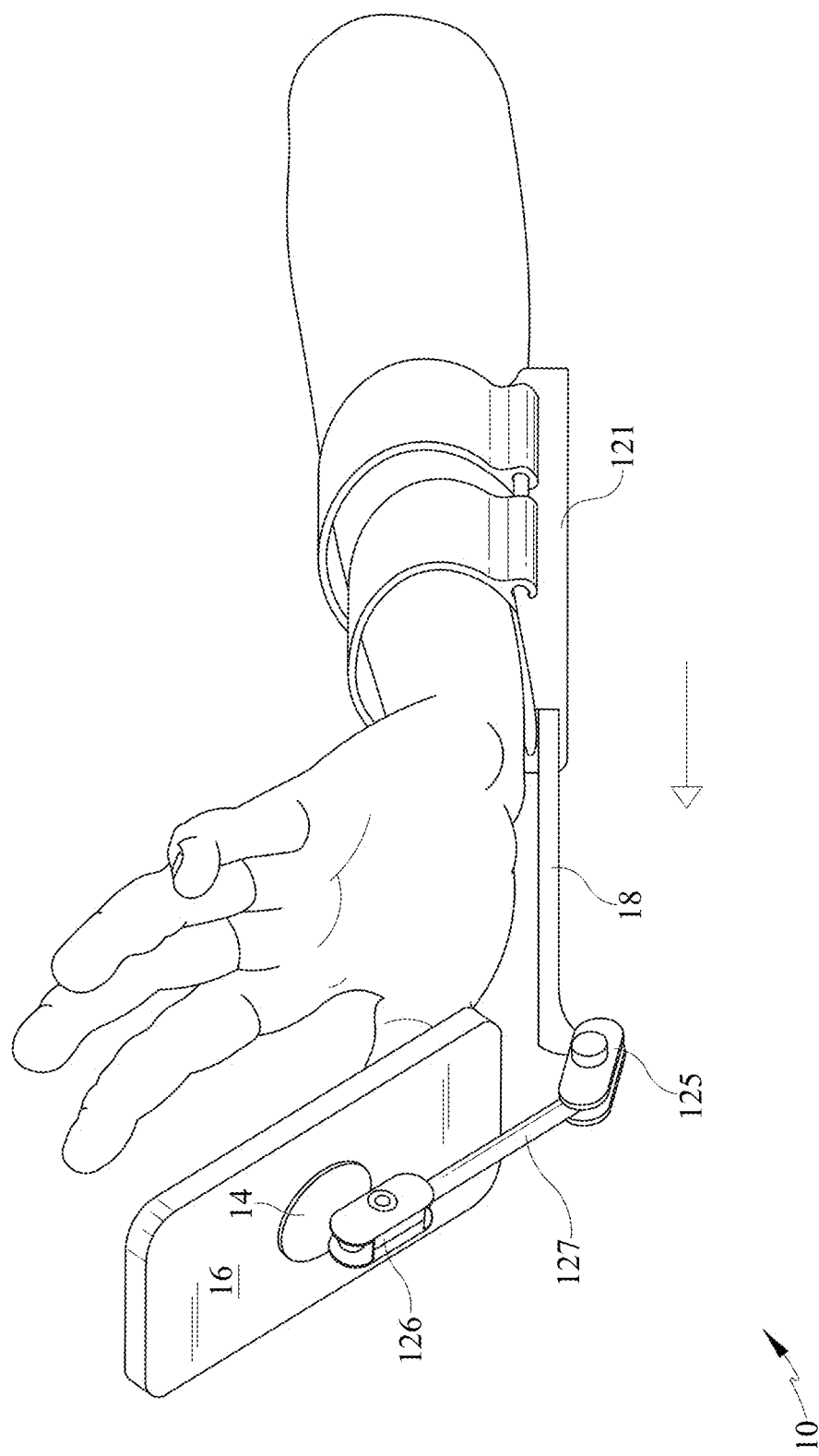
FIG. 6E depicts user adjustment to further extend the embodiment of FIG. 1 in the same orientation of FIG. 6D for better viewing of the electronic device.
Figure 6F:
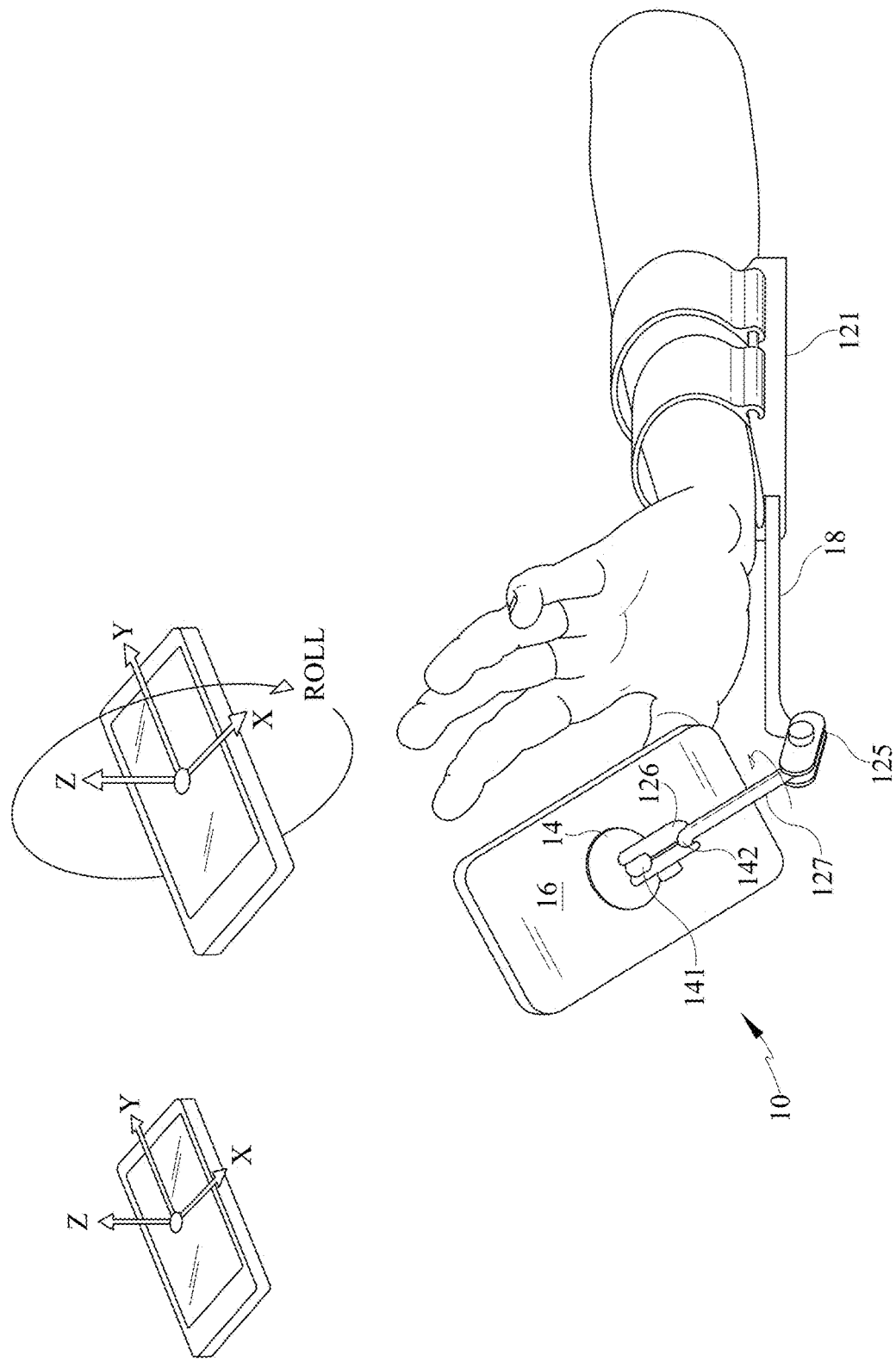
FIG. 6F depicts user adjustment of roll orientation with the embodiment of FIG. 1.
Figure 6G:
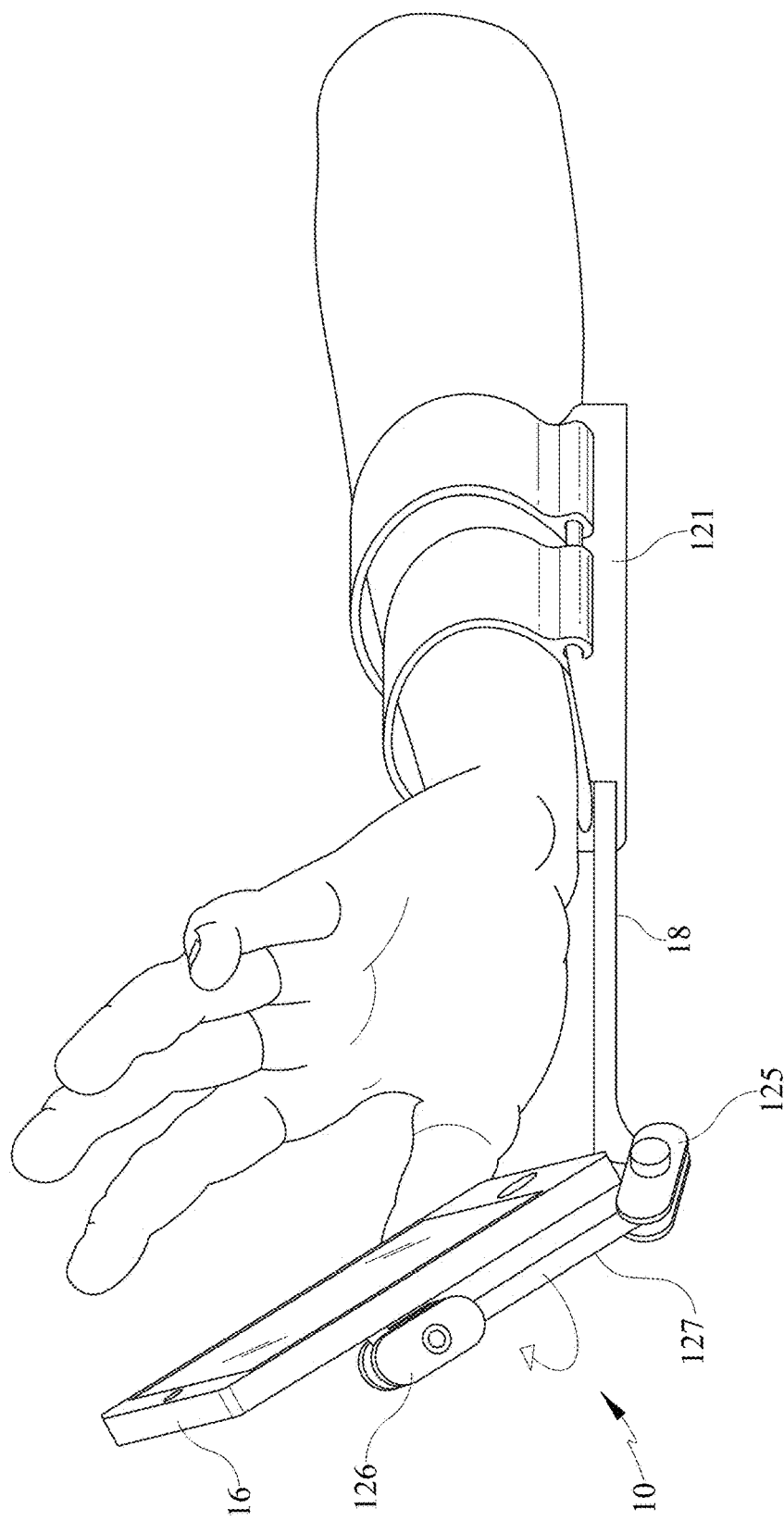
FIGS. 6G-6H depict user action for further sideway or roll adjustments to the embodiment of FIG. 1 for desired orientation of the electronic device.
Figure 6H:
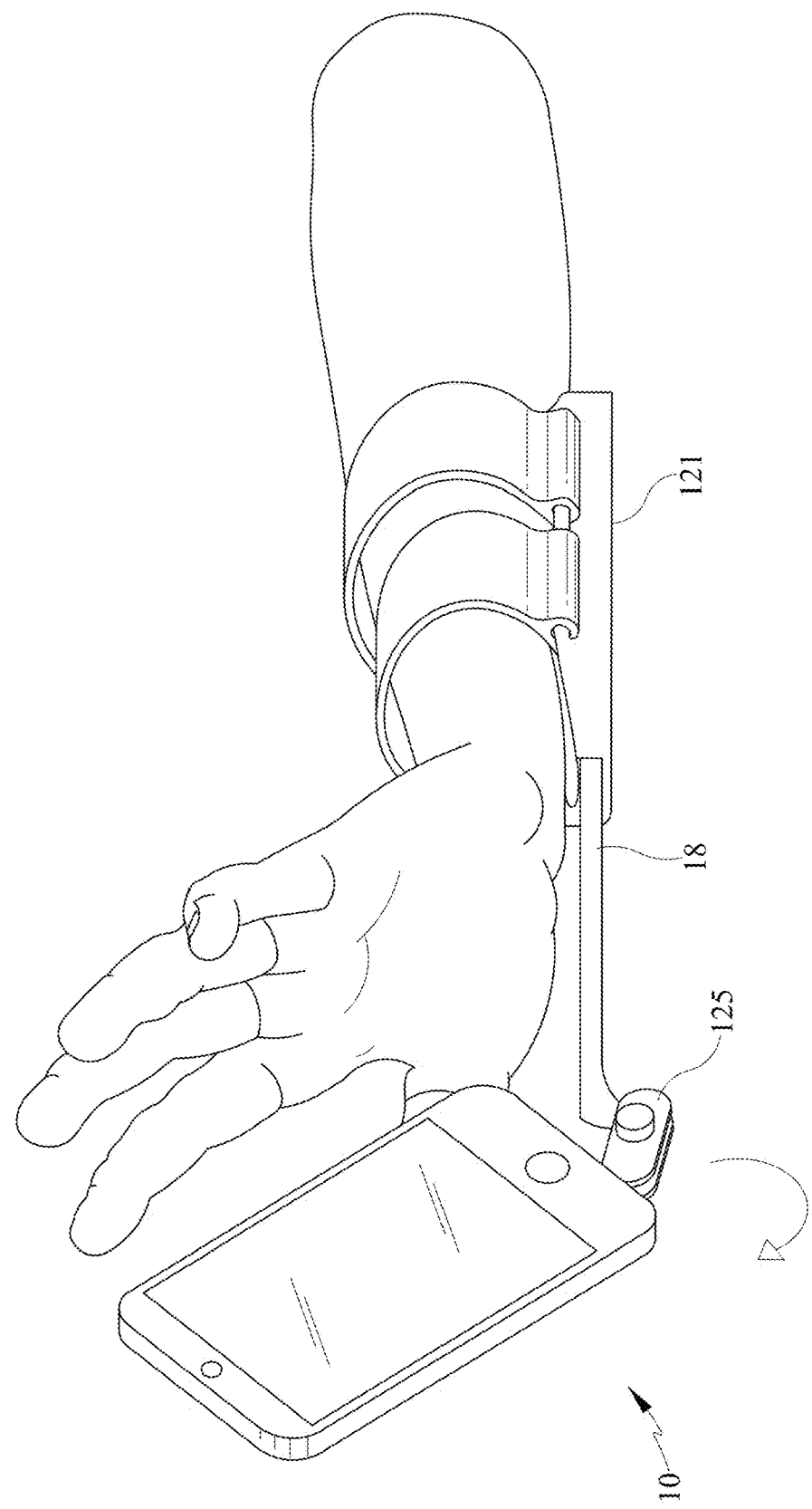
Figure 6J:
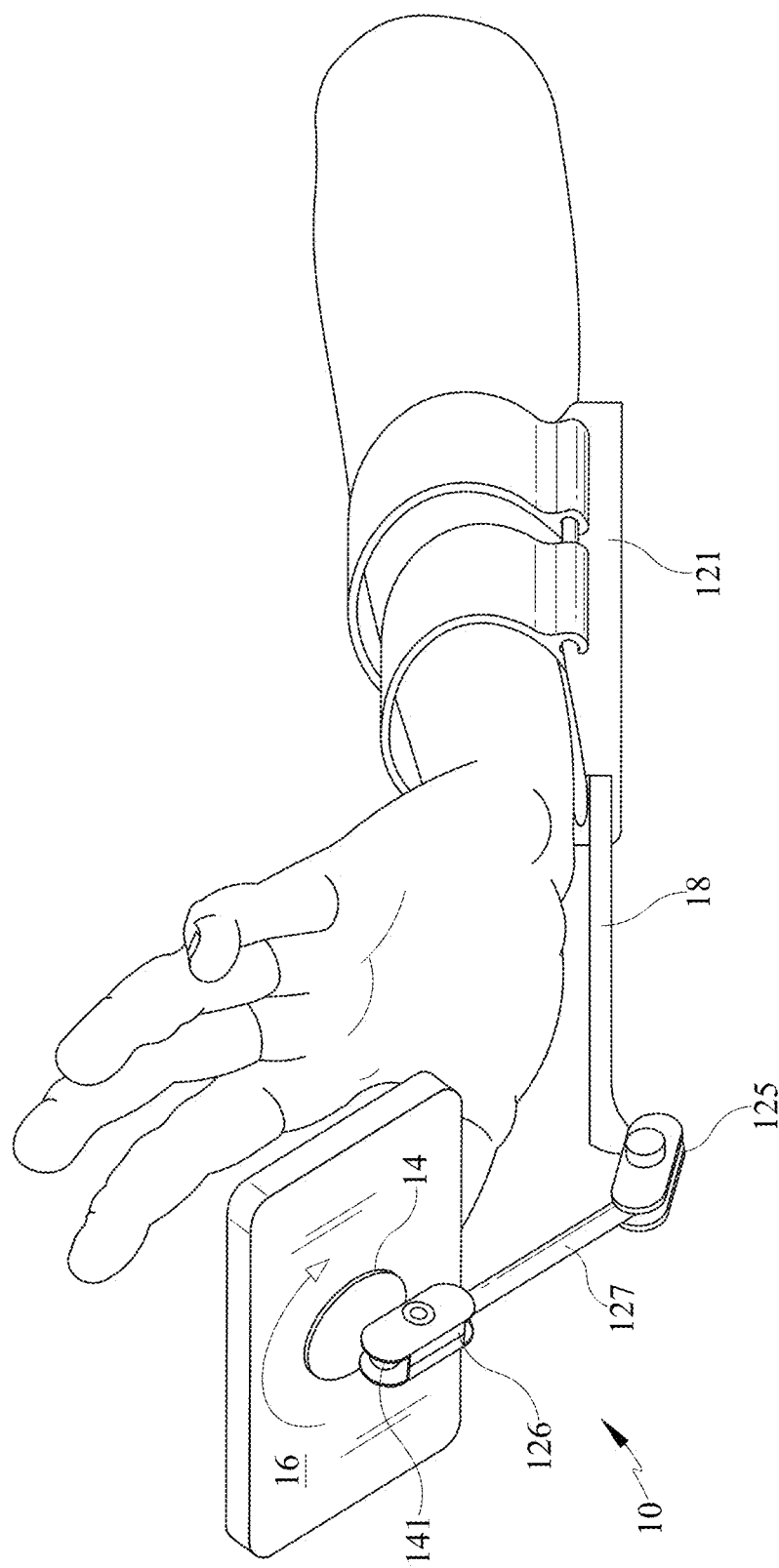

Additional orientations and movements are also shown in FIGS. 6A-6J, showing the ranges that are possible. FIG. 6A is a front resting position of the robotic arm and the mobile electronic device 10. In FIG. 6B, the user has made a flip movement with his or her arm and the mobile electronic device 16 has unfolded to about a 180-degree orientation, as shown by the arrow. In FIG. 6C, the user has made a further arm or wrist movement, and has extended the telescopic member 18, again, as shown by the arrow in FIG. 6C. The user has also completed a roll movement, since the mobile electronics device has been turned 180-degrees along its longitudinal axis. FIG. 6D depicts a pitch rotation by double ball joint 125 to orient the mobile electronic device per the user's preference, again, shown by the arrow. Further extension by telescopic member 18 is shown by the arrow in FIG. 6E, followed by rotation to the right, a roll movement, in FIG. 6F. This movement may be accomplished by wrist or arm movement, or as shown in FIG. 6F, by a finger of the user. FIG. 6G depicts rotation to the left by the user's hand, again, to position the device as desired by the user. Even further rotation to the left is depicted in FIG. 6H, perhaps orienting mobile electronics device 10 so that it may be observed by a friend. Yaw movements back and forth about a vertical axis are depicted in FIGS. 6I and 6J, again accomplished by hand movements of the user. These orientations may also be possible without direct contact with the mobile electronics device, using wrist or arm movements, or both.

Figure 7A:
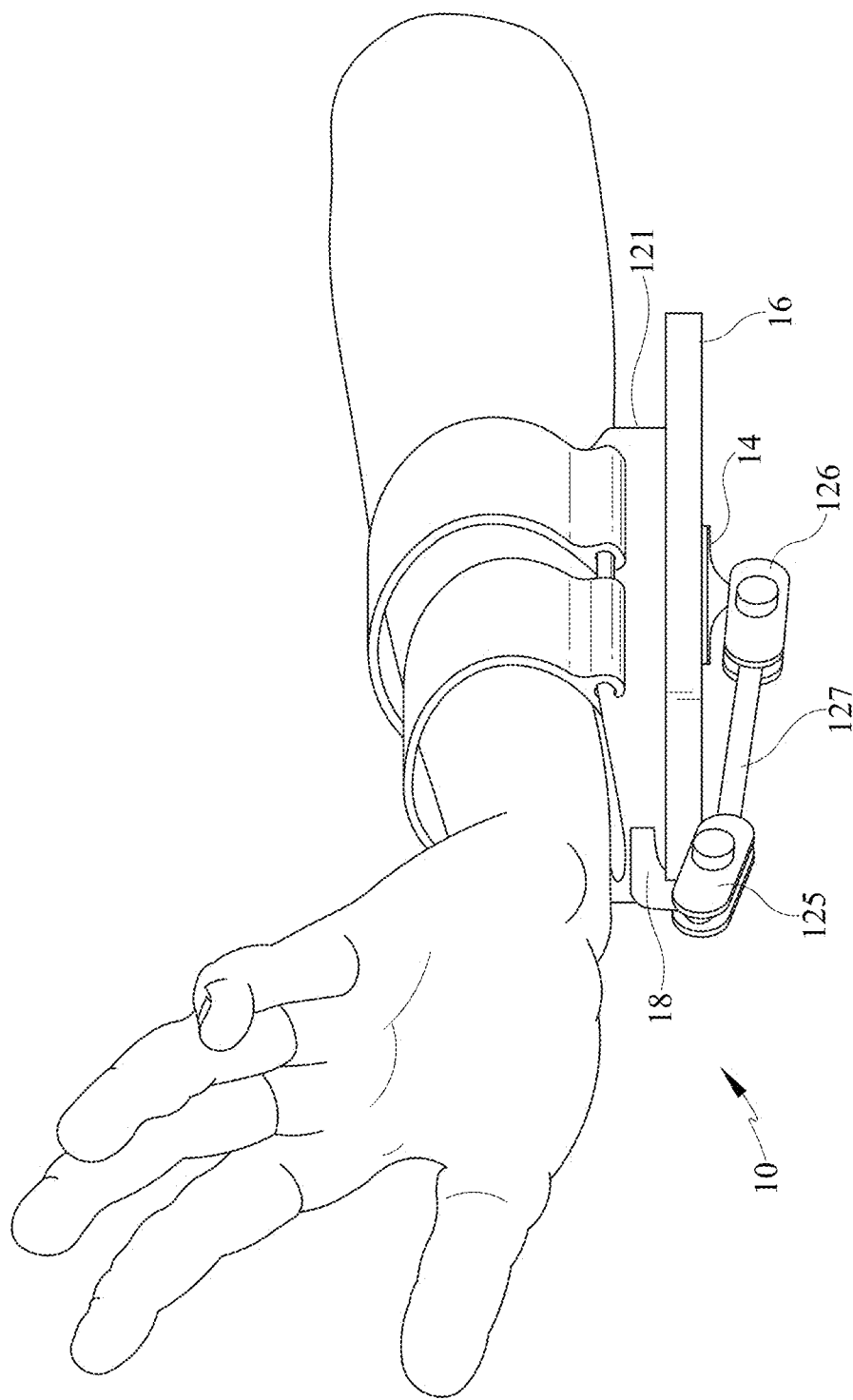
FIG. 7A is a front perspective view of the embodiment of FIG. 1 on a forearm of a user, ready for deployment.
Figure 7B:
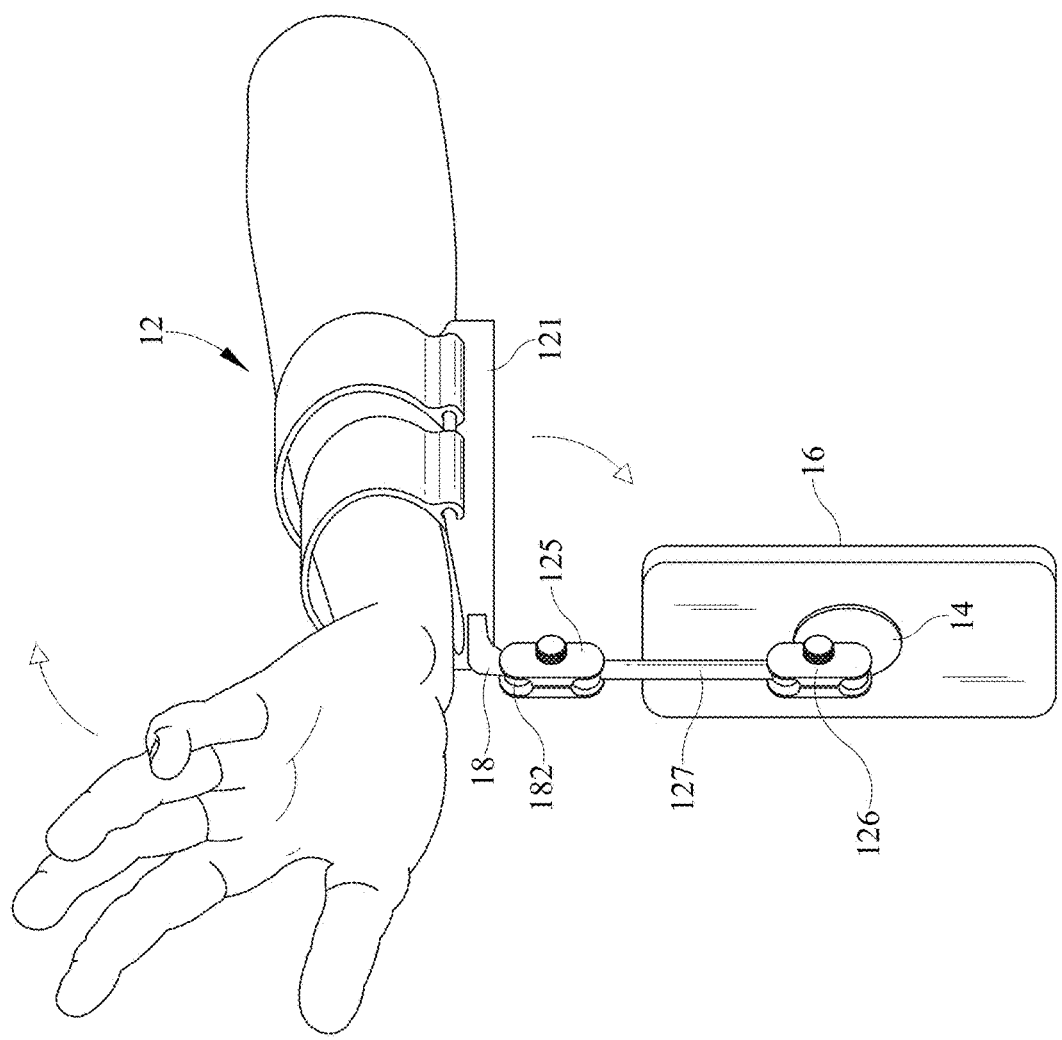
FIG. 7B depicts the embodiment of FIG. 1, with the electronic device partly unfolded, downwardly, via a wrist motion of the wearer.
Figure 7C:
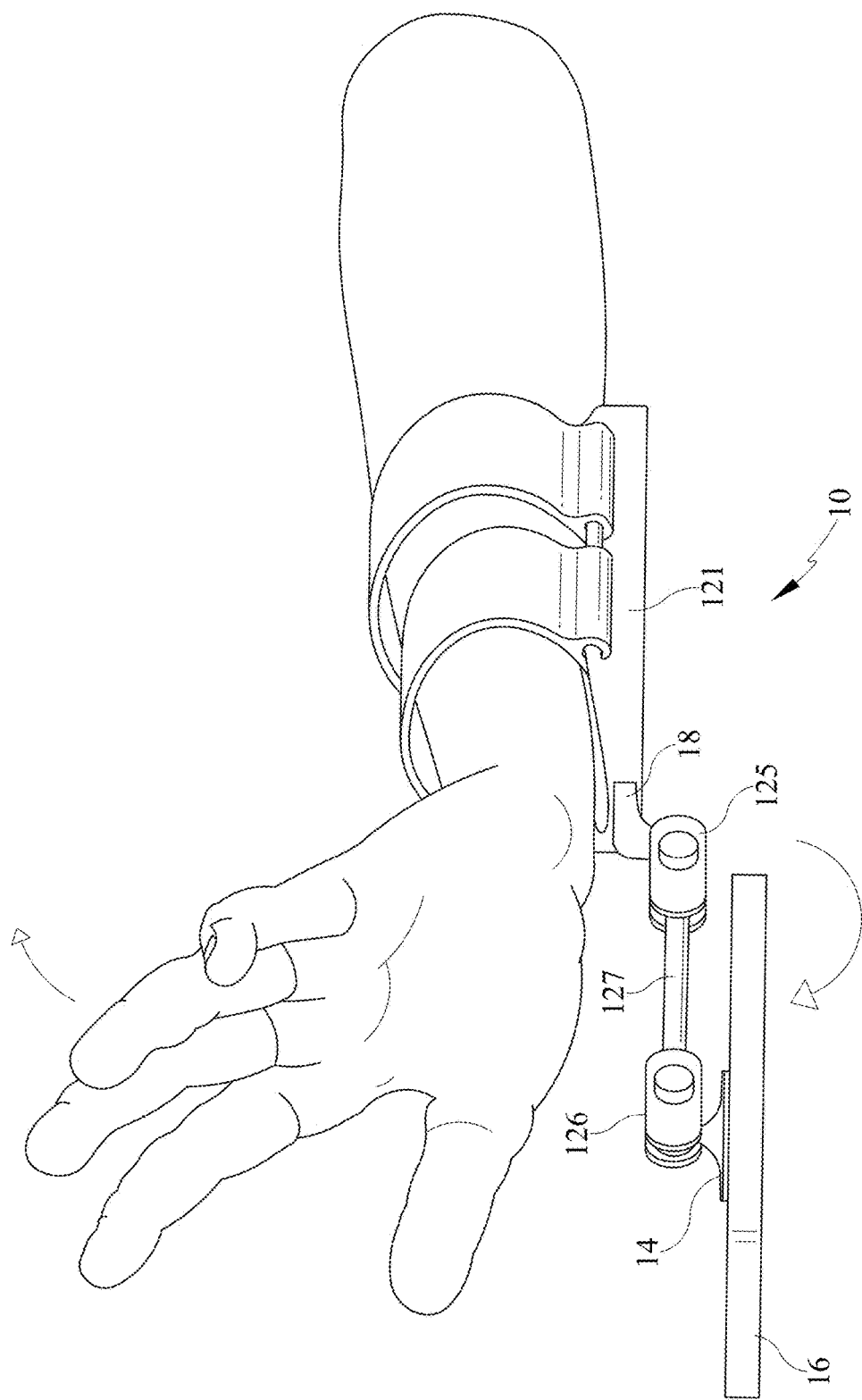
FIG. 7C depicts the embodiment of FIG. 1, with the electronic device fully unfolded or opened via a wrist motion of the wearer.
Figure 7D:
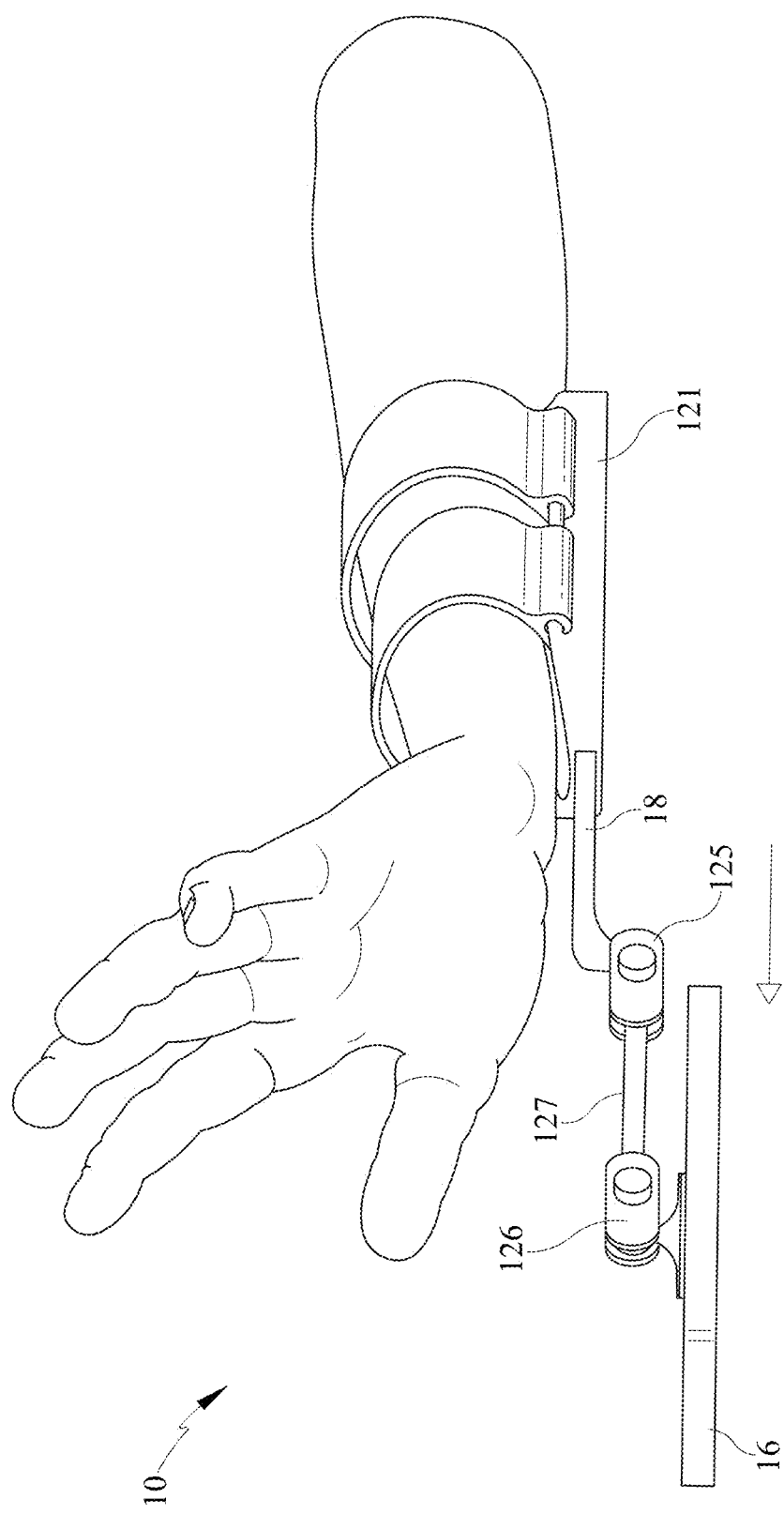
FIG. 7D depicts the embodiment of FIG. 1, now fully unfolded, with horizontal extension via further motion of the user to extend the electronic device for better viewing by the user.
Figure 7E:
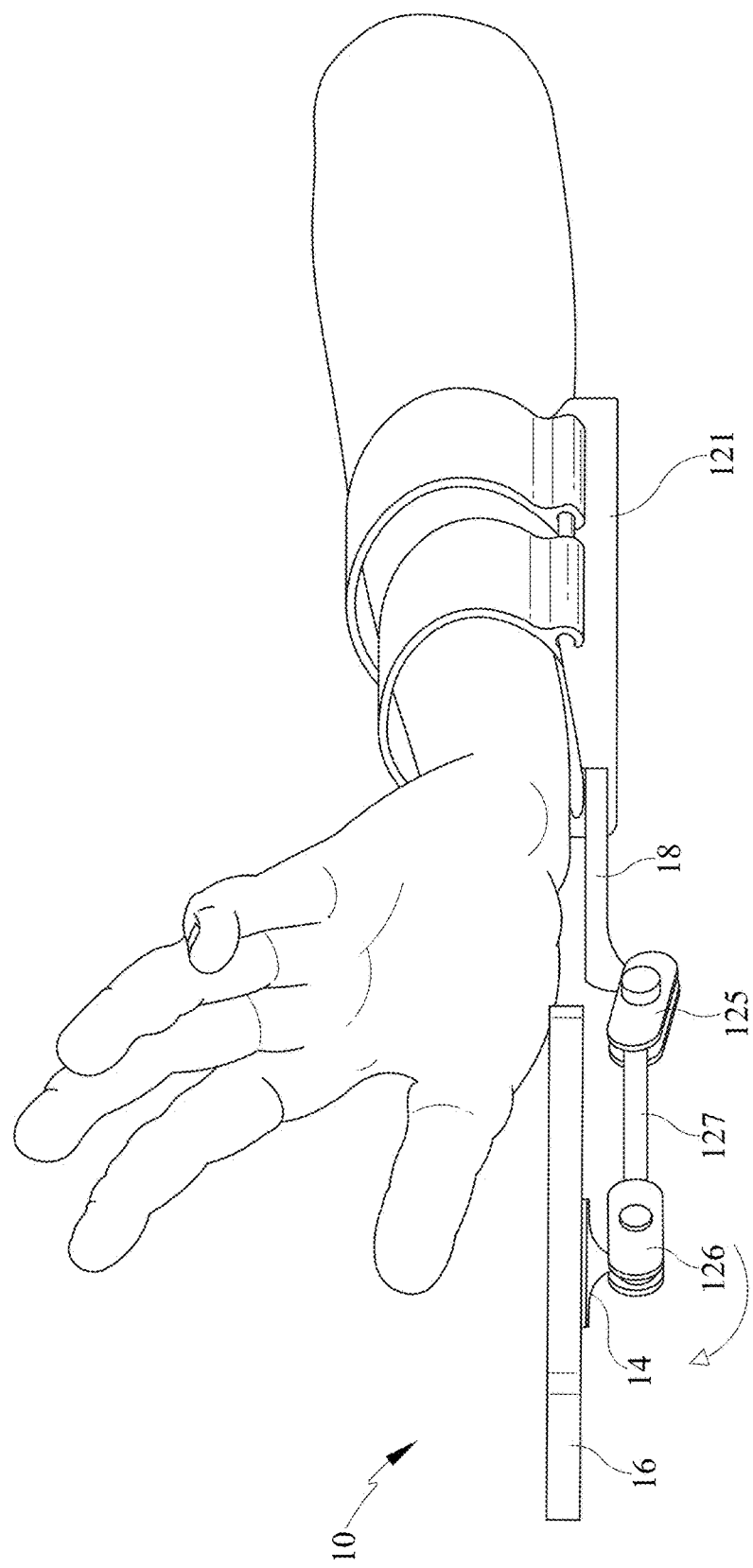
FIG. 7E depicts the embodiment of FIG. 1, partly extended, now with a pitch adjustment to orient the electronic device upward, for better viewing by the user.
Figure 7F:
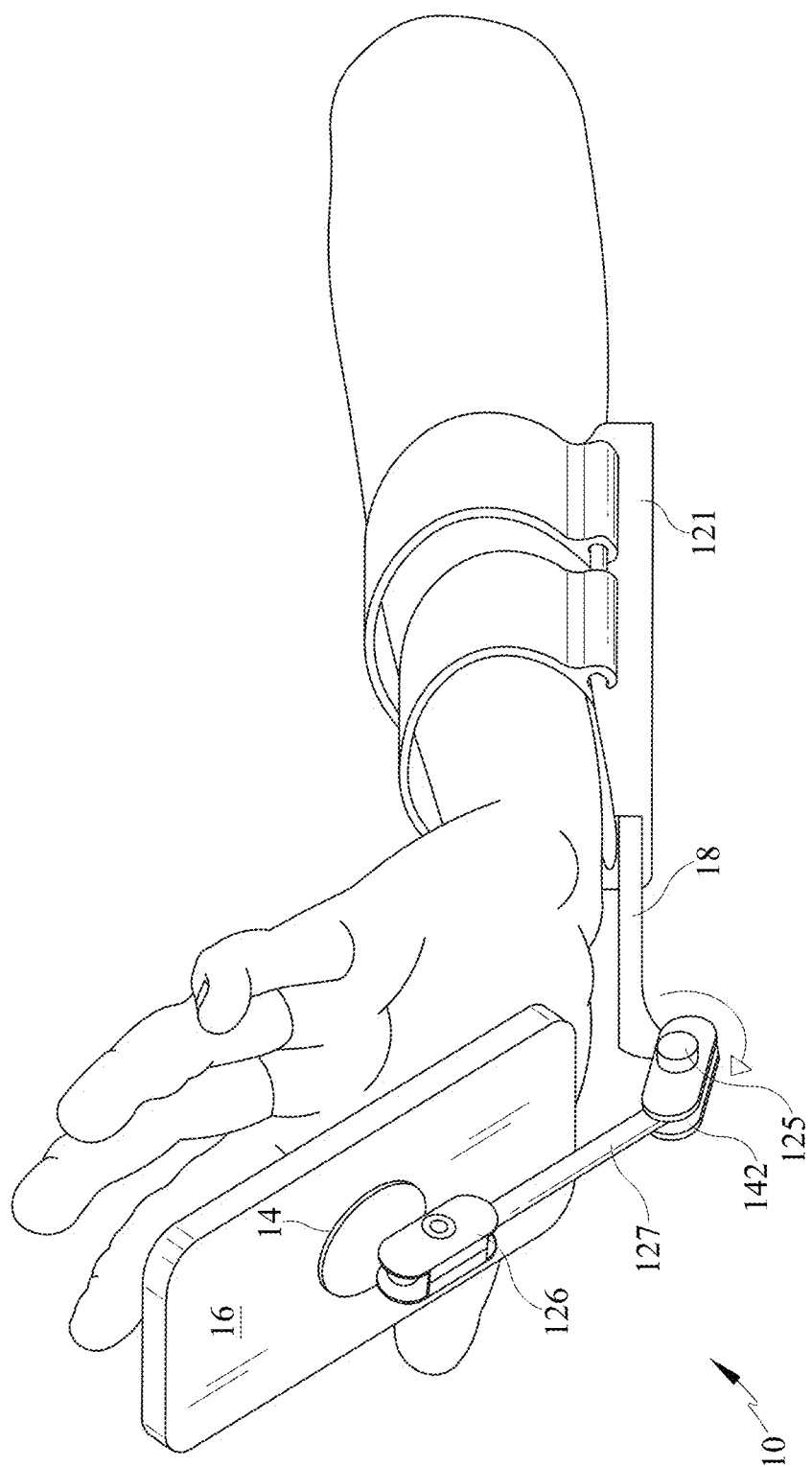
FIG. 7F depicts the embodiment of FIG. 1, partly extended, now with a pitch adjustment to the orientation of the electronic device by the user.
Figure 7G:
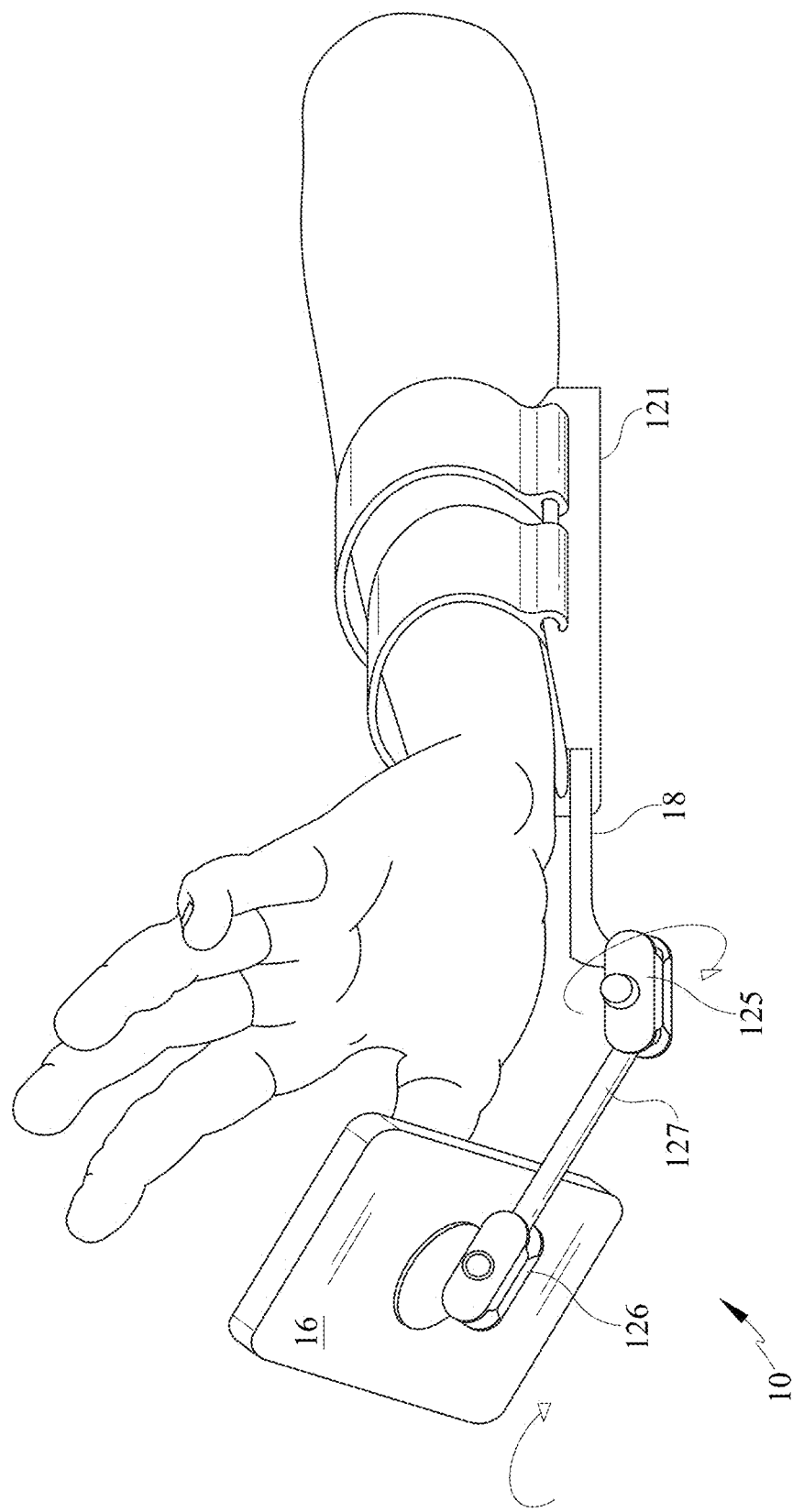
FIG. 7G depicts the embodiment of FIG. 1, partly extended, now with a yaw adjustment to the orientation of the electronic device by the user.
Figure 7H:
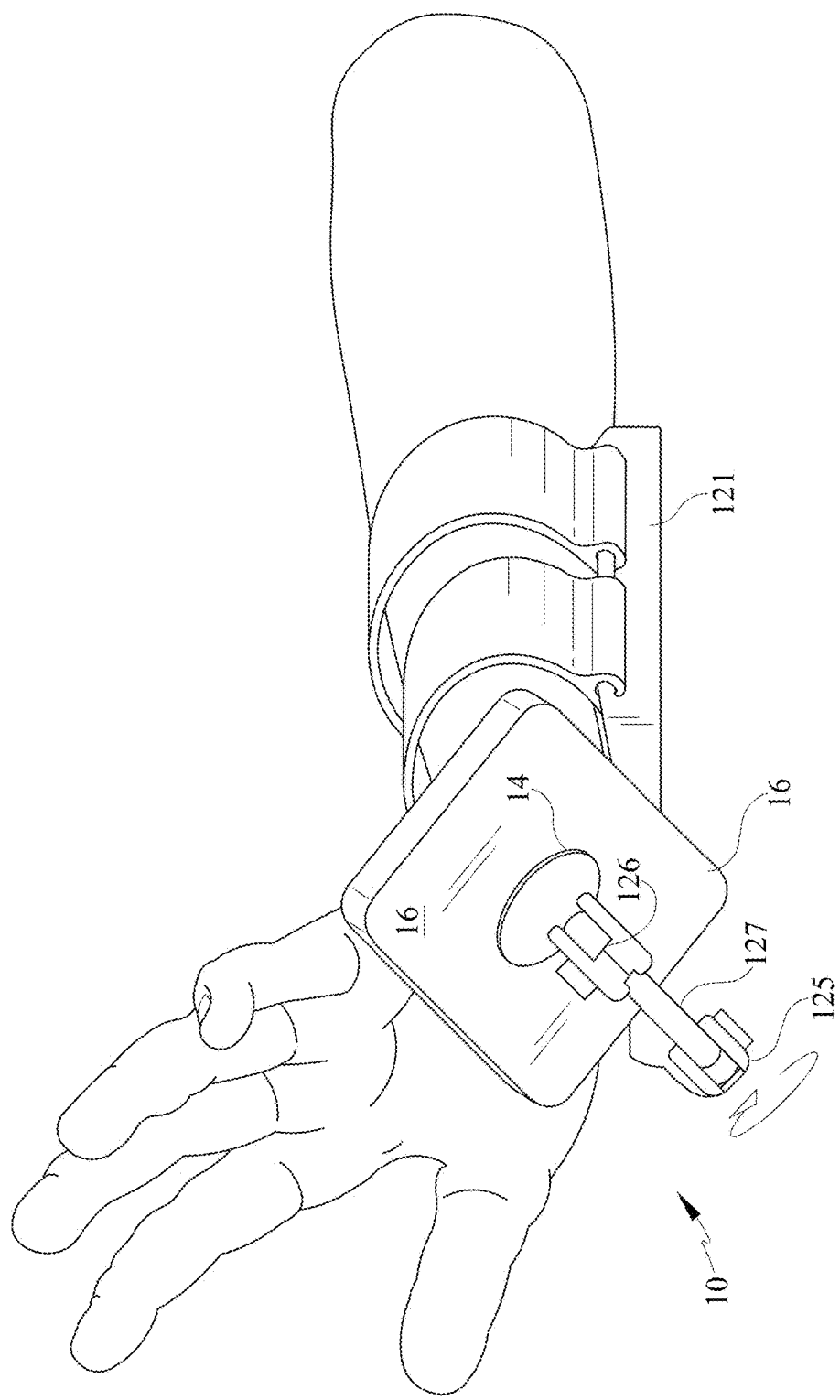
FIG. 7H depict the embodiment of FIG. 1, partly extended, now with a further yaw adjustment to the orientation of the electronic device via wrist motion of the user.

Additional orientations and movement are depicted in FIGS. 7A-7H. The mobile electronics device begins at rest on the user's arm in FIG. 7A, in a folded-up position. In FIG. 7B, the user has flipped an arm or a wrist and achieved about a 90-degree unfolding or pitch movement, shown by the arrow, while FIG. 7C depicts further unfolding to a 180-degree position. Note that as shown, movement of more than 180-degrees is possible, e.g., 225 degrees of more. In FIG. 7D, the user has extended the mobile electronics device using telescopic member 18. In FIG. 7E, the user has again completed a pitch movement, orienting the mobile electronics device upward rather than downward, so the user can see the front of the device. Further small orientation movements are depicted in FIGS. 7F-7H. In FIG. 7F, the user adjusts a pitch orientation, an angle of the mobile electronics device along the sideways axis. This may allow the user to enter data into the mobile computing device. In FIG. 7G, the user has yawed the mobile electronics device to the right using a hand movement about double ball joint 126. In FIG. 7H, the user has yawed the devices to the left, now using double ball joint 125, another degree of freedom available to the user.

Figure 8A:
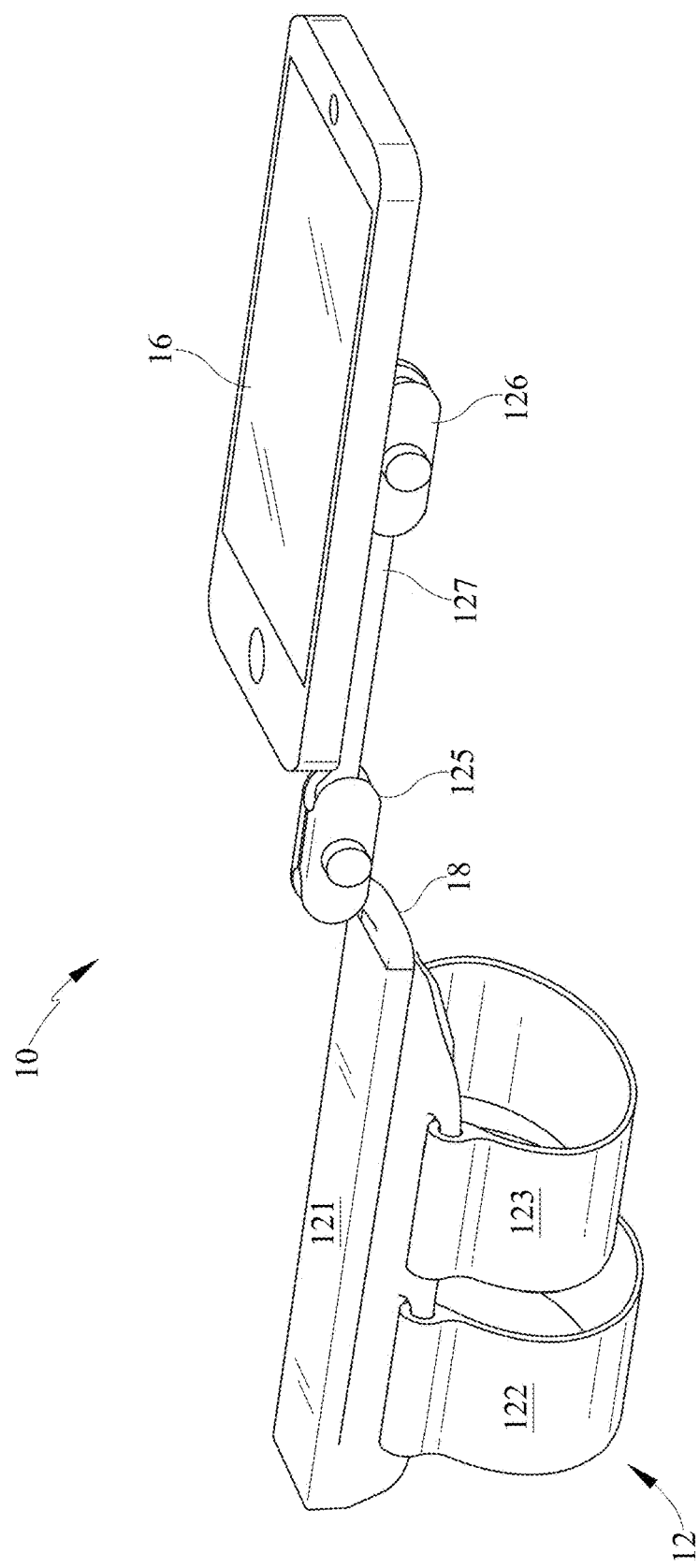
FIG. 8A is a front perspective, unfolded view of the embodiment of FIG. 1.
Figure 8B:
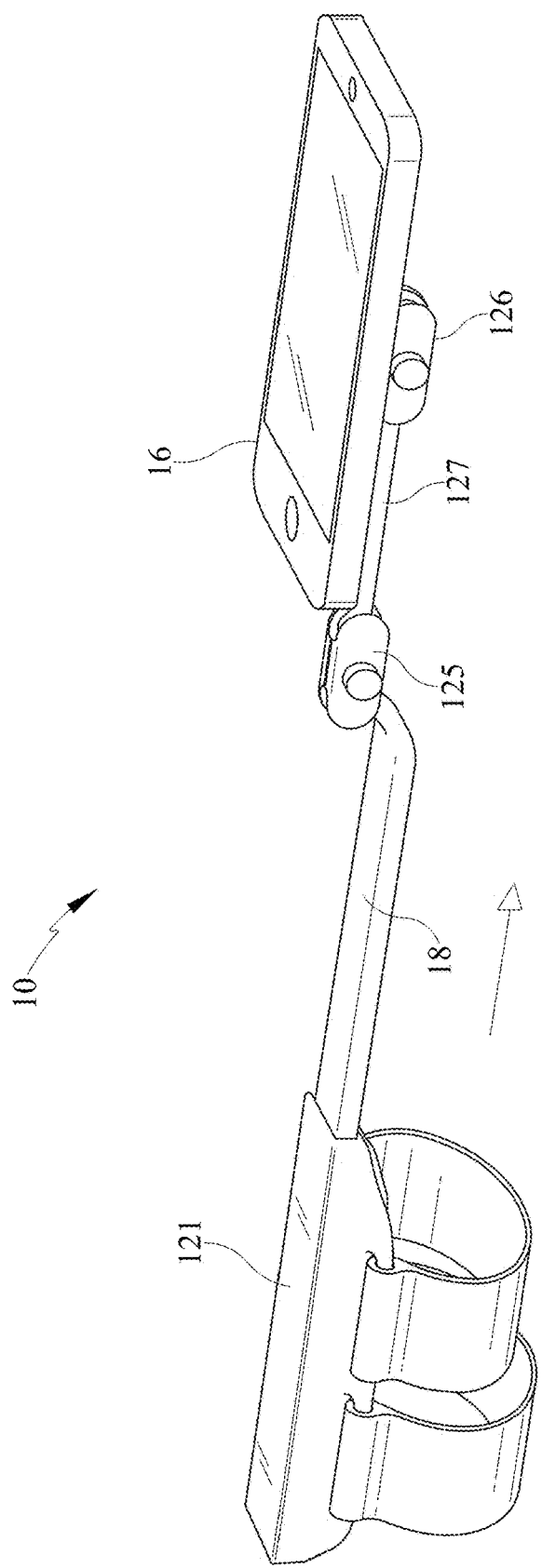
FIG. 8B is a front perspective, fully unfolded, fully extended view of the embodiment of FIG. 1.

FIGS. 8A-8C depict closer views for better visualization of the robotic arm. In FIG. 8A, robotic arm 10 with body support member 12 are shown with mobile electronic device 16 in fully unfolded mode, with the mobile electronic device at about a 180-degree to the support member. In FIG. 8B, telescopic member 18 is at full extension and in FIG. 8C, the user has made a pitch adjustment via double ball joint 125 so that the extension and the mobile electronics device 16 are oriented upwardly, to the user can speak and listen or otherwise interact with the mobile electronic device.

Figure 9A:
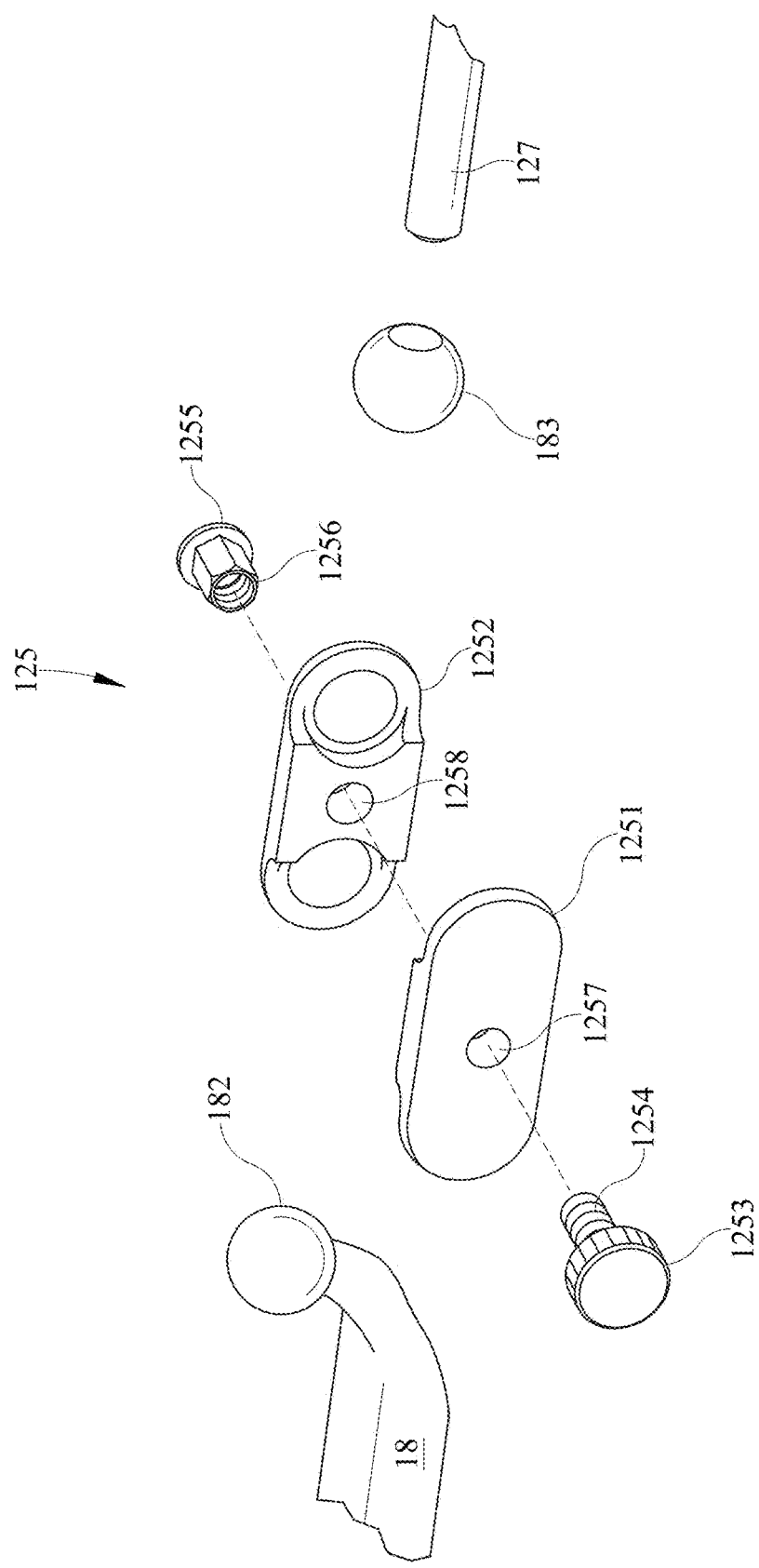
FIGS. 9A-9B are exploded views depicting components of the ball joints used in the embodiment of FIG. 1 to enable movement along various axes of motion.
Figure 9B:
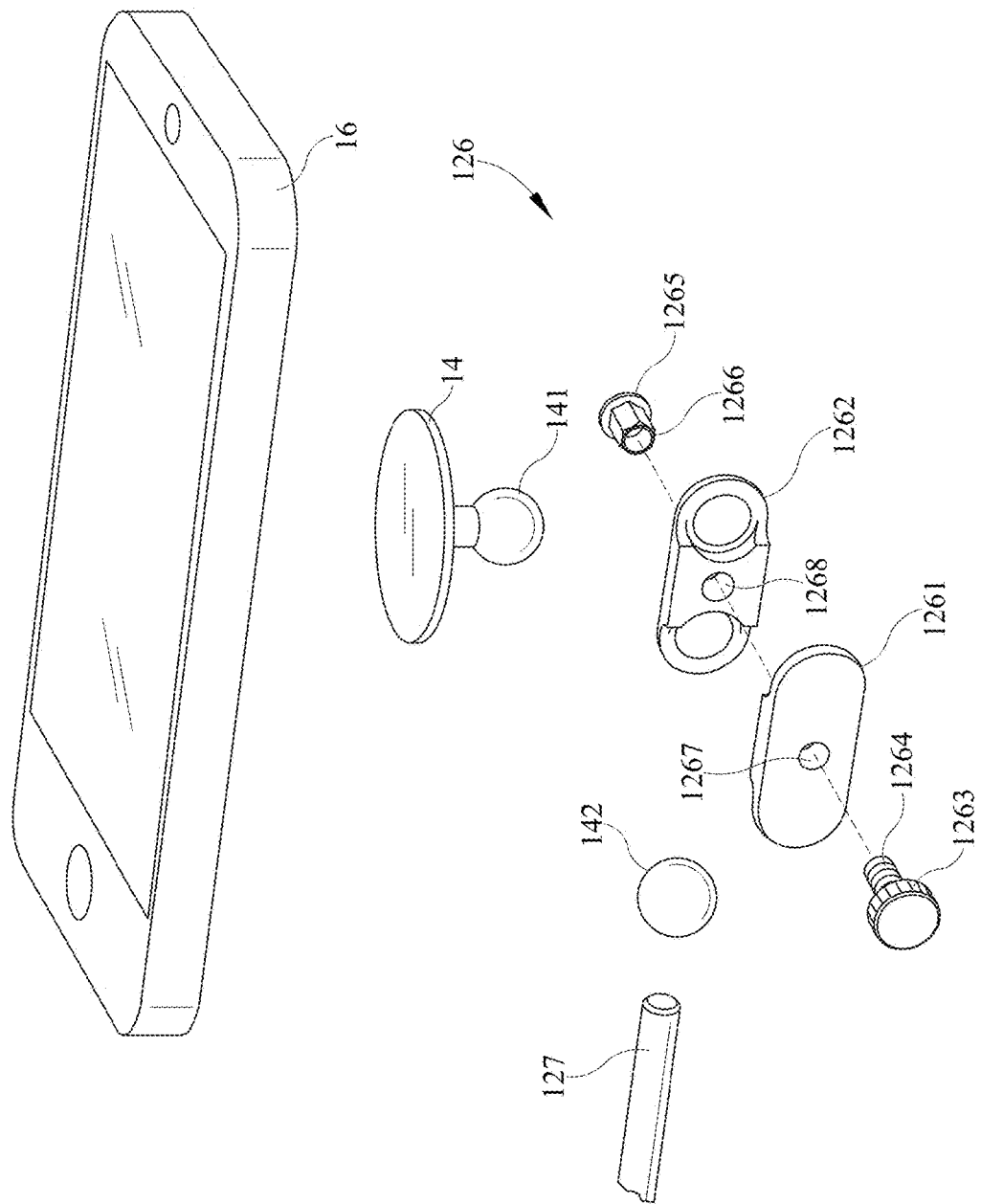

FIGS. 9A-9B depict close-up, exploded views of double ball joints 125, 126. In FIG. 9A, double ball joint 125, nearer the robotic arm, is seen to include left and right housing portions 1251, 1252, each with an orifice 1257, 1258 for fasteners 1253, 1255. Double ball joint 125 also includes ball 182 from telescopic member 18 and ball 183 from extension member 127. Male fastener 1253 includes a threaded portion 1254 for interfacing with a tapped portion 1256 of female fastener 1255. Double ball joint 125 is assembled by capturing balls 182, 183 when the housing halves 1251, 1252 are assembled by inserting the threaded portion 1254 of male fastener 1253 through orifices 1257, 1258 and into the threaded portion 1256 of female fastener 1255. If the fasteners are assembled tightly, if may be more difficult for the user to use the ball joints for roll, pitch and yaw movements. If the fasteners are assembled more loosely, it may be more difficult for the user to control the desired movements. A happy medium is recommended, per the user's desires. As noted, more sophisticated ball joints and housings may be used that allow better control of the forces and movements of the user.

FIG. 9B depicts similar double ball joint 126, which is used closer to the mobile electronics device. Double ball joint 126 includes ball 141 from the electronic device support member 14 and ball 142 from the extension member 127. Male fastener 1263 includes a threaded portion 1264 for interfacing with a tapped portion 1266 of female fastener 1265. Double ball joint 126 is assembled by capturing balls 141, 142 when the housing halves 1261, 1262 are assembled by inserting the threaded portion 1264 of male fastener 1263 through orifices 1267, 1268 and into the threaded portion 1266 of female fastener 1265. Tightening the fasteners 1263, 1265 makes rotational movement more difficult while fasteners that are assembled more loosely may be difficult to control.

Figure 10A:
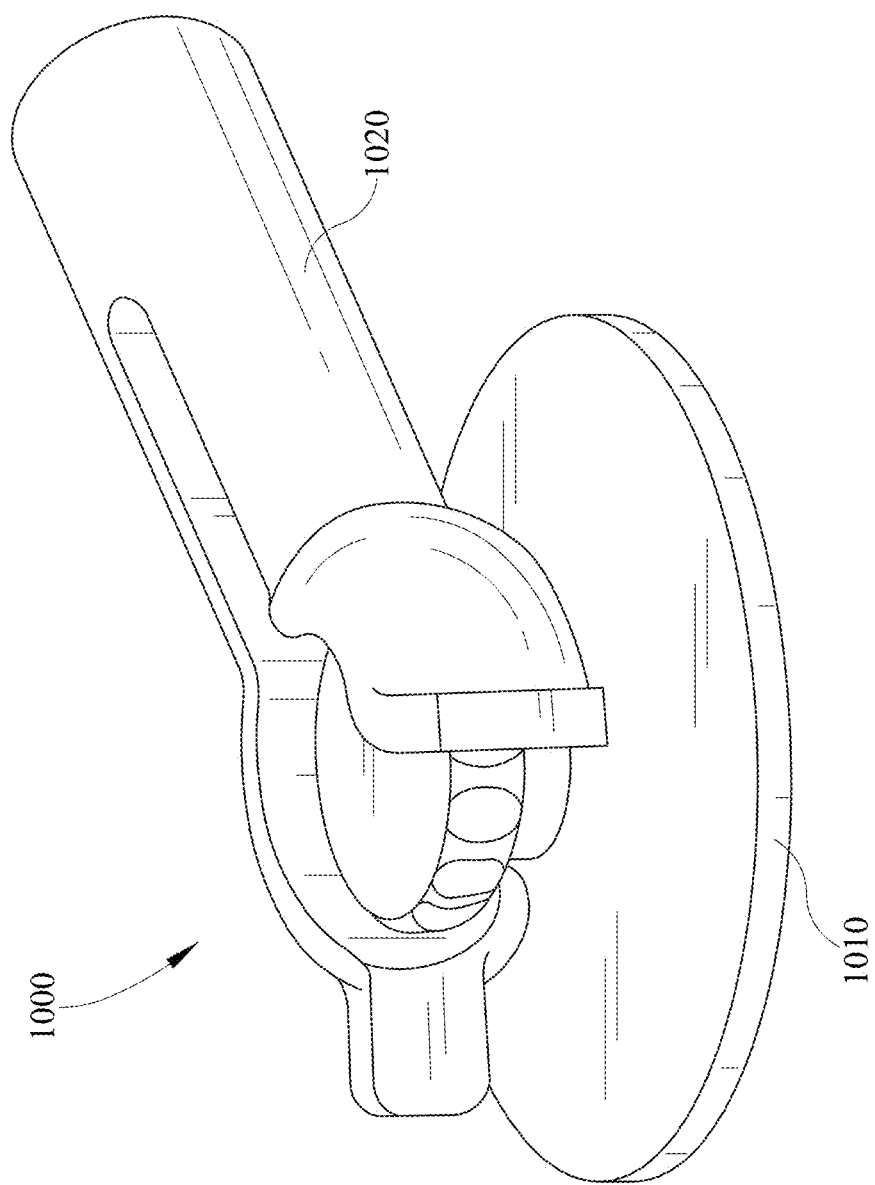
FIGS. 10A-10C are alternate components for joining a user electronic device to a robotic arm.
Figure 10B:
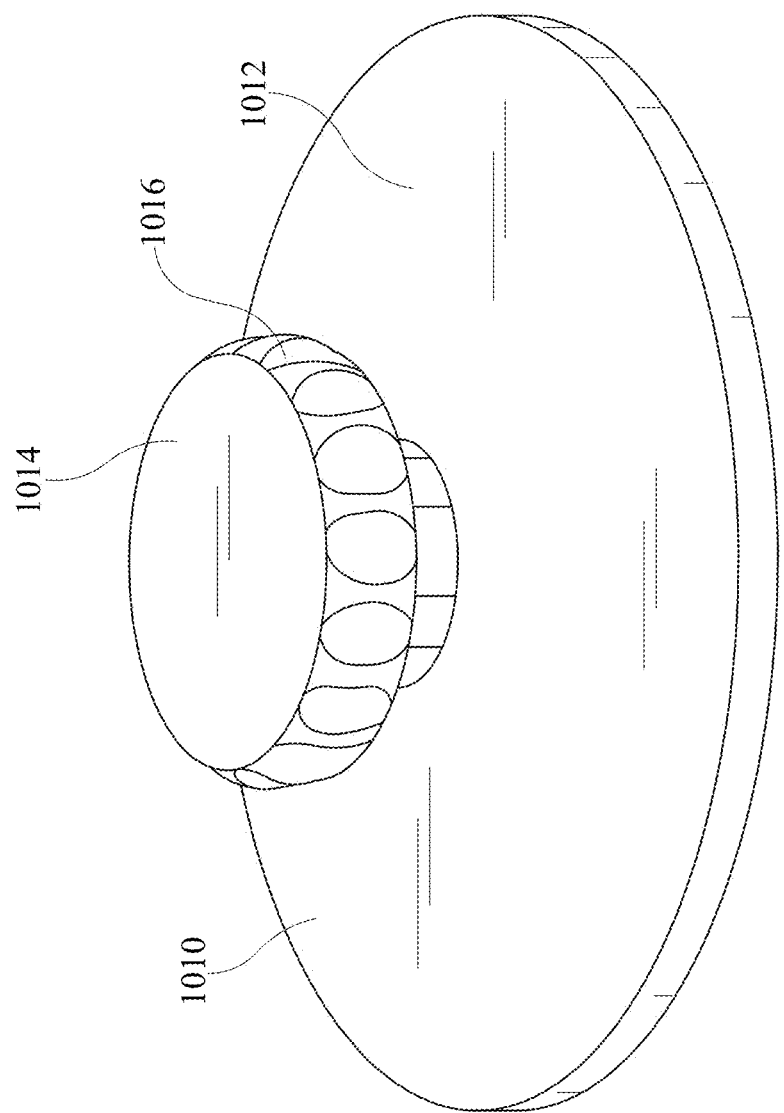
Figure 10C:
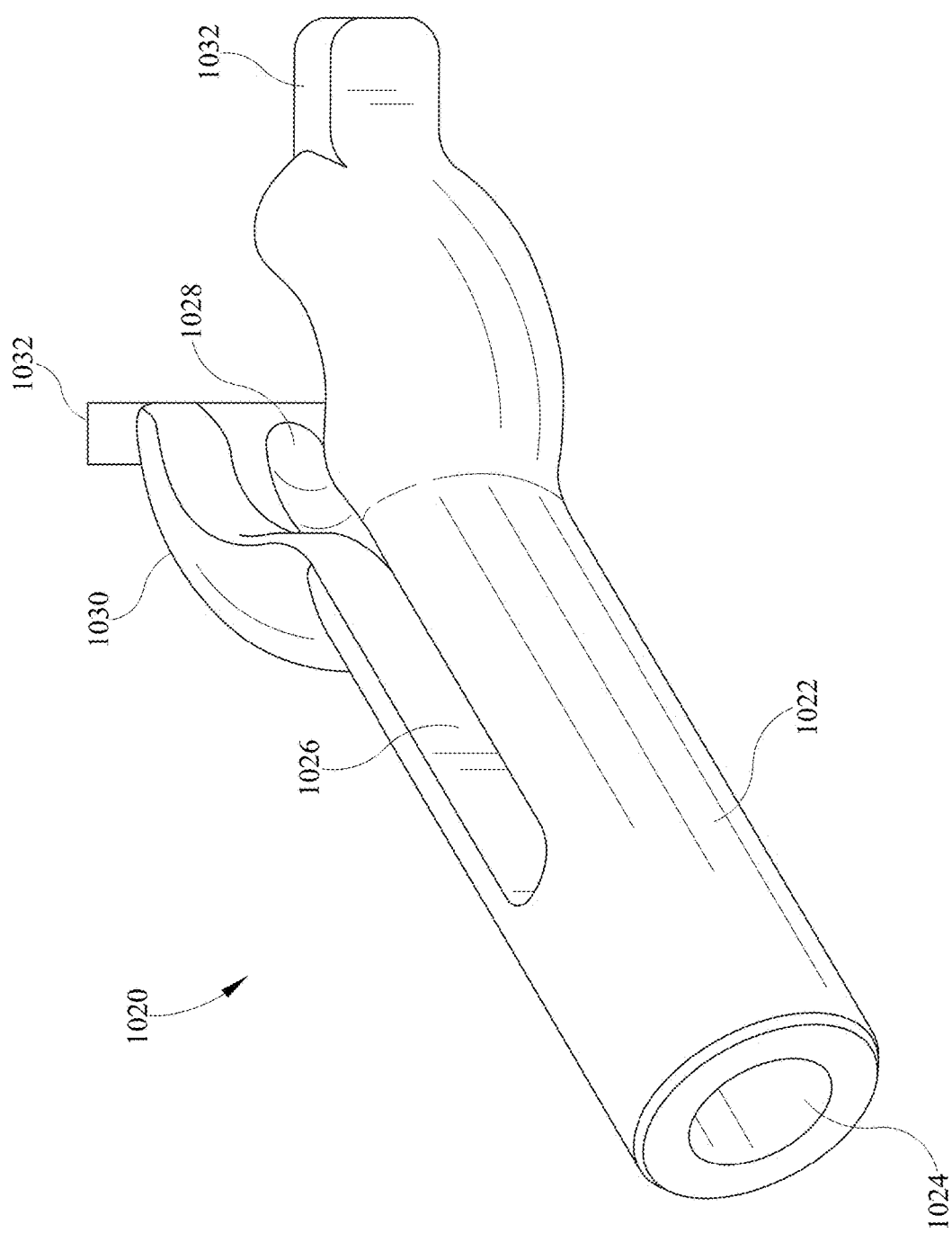

The robotic arm depicted here is not the only embodiment that may be used. A few variants are depicted in FIGS. 10A-10C. A mobile device holder 1000 includes a device interface 1010 and an extension member 1020. Extension member 1020 may interface with a ball joint or other holder or support as desired. In this embodiment, and as shown in FIG. 10B, device interface 1010 includes a flat device securing portion 1012 for direct to connection to a mobile electronic device of a user. The interface 1010 also includes a joining portion 1014 for connecting to the extension member 1020 and a gripping portion 1016 with a knobby or gripping surface for mating to a similar gripping portion 1028 of the extension member depicted in FIG. 10C. As shown in FIG. 10C, the extension member 1020 includes an extension barrel 1022, an inner surface 1024, 1026 and outer surface 1030. Extension member 1020 also includes, in this embodiment, extension wings for easing assembly of extension member 1020 to device securing portion 1012 depicted in FIG. 10B.

Figure 11:
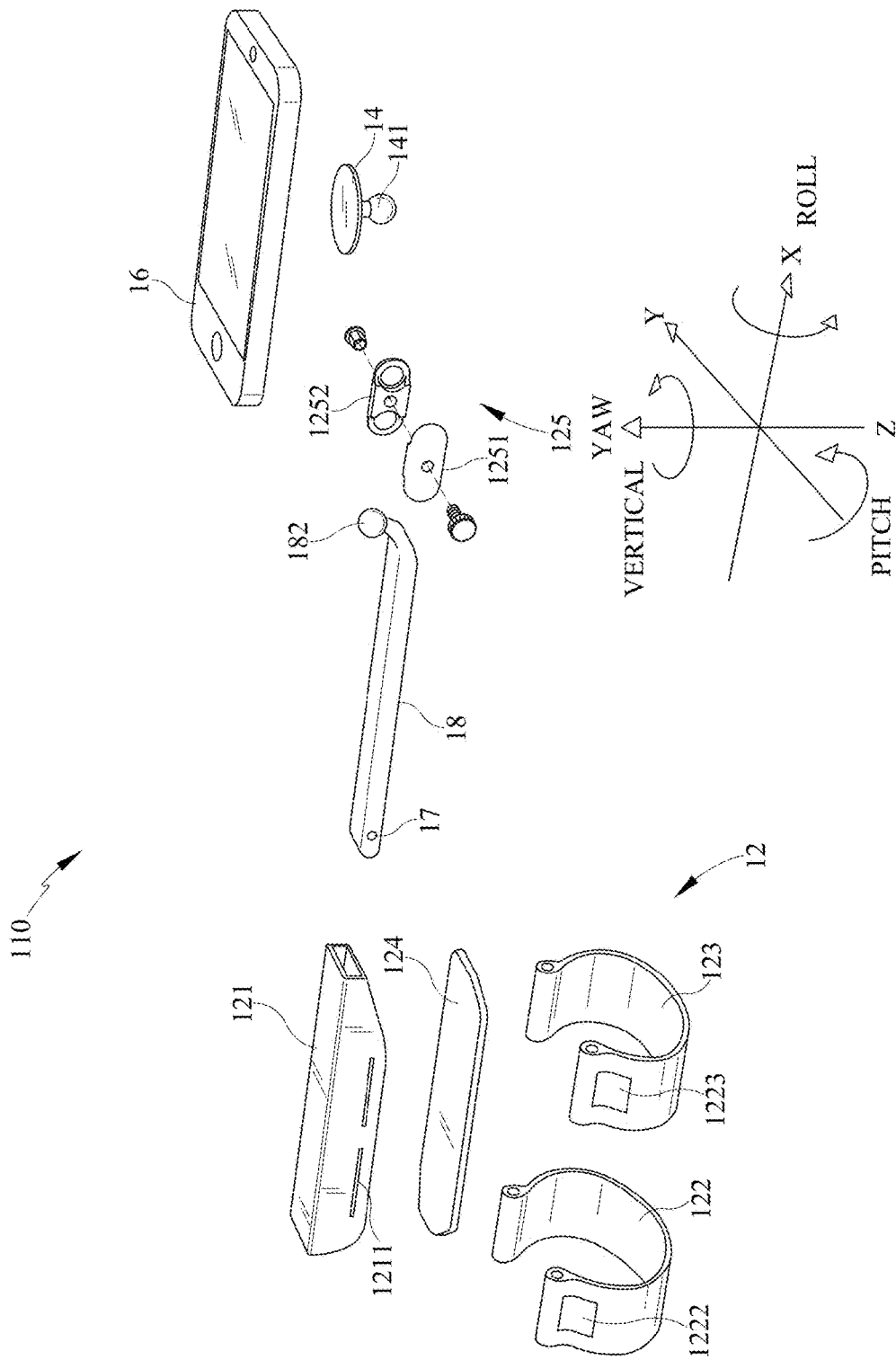
FIG. 11 is an alternate embodiment or an exemplary robotic arm for grasping, extending and viewing an electronic device.

In an alternative illustrative embodiment, a simpler embodiment is shown in FIG. 11. In this embodiment of a robotic arm 110, there is a single double ball joint, between the telescopic member and the mobile electronic device support member. In other words, the extension member is not used in this embodiment. Rather, the single double ball joint movably connects the telescopic member to mobile device support member as explained below. FIG. 11 shows the components of FIG. 1 that are not used in this embodiment 11. All other components of FIG. 1 are used in this embodiment. These components retain the names and numerals and perform the same function as like components in FIG. 1. Robotic arm 110 is designed for holding a device, such as a mobile electronic device 16. Robotic arm 110 includes a body support member 12, a mobile electronic device support member 14 and a telescopic member 18. The body support member 12 is configured for attachment to a body, such as an arm. Body support member 12 includes an outer sleeve 121 and large and small body support bands 122, 123. The body support bands 122, 123 connect to straps 1121 of the body support sleeve each of which is movably attached to the body support sleeve with a pin therethrough (not shown) in engagement with recesses in the body support sleeve (not shown). Another end of the body support bands 122, 123 thread through openings 1211 in body support member and fold back. Hook-and-loop fastener hooks 1222, 1223 on an end portion of the body support bands affixes to hook-and-loop loops located on each of the body support bands 122, 123 to allow the body support member to be firmly held to the arm of the user. Body support sleeve pad 124 may be used to cushion the arm of the user adjacent and within the body support sleeve 121. The telescopic member 18 includes a main portion and a ball 182 pivotally associated with a first (and only) double ball joint 125. In this embodiment, the other ball 141 in double ball joint 125 is associated with the electronic device support member 14. Electronic device support member 14 interfaces directly with mobile electronic device 16 via an adhesive or other way to adhere fixedly to the user's mobile electronic support device. This embodiment is simpler but retains much of the freedom of movement of the embodiment of FIG. 1. As depicted in the figures, a tool, such as a tool for multi-positioning and holding a device is disclosed. The tool includes a body support member, a telescopic member, and a device support member. The body support member is configured for attachment to a body. The telescopic member includes a portion that can telescope or extend outward from the body support member. The telescopic member also includes a ball suitable for allowing pivoting of a ball joint around the ball. The ball itself, discussed above with reference to FIGS. 1, 9A and 9B, is fixedly attached to the outer or distal end of the telescoping member but is pivotally attached to the first ball joint 125. The opposite end of the first ball joint 125 is attached to the extension member 127, at a proximal end of the extension member. The opposite or distal end of the extension member 127 is pivotally attached to a second ball joint 126. Thus, the extension member has almost complete freedom to rotate or pivot in any direction desired by the user.

The second end of the second ball joint, near the user's mobile electronic device, is attached to the ball that is fixedly connected to the mobile electronic support member, i.e., the device that attaches directed to the user's mobile phone, smart phone, or other mobile electronic device. The device support member includes a support element configured for attaching to the user's device and an attitude mechanism effective to adjust one or more attitudes between the support member and the extension member previously discussed. The attitude adjustment mechanism includes that ball that is part of both the device support member and the first ball joint. As discussed, this ball can be held more loosely or more tightly, as desired. The attitude adjustment is selected from the group consisting of: a pitch, a yaw, and a roll attitude. The ball joint on the opposite end of the extension member also has these same freedoms and options.

A force applied to the robotic arm or multi-positioning tool is effective to adjust at least one of the pitch attitude, the yaw attitude, the roll attitude and an expansion or contraction of the telescopic member. The applied force may be a body movement or a gesture or powered by motor and pneumatics, for example. It may also be positioned by the hand of a user or another person. The pivoting mechanisms discussed above cause pivoting of the user mobile electronic device about the second double ball joint and also cause pivoting of the extension member about the first and second double ball joints. The telescopic member itself may telescope inwardly or outwardly relative to the body support member under the influence of a force. For example, the telescopic member may be in a withdrawn or collapsed configuration when the first double ball joint or pivoting mechanism pivots the extension member relative to the body support member under the influence of the force. The telescopic member may be in an expanded configuration when the pivoting mechanism pivots the extension member relative to the body support member under the influence of the force.

The attitude mechanisms, or double ball joints, may be adapted to adjust the pitch attitude of the user's mobile electronic device under the influence of a force. The pitch attitude between the telescopic member and the extension member may be adapted to position a clasping side of the body support member toward a face side of the body support member. The telescopic member may be in a collapsed configuration and the influence of the force may further expand the shaft into the extended configuration.

The shaft may be in a partly-expanded configuration and the influence of the force may further collapse the shaft into the collapsed configuration. The attitude mechanism may be adapted to adjust the yaw attitude under the influence of a force. The attitude mechanism may be adapted to adjust the roll attitude occurring under the influence of a force, as discussed above.

A pivoting mechanism may alternatively be a torque hinge configured for adjusting an angular position of the telescopic member with respect to the body support member. The attitude mechanism may include a torque hinge each for adjusting the roll, the pitch and the yaw attitude under the influence of the force. Other suitable mechanical devices may be used, such as single ball joint, U-joints and the like. Each such device allows at least one linear or rotational degree of freedom for the robotic arm or tool for multipositioning and holding a device.

The device support member, attached to the user's mobile electronic device, is configured to rotate or pivot with respect to the body support member by rotational movement of the pivoting mechanism. The user's mobile electronic device also moves, with respect to the user, via sliding movements. For example, a sliding movement may be a forward movement of the telescopic member, the forward movement causing the first and second pivoting mechanisms, the extension member and the device support member to move the body support member and the user's mobile electronic device away from or towards the body support member—and the user.

The telescopic member, and the first and second double ball joints, or pivoting mechanisms, may be configured to move with respect to the body support member by a flip movement. Examples of flip movements are seen in the transitions between FIGS. 6A-6B and FIGS. 7A-7B. The flip movement may be an upward or downward movement of the body support member, caused, for example, by movement of an elbow or wrist of the user. The upward or downward movement may cause extension of the telescopic member or may cause rotation about the first or second double ball joints, or both. The flip movement may then cause the device support member, and the user's electronic device, to move toward or away from the body support member. The flip movement may involve an upward or downward movement of the body support member, the upward or downward movement causing the telescopic member to retract or to expand.

While the foregoing examples have configured the robotic arm of this disclosure situated on the bottom of a user's forearm, the body support member may be situated anywhere on the body of the user. For example, the body support member may be situated on the back of the user's forearm. This will allow the robotic arm and the electronic device to be manipulated in additional ways. For example, a user may manually position the extension member back away from the body support member and position the electronic device so that the user can monitor content on the display of the device while having the bottom of the hands and forearms free for other uses.

Figure 12:
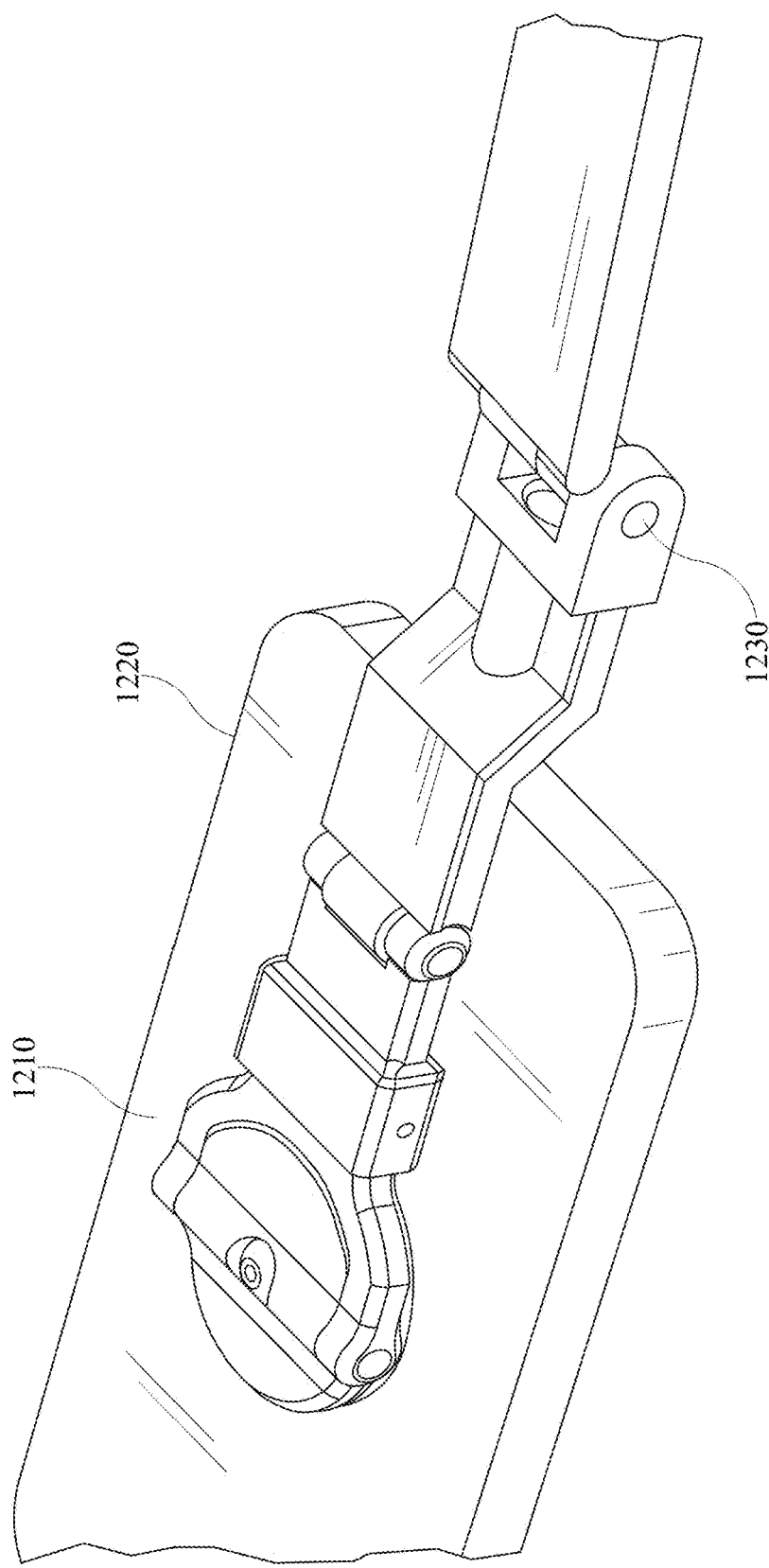
FIG. 12 is an alternative embodiment of this disclosure, featuring an alternative jointed device for attaching to the user's mobile electronic device.
Figure 13:
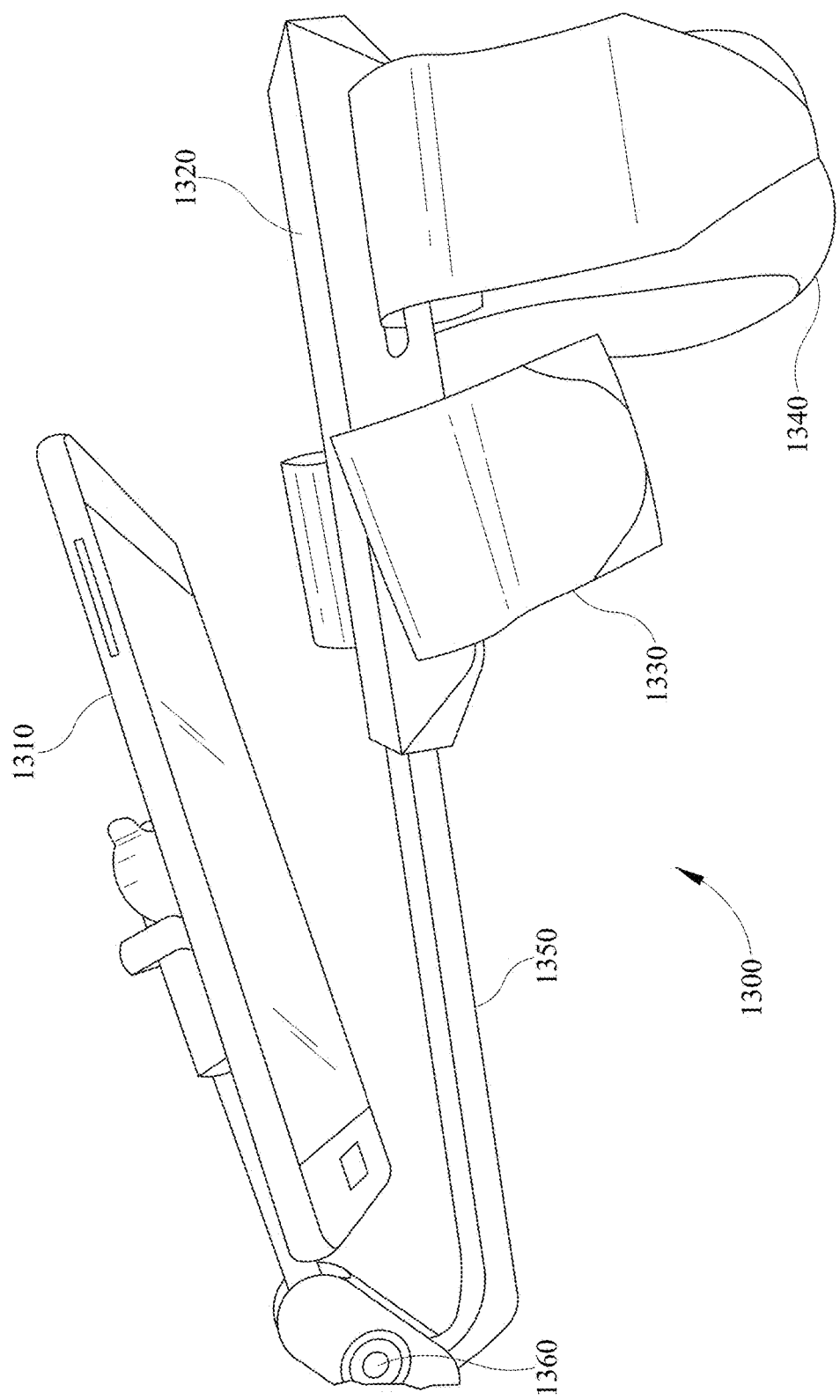
FIG. 13 is an alternative embodiment with a perspective view of a robotic arm.

The device used to attach the extension to the user's mobile electronic device may be as depicted in FIG. 12. The embodiment of FIG. 12 provides for three joints. A first joint 1210, near the point of attachment, allows pivoting about the center of the user's mobile electronic device. A second joint 1220, near the bottom of the user's mobile electronic device, allows the mobile electronic device to stand upright, as the user wishes. The third joint 1230 allows pivoting about an axis parallel to a width of the user's mobile electronic device. Alternatively, another embodiment of a robotic arm 1300 is depicted in FIG. 13. This embodiment is intended for mounting a mobile device 1310 on an arm of a user via a body support member 1320 using the two hook-and-loop bands 1330, 1340 depicted. The telescopic member 1350 can be seen extended in FIG. 13. A single ball joint 1360 attaches the telescopic member to an extension, which then attaches to the user's mobile electronic device.

Applications of the present disclosure are depicted in FIGS. 14A-14F, which disclose a variety of uses for the device. In FIG. 14A, a girl 1400 has mounted the robotic arm 1402 on her arm 1404 for use while riding a bicycle 1406. The robotic arm allows her to check weather or other information as she rides. In this example, the body support member is mounted near her wrist on the back of her forearm. With this disclosure, a robotic arm may be mounted anywhere including on the back of the forearm as shown in FIG. 14A, as well as the lower forearm as in other examples explained above. In FIG. 14B, a policeman 1410 can communicate or receive alerts using a communicator 1412 mounted via a robotic arm 1414 on his or her wrist 1416. In FIG. 14C, a woman 1420 has mounted a robotic arm 1422 on her wrist 1424 and is able to check news or chat with friends using her mobile device 1426. In FIG. 14D, a cook 1430 with a suitably situated robotic arm 1432 can consult a recipe using a mobile device while still using his hands to manipulate lids and covers 1434 while cooking. In FIG. 14E, an archer 1440 has mounted a robotic arm 1442 on his or her wrist 1444 and can better view the target (not shown) via a remote camera, using the video reception capability of his or her mobile electronic device 1446. In FIG. 14F, a user 1450 can read or watch electronic entertainment in bed using his wristmounted electronic device 1452, with the support of the robotic arm 1454.

Figure 15A:
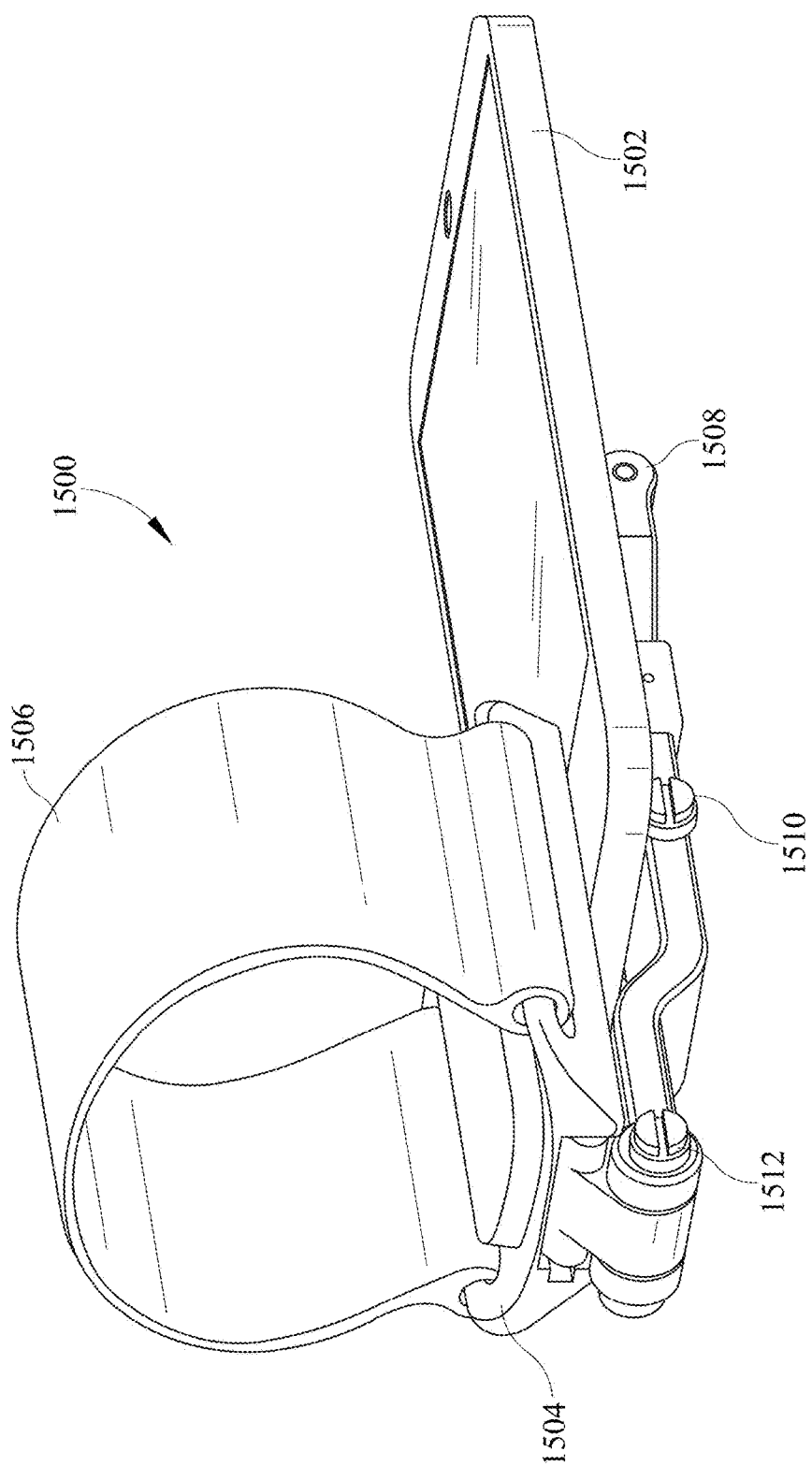
Figure 15B:
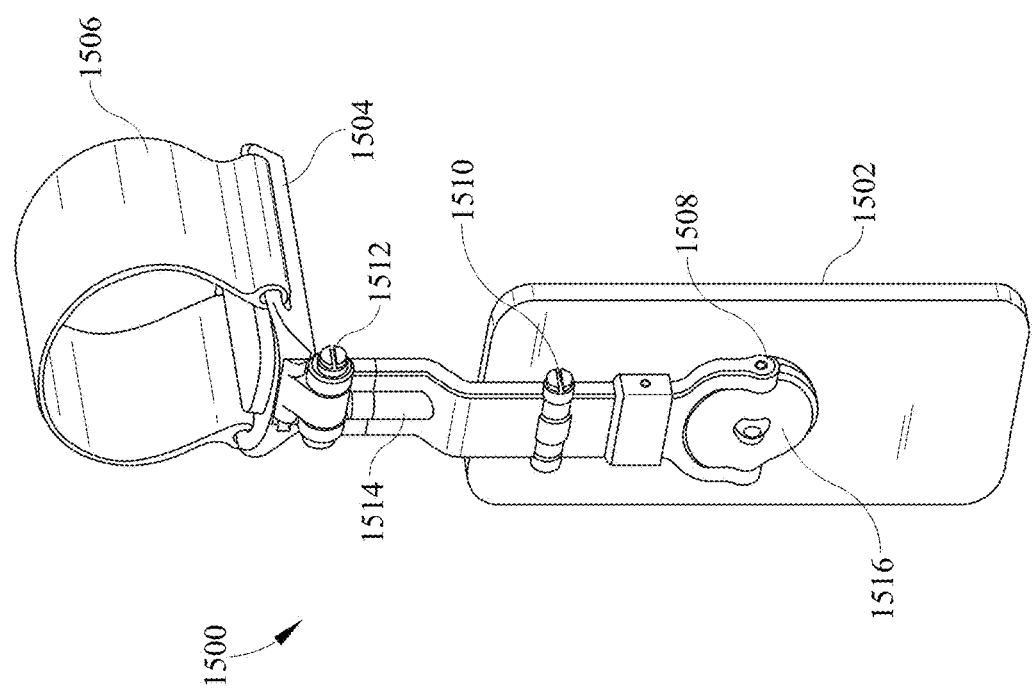
Figure 15C:
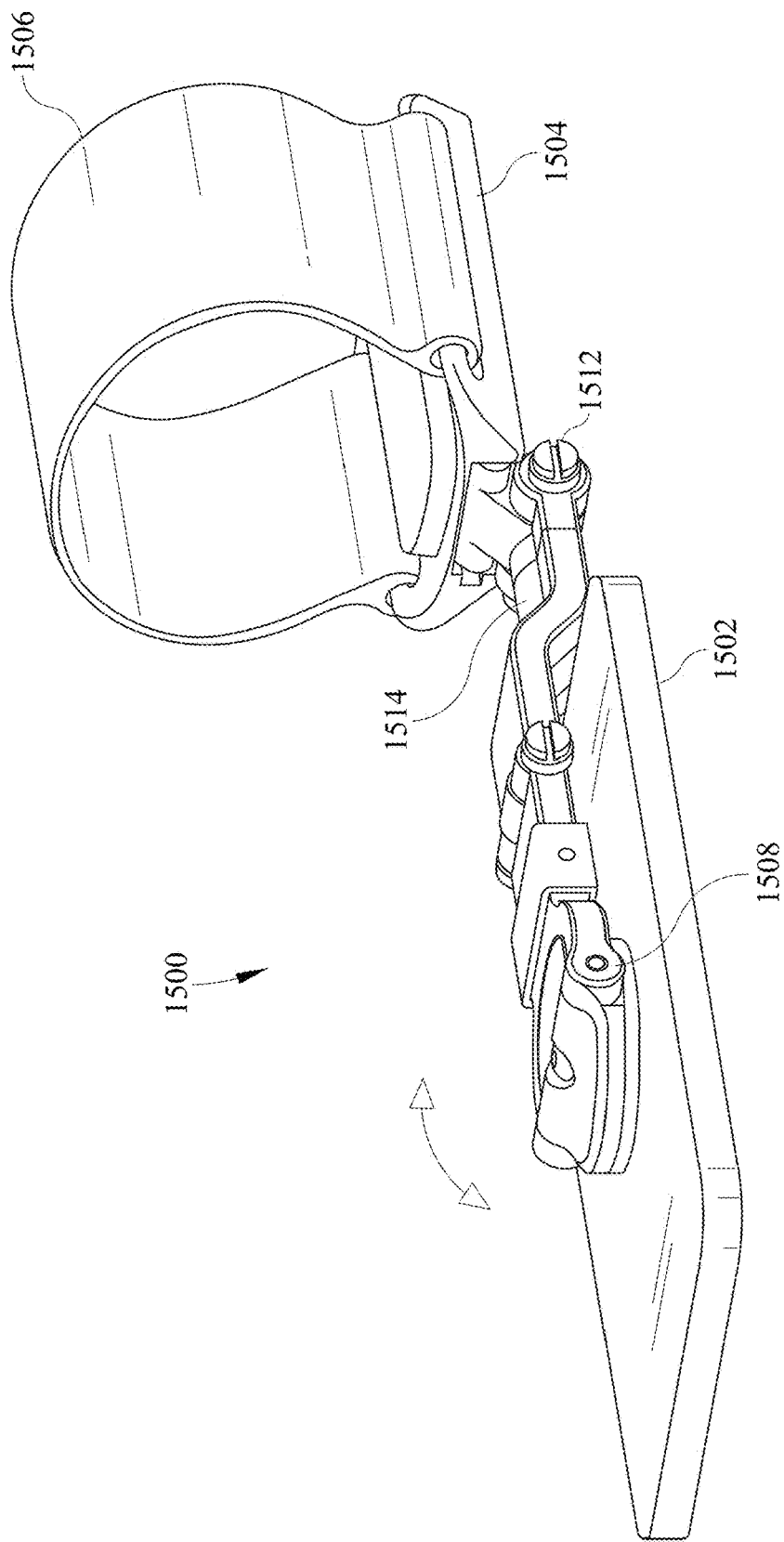

In another embodiment, as shown in FIGS. 15A-15I, a robotic arm 1500 includes three joints and a single extension between the first two joints, counting from the user's electronic device 1502. The robotic arm 1500 includes a body support member 1504 for securing to the user's wrist or other body part via strap 1506. The robotic arm 1500 includes a first rotating joint 1508 on or near the user's electronic device, for convenient orientation of the electronic device, as shown in FIGS. 15B and 15D-H. As shown, for example, in FIGS. 15B and 15C, the robotic arm also includes a mount 1516, for rotatably connecting the robotic arm to the user's mobile electronic device. The first rotating joint 1508 allows rotation or swiveling in a plane, as shown by the arrows in FIG. 15C. Joint 1512 also includes a joint that adds an additional degree of freedom, swivel 1514. In FIG. 15C, the electronic device 1502 can swivel up and down, as shown by the arrows, as allowed by rotating joint or swivel 1514. This swivel allows the robotic arm 1500 to rotate the electronic device 1502, using swivel 1514, to swivel left and right, as shown by the arrows in FIG. 15D.

Figure 15D:
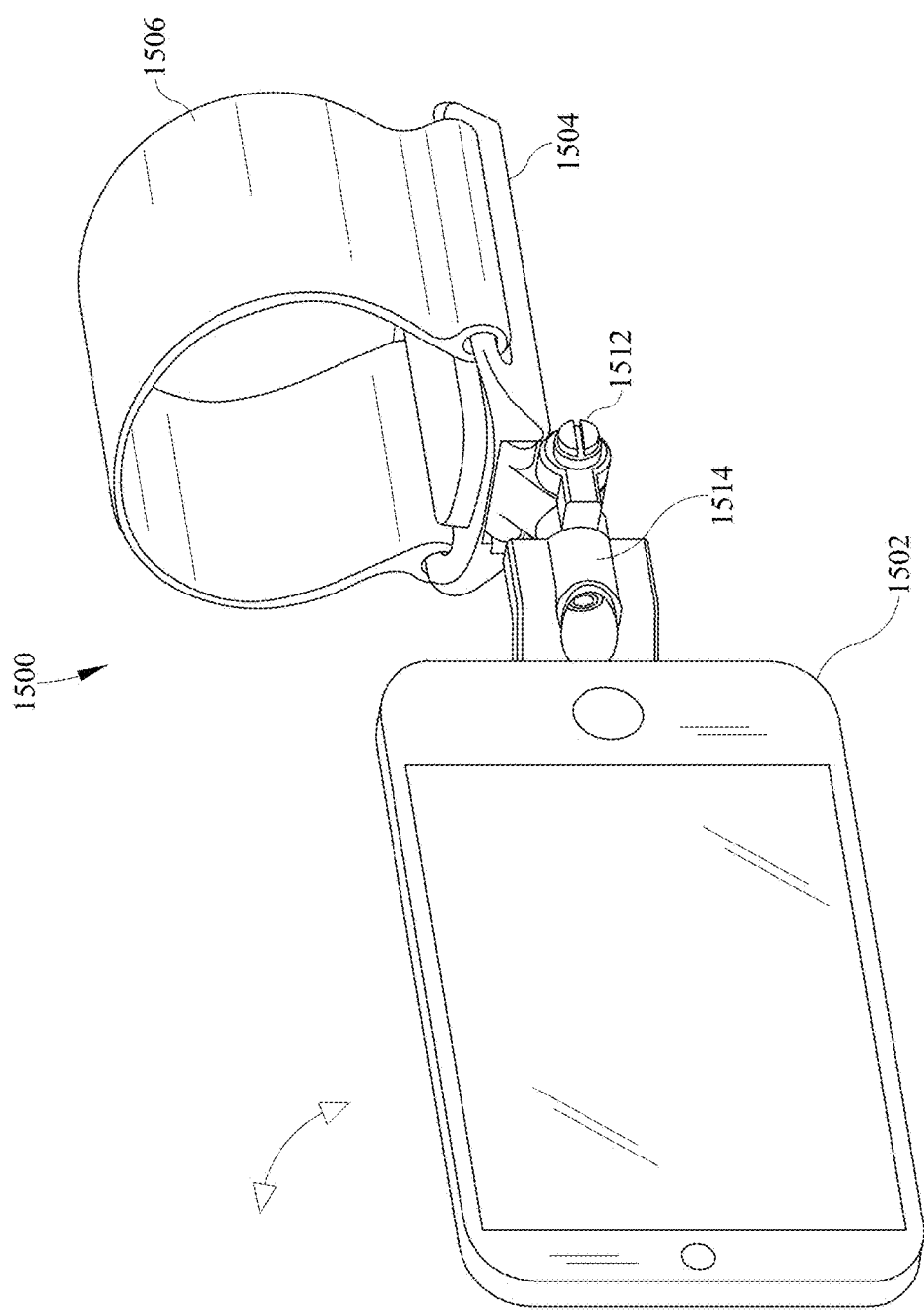
Figure 15E:
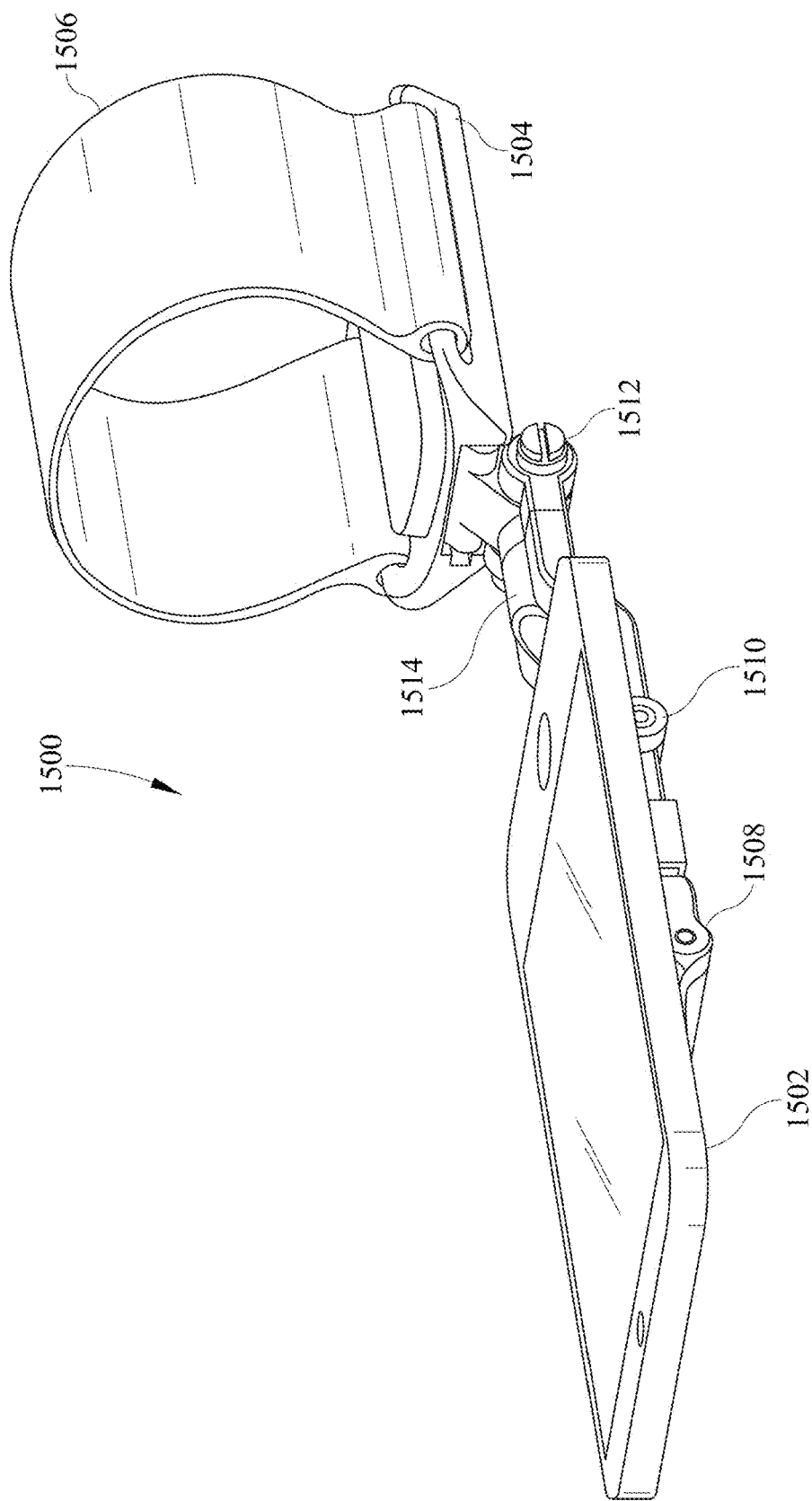
Figure 15F:
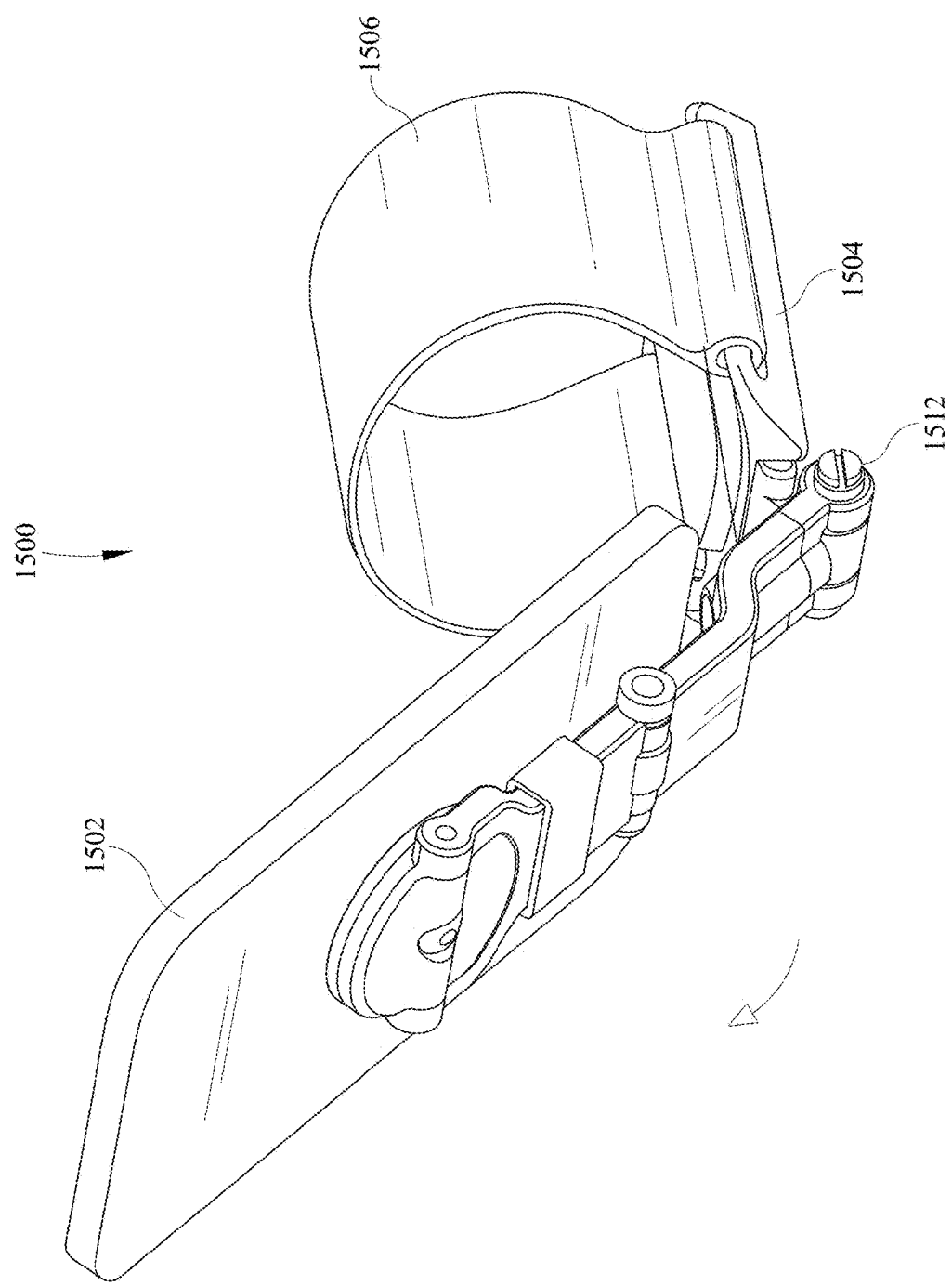
Figure 15G:
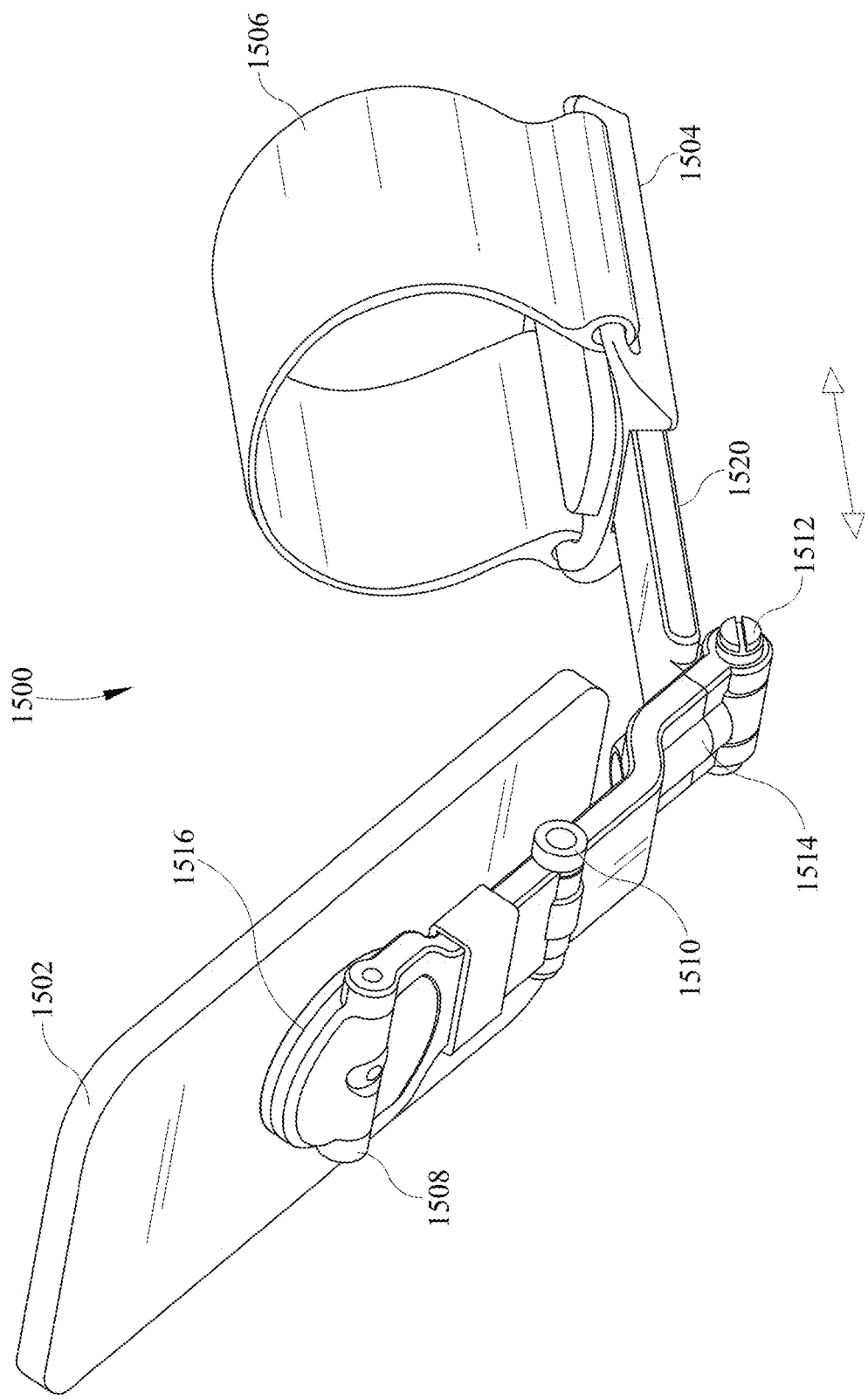
Figure 15I:
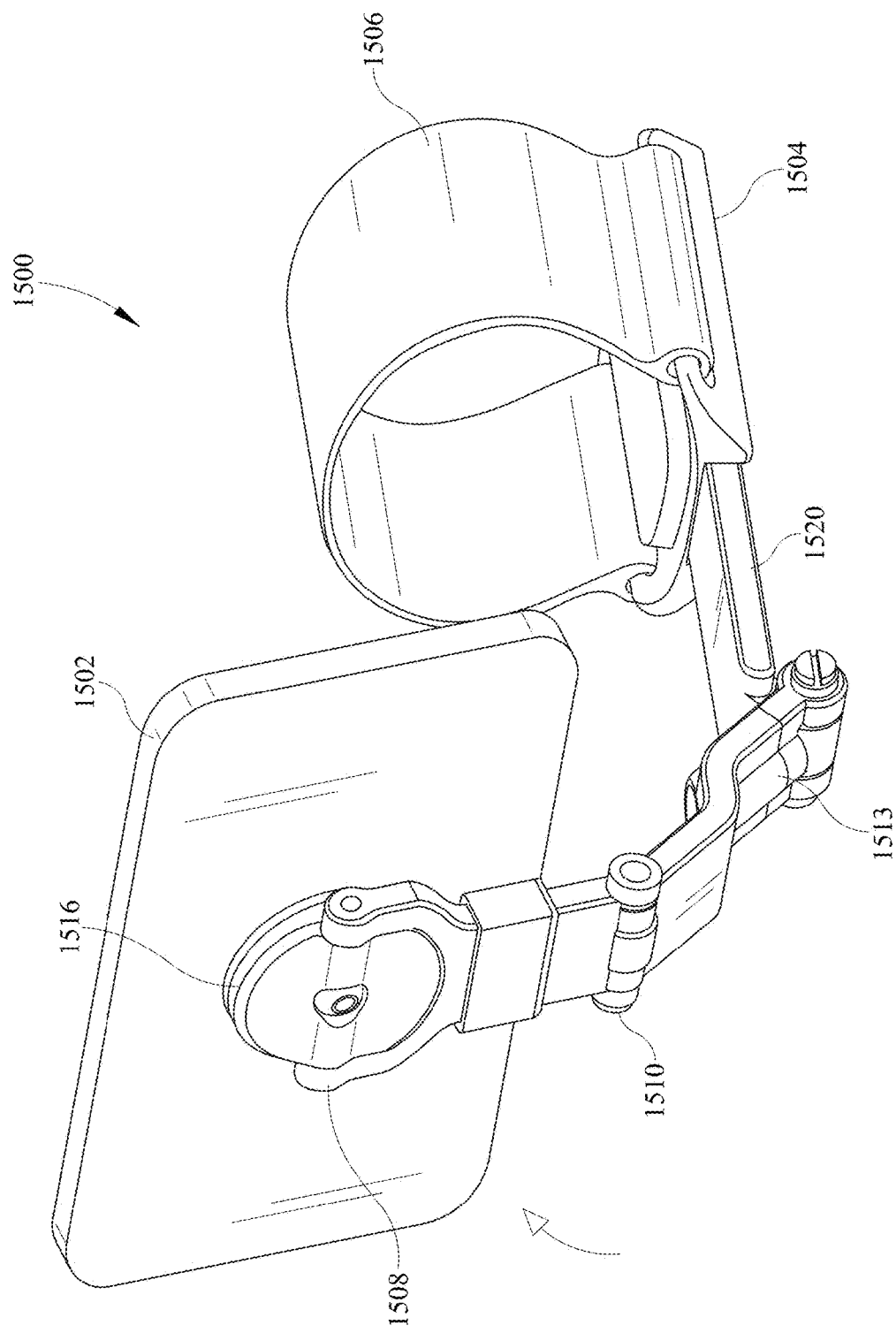

As seen in the sequence of FIGS. 15C, 15D and 15E, the user may rotate the mobile electronic device 1502 through a complete 180-degree sequence, with FIG. 15D as the midpoint. Swivel 1514, shown as part of joint 1512, allows this extra degree of freedom. In FIG. 15F, the other portion of lower joint 1512 allows the user to orient the electronic device 1502 at a desired angle for viewing, as shown by the arrows in FIG. 15F. FIGS. 15G-I also depict an arm extension 1520 extending from body support member 1504. As shown in FIG. 15G, extension 1520 allows the user to extend user mobile device 1502 away from the body support member 1504, as desired for the convenience of the user and as shown by the arrows in FIG. 15G. In FIG. 15H, the extension 1520 is still extended, but the user has now rotated the user electronic device 1502 about ninety degrees using joint 1508, from a vertical orientation to a horizontal orientation. Finally, in FIG. 15I, joint 1510 has been used, per the arrow in FIG. 15I, to orient the user electronic device more squarely with the user.

In other embodiments, body support member 1504 may be tapered inwardly toward the user's arm for ergonomic reasons and for low-profile storage. For example, the body support member may be thicker near the holding and deploying end, nearer the user's wrist, which may be called the distal end, and thinner at the other end, closer to the user's elbow, which may be termed the proximal end. The thickness in the taper or narrowing may be from zero to twenty-two degrees. Other tapers may be used. The slot or opening that receives the extension 1520 may remain constant in its dimensions. Alternatively, the slot and the extension may both be tapered inwardly, thinner on the inside or proximal end, thicker on the outside or distal end. In other embodiments, e.g., FIG. 15H, hinge 1510 may be eliminated so that member 1513 extends all the way to the electronic device 1502. In other embodiments, joint 1508 and its swiveling capability may be eliminated, and the smart phone or electronic device directly attached to extension member 1513 by an adhesive mount, described above.

The mount 1516 may also be connected to member 1513 via any of a number of attachment mechanisms including a binding post, a magnet, or a female button mechanism. These attachment mechanisms may be integrated into one or both of a terminal end of the extension member and the mobile device; the coaction of which allows a coaction between the mobile device and extension member according to the teachings of this disclosure.

To further illustrate, the attachment to the mobile device to the extension member may be selected from the group consisting of an adhesive, a magnet, a suction cup, a male female coupling button mechanism, and a casing for the mobile device. For example, a casing may be provided with any of the foregoing or other attachments for use in attaching the mobile device to the extension member.

In another embodiment, a casing for a smart phone may be provided with any of the above described or other mechanisms for attaching the smartphone to element 1513.

In alternative embodiment, the device may include element 1516 and go without element 1508. In the latter case, element 1513 may extend directly to element 1516. In the former case, element 1513 may extend to both element 1516 and 1508.

Figure 16A:
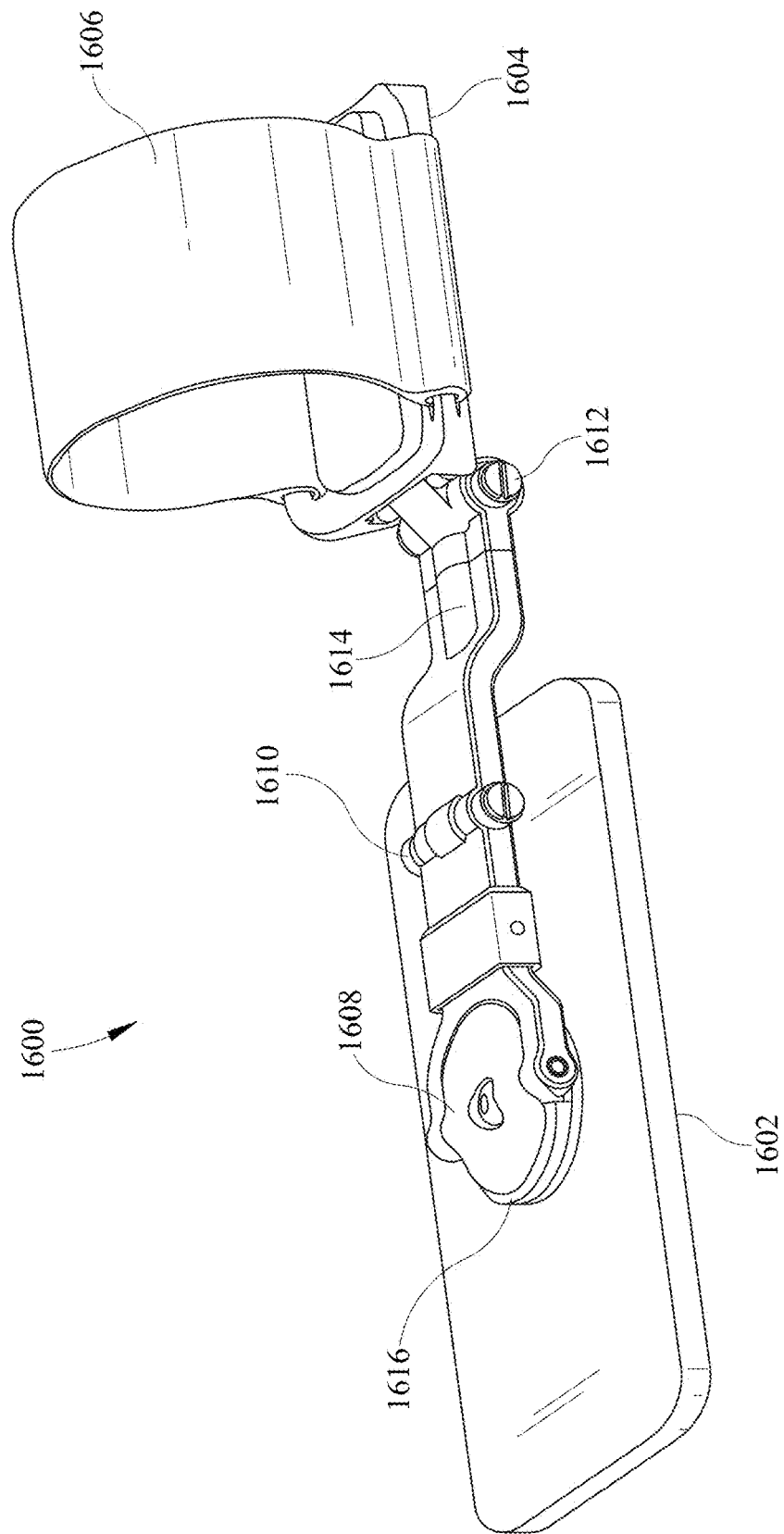

Another embodiment of the exemplary robotic arm is depicted in FIGS. 16A-16E. This embodiment also includes numerous joints, and an extension that is away from the user and closer to the user's mobile electronic device. As shown in FIG. 16A, robotic arm 1600 is used to support and orient user mobile electronic device 1602. The robotic arm is secured to the user via support member 1604 and wrist band 1606. Wrist band 1606 may also be used to mount the robotic arm on portions of a user's body other than the wrist. The robotic arm 1600 includes rotatable mount 1616, joining the robotic arm to the user's electronic device. Mount 1616 may itself be used to rotate the electronic device. Swivel joints 108, 1610 and 1612 may be used to rotate or swivel the electronic device with respect to the support member 1604. In addition, swivel joint 1614 may also be used to rotate the mobile electronic device.

Figure 16B:
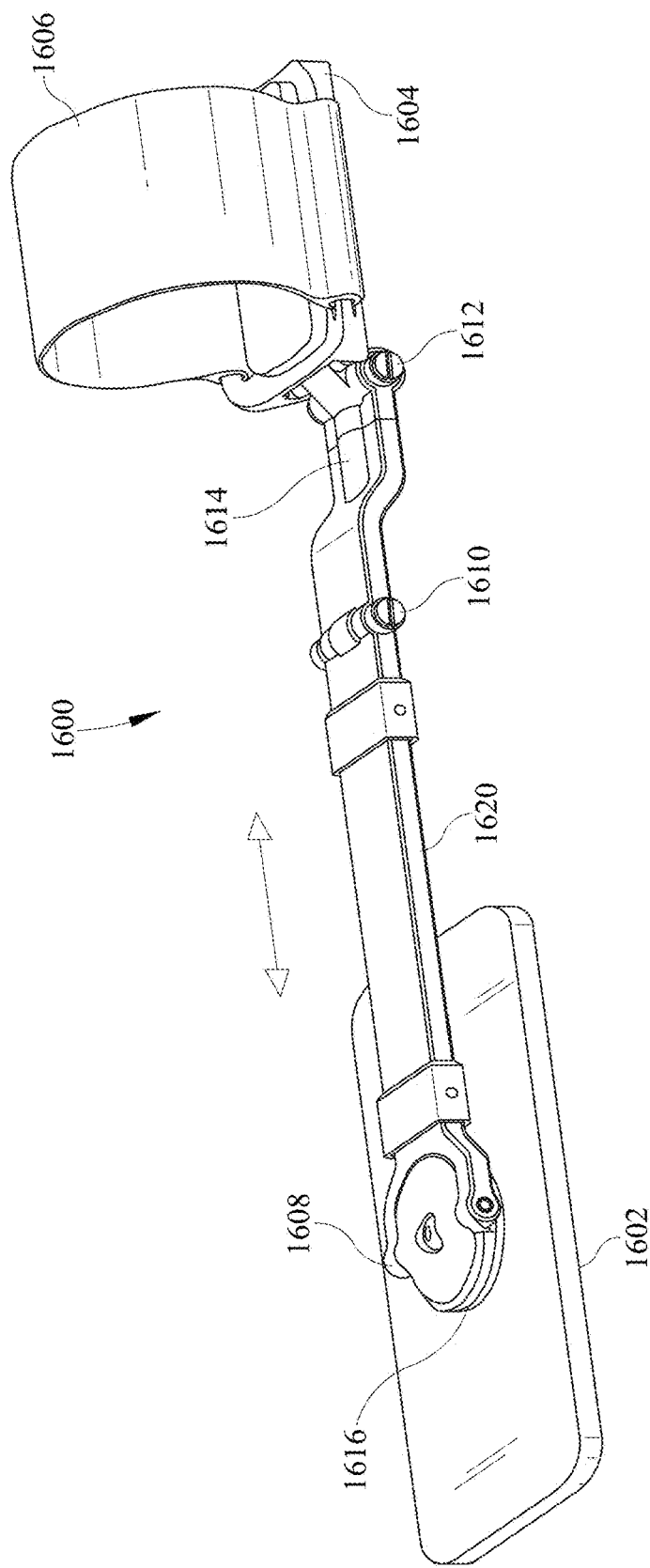
Figure 16C:
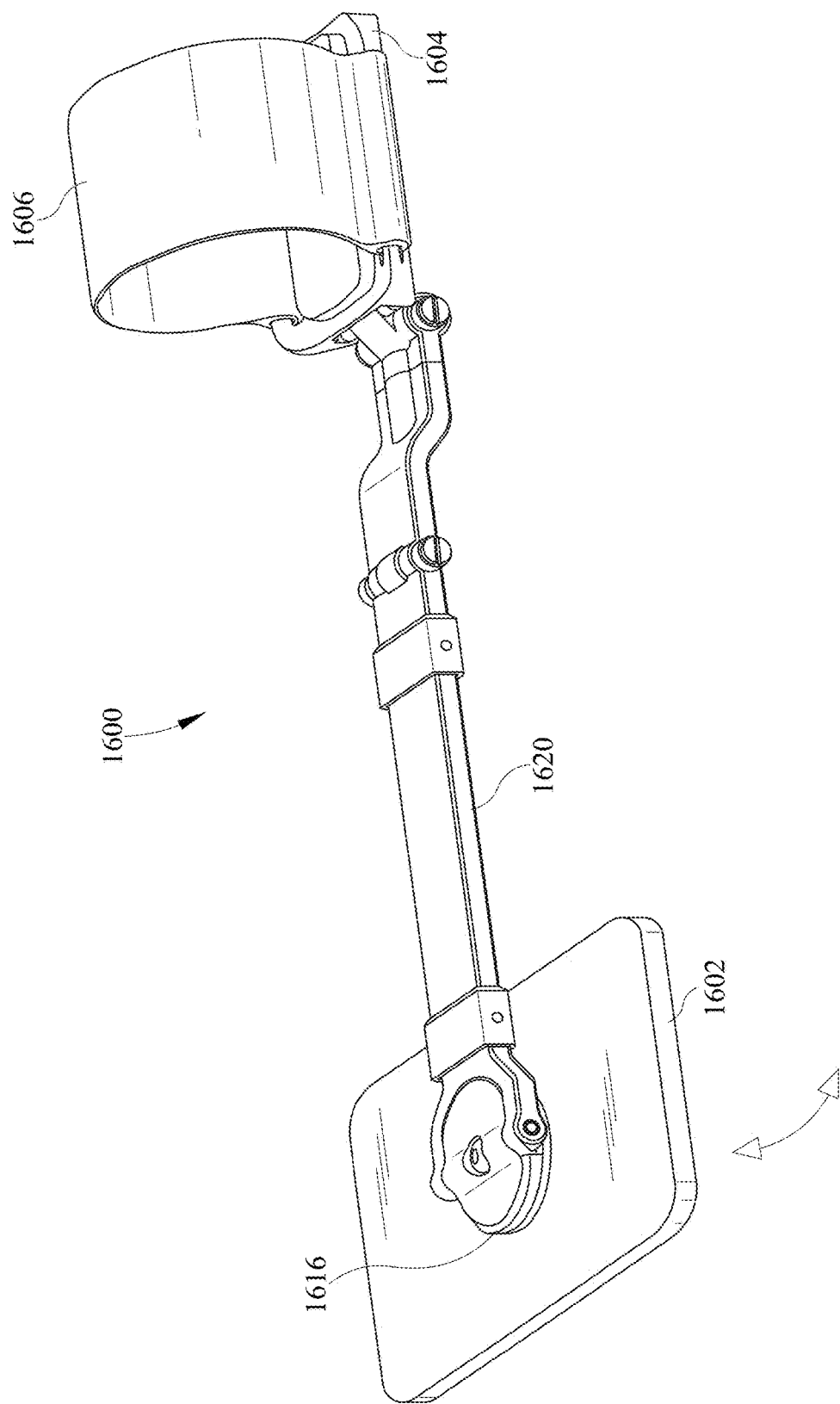
Figure 16D:
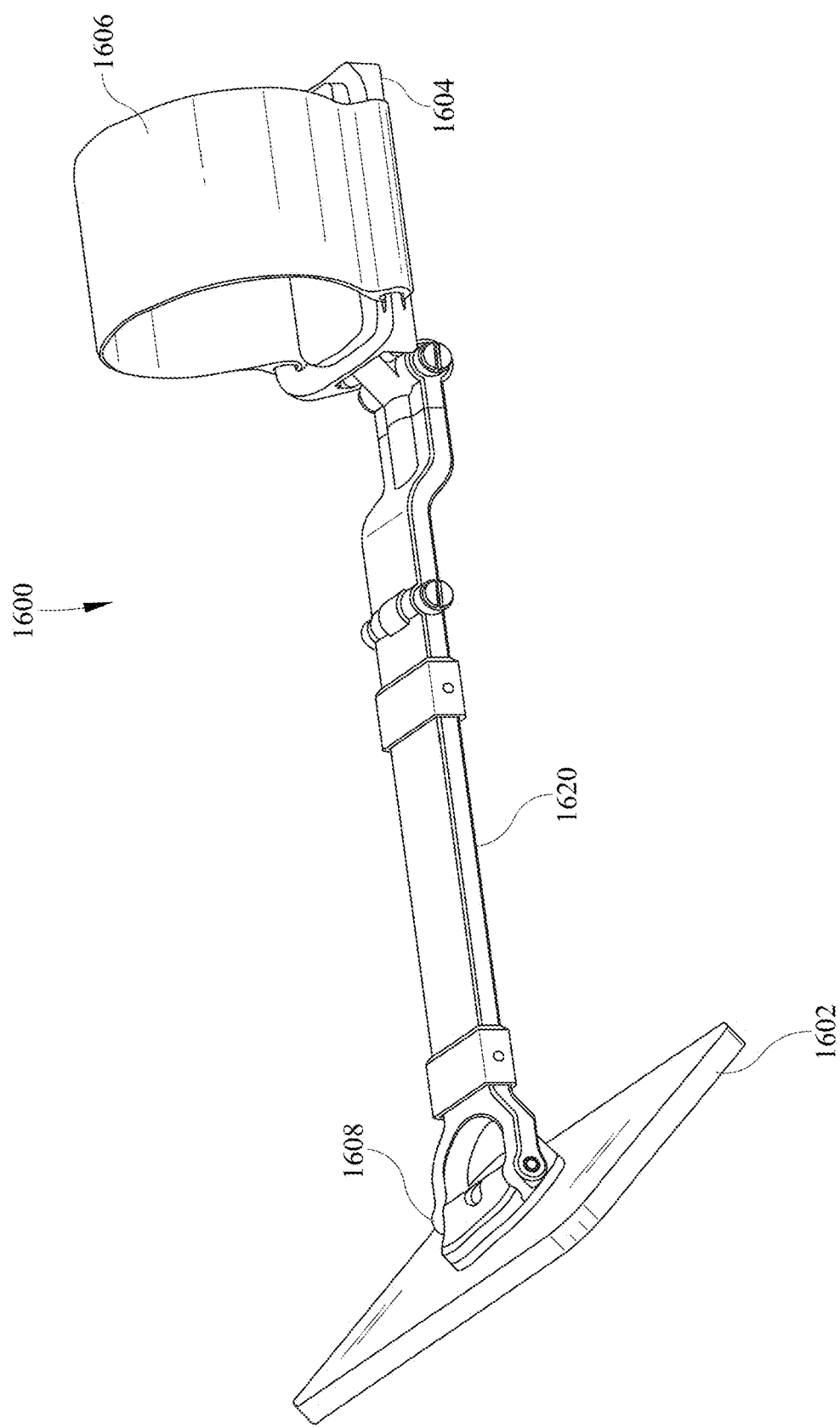
Figure 17A:
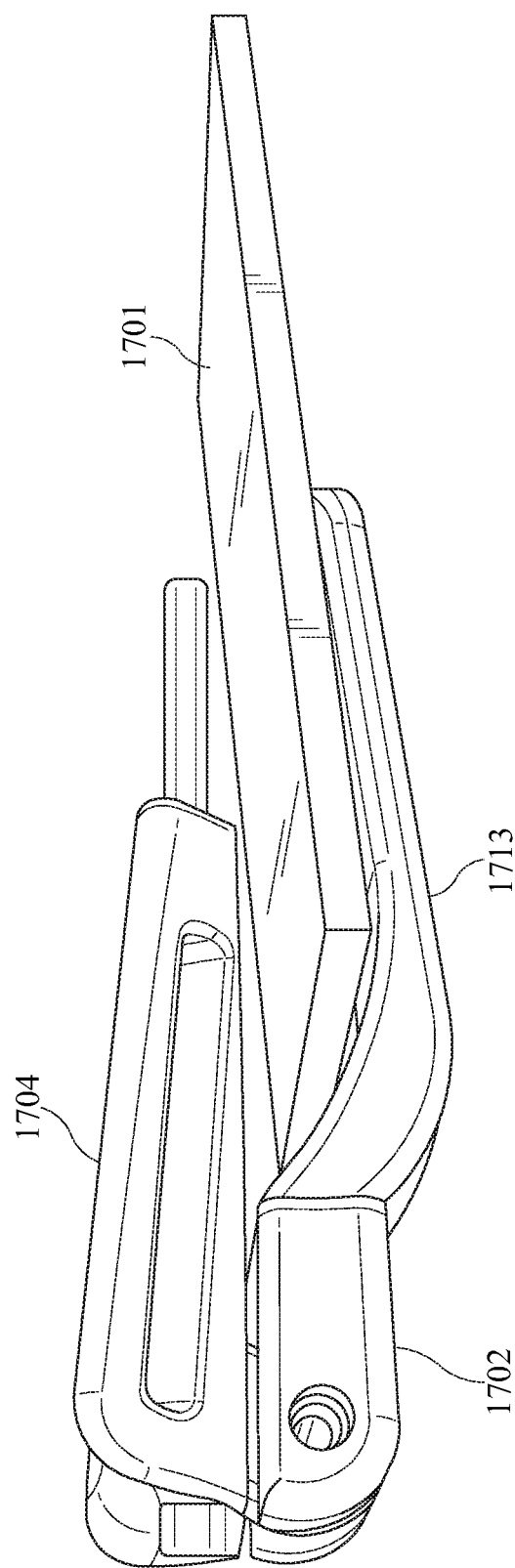
FIGS. 17A-17I depict another embodiment in several stages of use
Figure 17B:
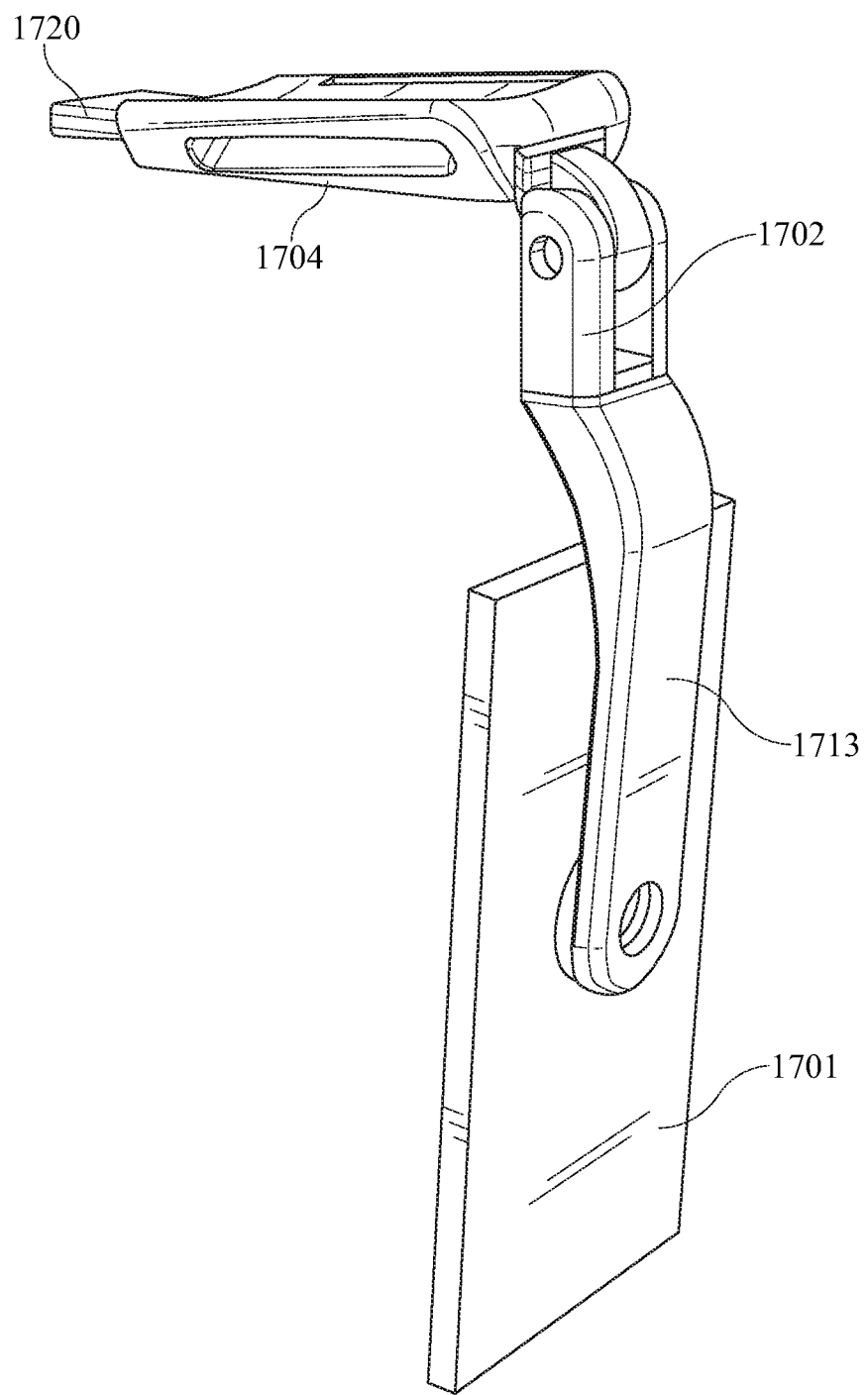
Figure 17C:
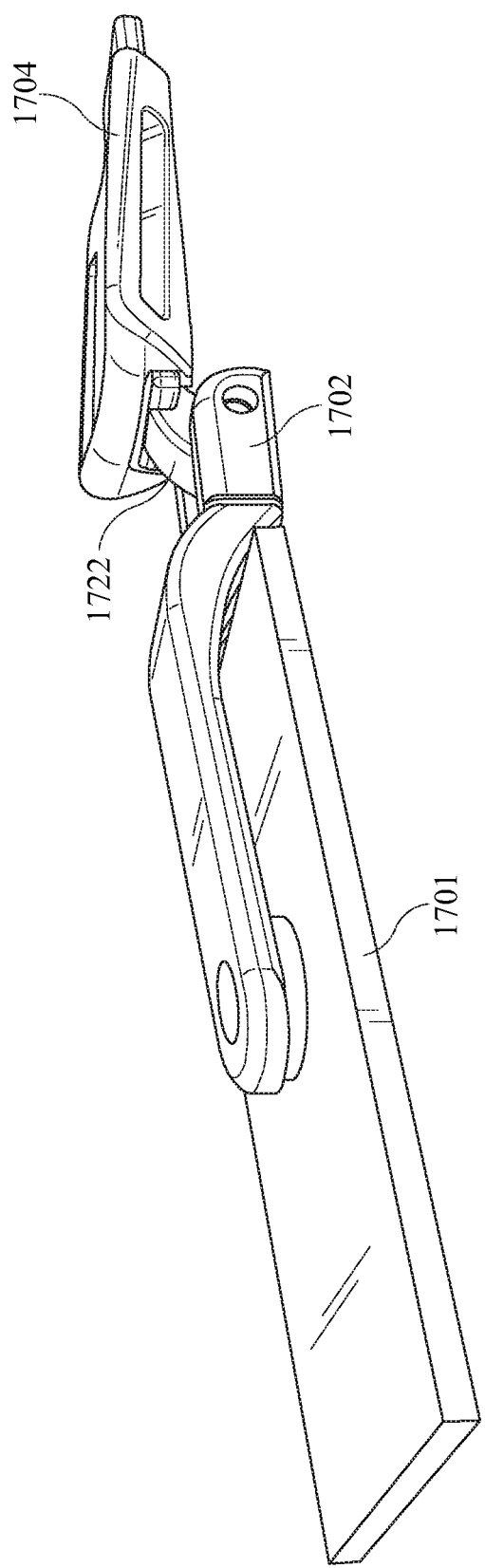
Figure 17D:
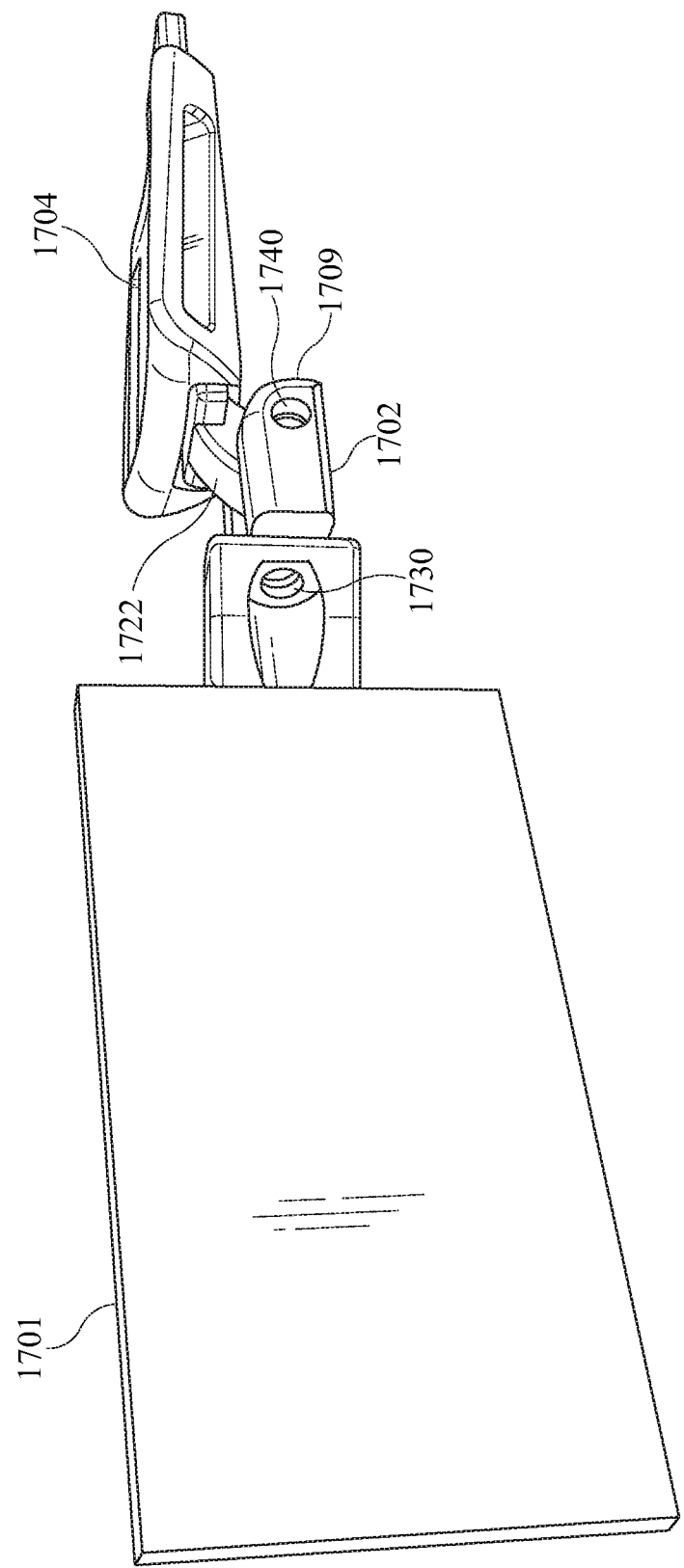
Figure 17E:
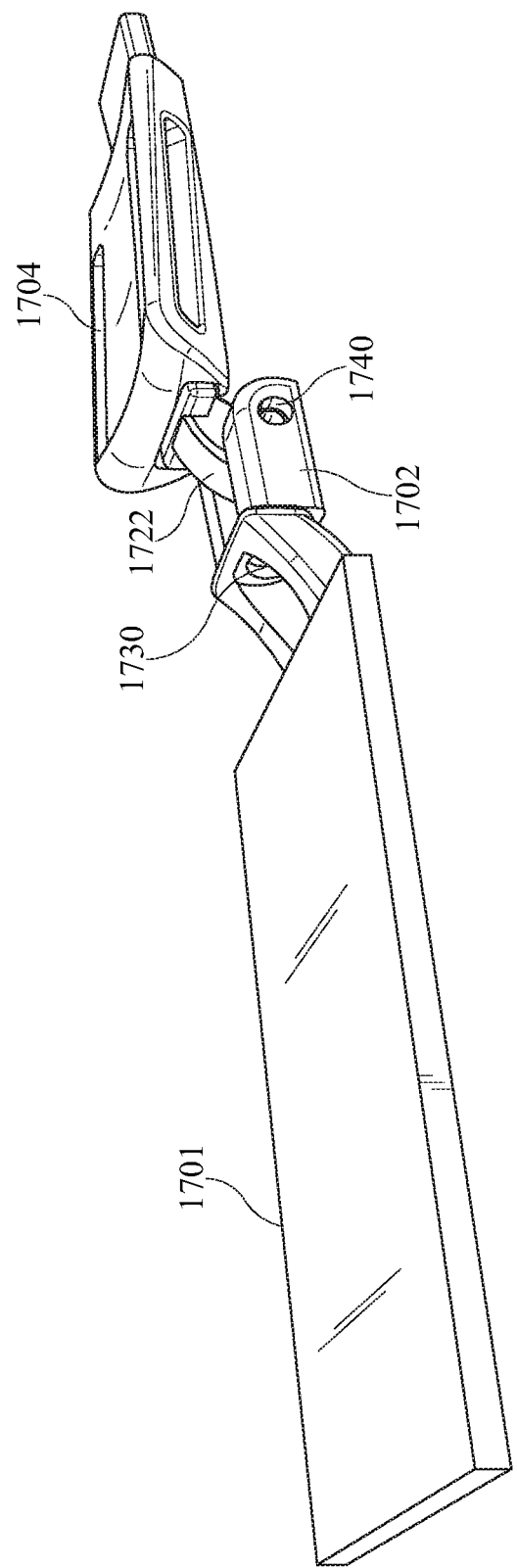
Figure 17F:
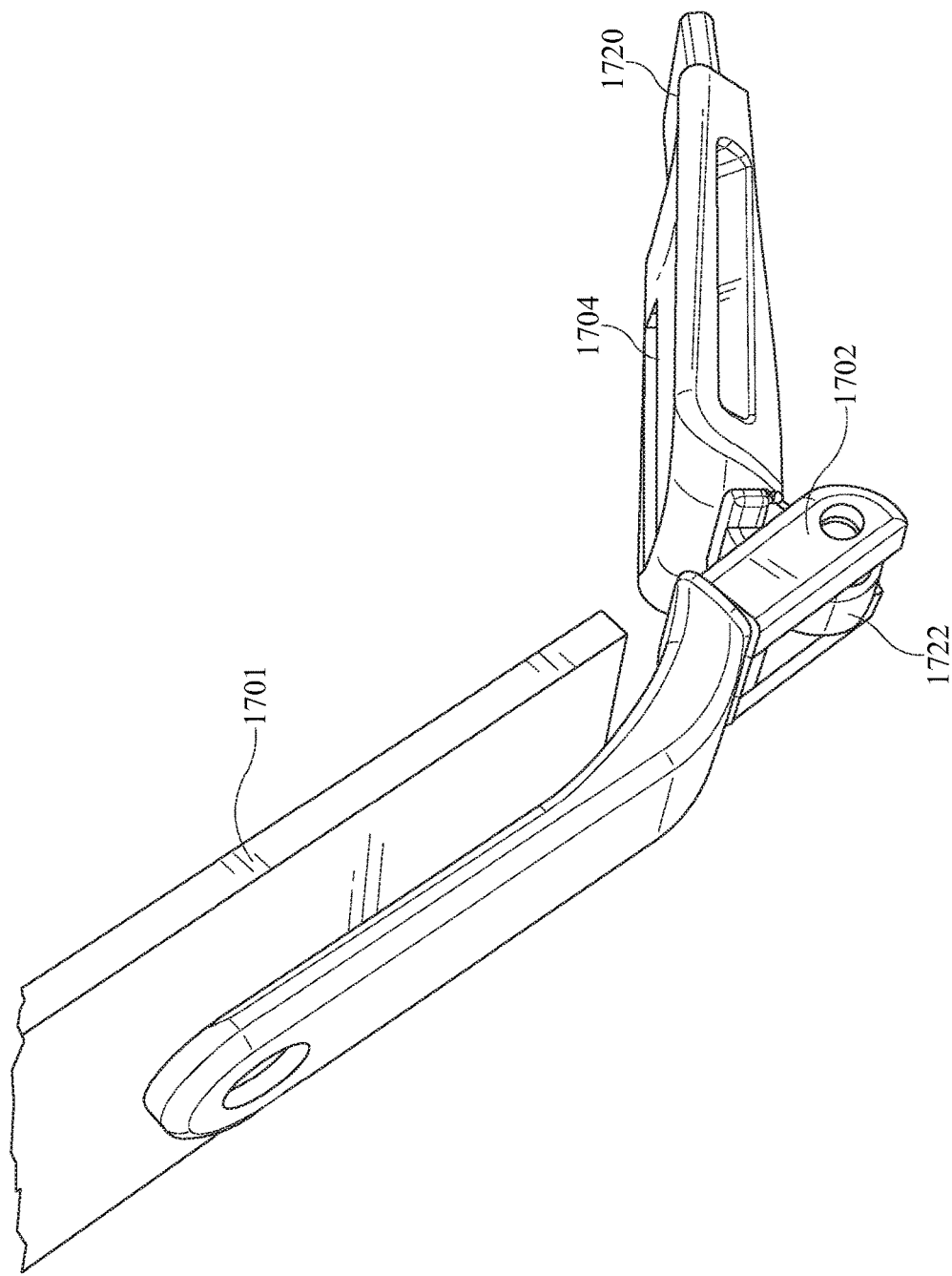
Figure 17G:
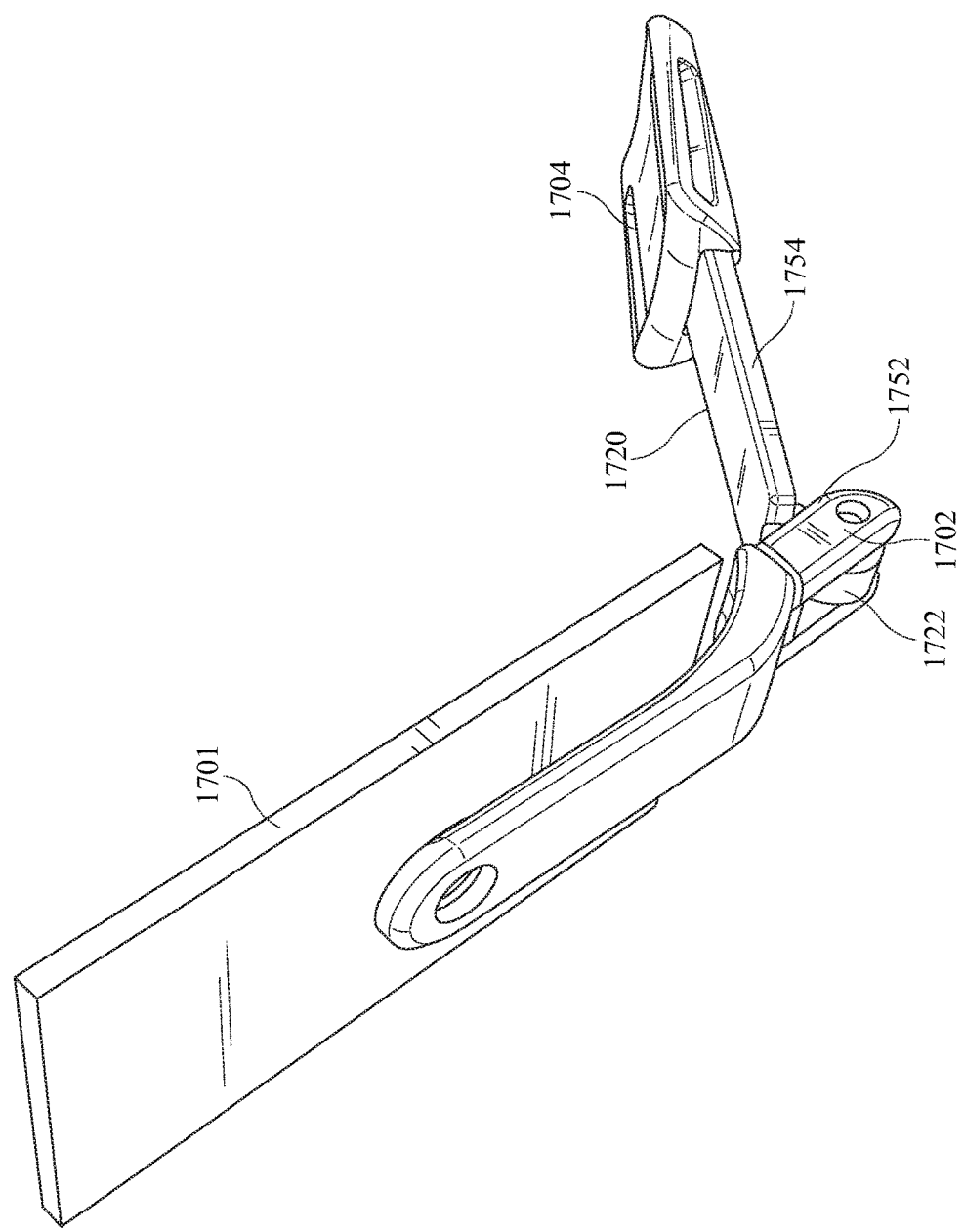
Figure 17H:
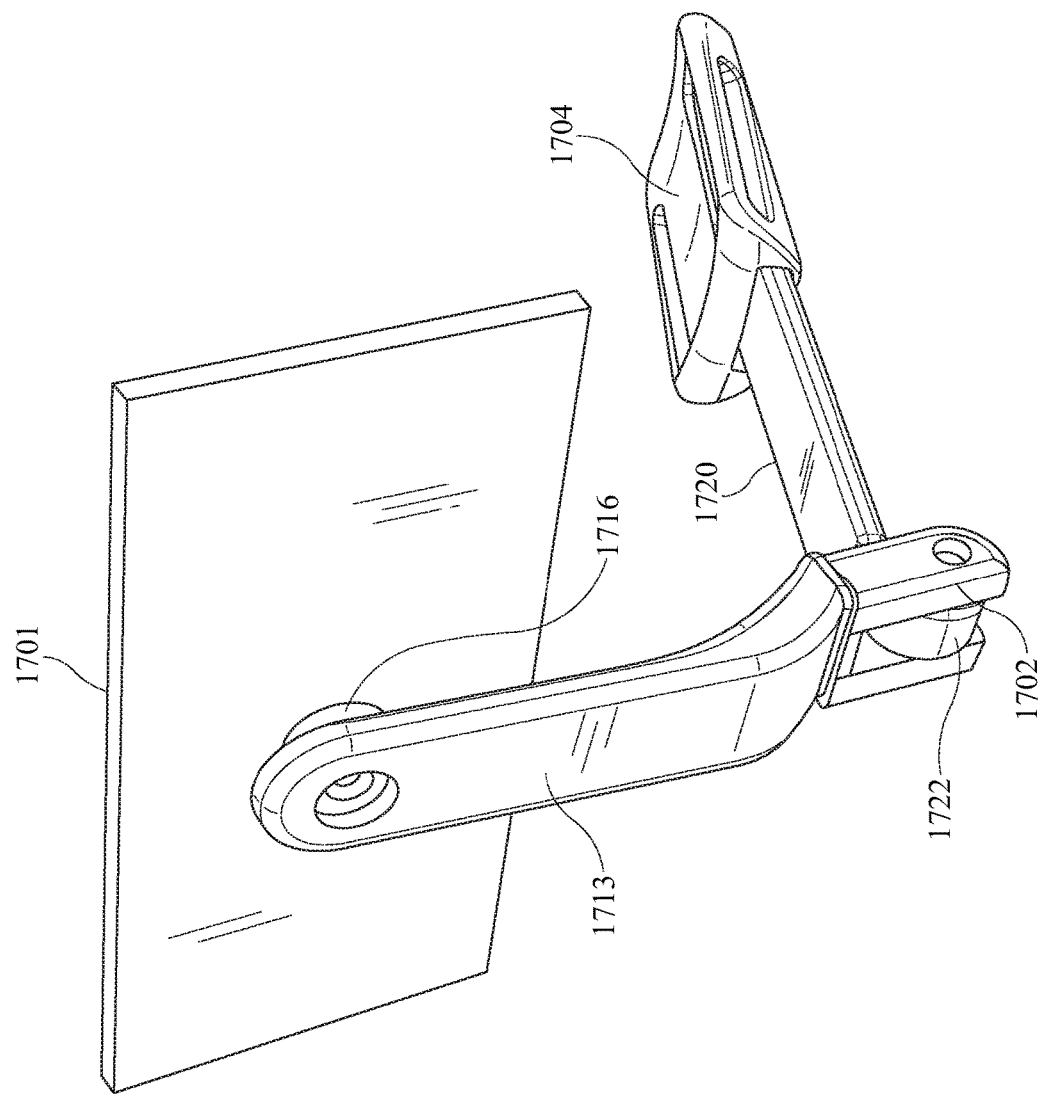
Figure 17I:
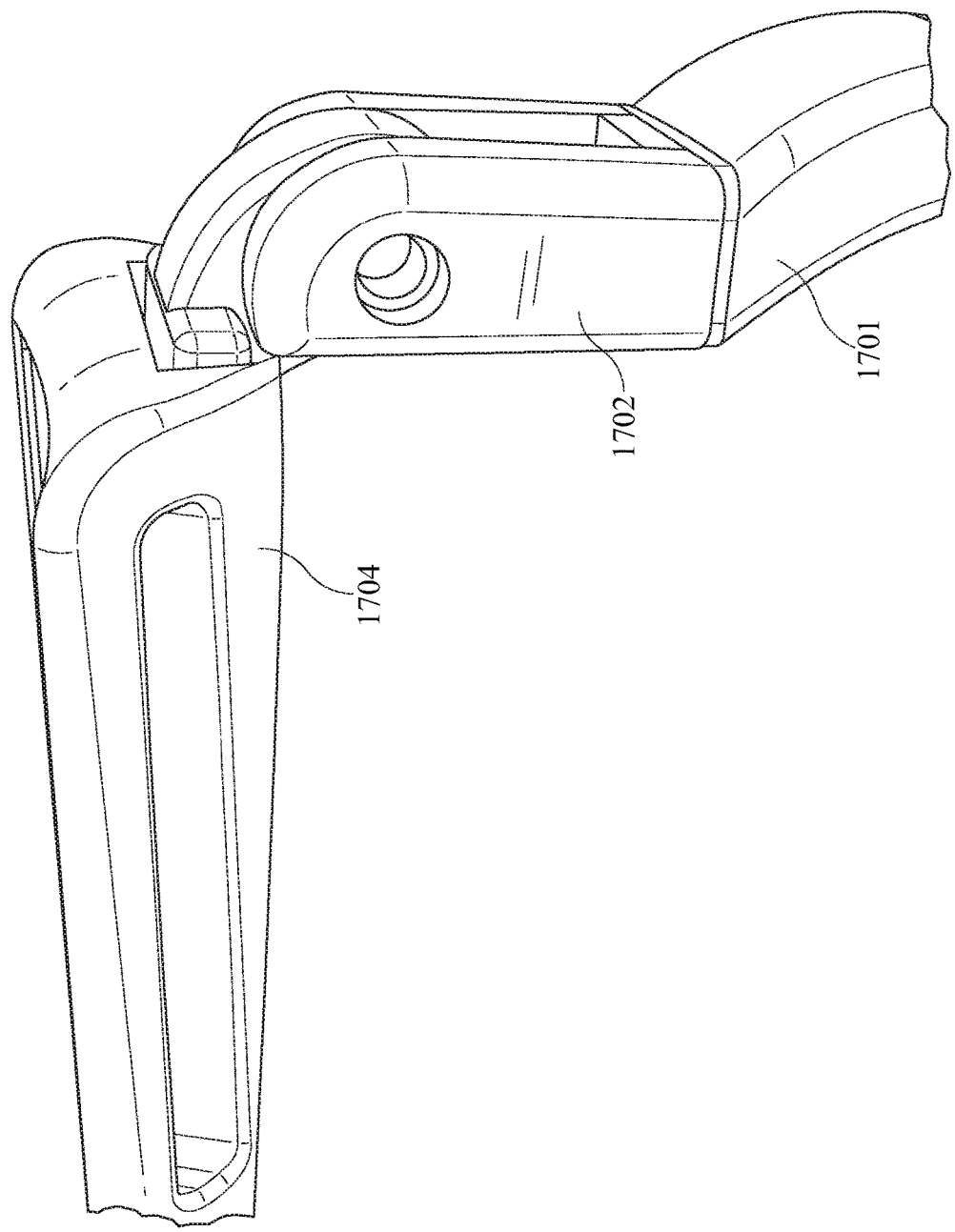

In FIG. 16A, the mobile electronic device 1602 is oriented parallel with the support member 1604. In FIG. 16B, extension 1620 allows the user to extend the mobile electronic device 1602 away from the user, as shown by the arrows in FIG. 16B. In FIG. 16C, the user has rotated electronic device ninety degrees, as shown by the arrows, using rotatable mount 1616. In FIG. 16D, swivel 1608 is used to angle the user electronic device at a desired angle. A closer view is depicted in FIG. 16E, which allows the reader to distinguish between rotatable mount 1616, mounted on the user electronic device 1602, which may have a complete three hundred sixty degrees of freedom, and swivel joint 1608, which may be limited to one hundred eighty degrees of rotational freedom. Another embodiment of the exemplary robotic arm is depicted in FIGS. 17A-17I. The robotic arm includes a body support member 1704 configured for attachment to a body; a telescopic member 1720 movably attached to the body support member; a pivoting mechanism 1702 attached to the telescopic member; an extension member 1713 pivotably attached by a proximal end of the extension member to the pivoting mechanism, the extension member for supporting the mobile device of the user; A motion by the user is effective to adjust an attitude of the mobile device of the user with respect to the body support member, the attitude selected from the group consisting of a linear movement, a pitch, a roll and a yaw as described in this disclosure. FIGS. 17A-17I illustrate different configurations the robotic arm may take under the influence of a force as described in this disclosure. FIG. 17A shows the extension member 1713 collapsed onto body support member 1704 (e.g., the extension member is 0 degrees with respect to the body support member). FIG. 17B shows the extension member 1713 rotated 90 degrees with respect to the body support member. FIG. 17C shows the extension member rotated 180 degrees with respect to the body support member. FIG. 17D shows mobile device 1701 rotated 90 degrees. Rotation is accomplished via a double joint 1702 which includes element 1730 and element 1740 as described in FIG. 18 below. FIG. 17E shows mobile device 1701 rotated another 90 degrees about its axis so that the display of the mobile device is facing upward. FIG. 17F shows the extension member 1713 rotated about 225 degrees with respect to the body support member so as to bring the display of the mobile device closer to the user so that the user may ore easily view the display and use it in a more ergonomic fashion. FIG. 17G shows the extension member 1713 rotated even further about 240 degrees with respect to the body support member so as to bring the display of the mobile device even closer to the user. FIG. 17H shows the extension member 1713 rotated even further toward the user to where the extension member 1713 is about 270 degrees with respect to the body support member so as to bring the display of the mobile device more perpendicular to the users arm to provide a better and more ergonomically friendly way of accessing and viewing the mobile device. In FIG. 17H, the display has also been rotated 90 degrees about element 1716 so that the display is now viewable sideways. In addition, the robotic arm of this disclosure is illustratively provided with a stop mechanism that keeps the extension member 1713 from extending more than 270 degrees with respect to the body support member. The stop mechanism is illustrated in FIG. 17G as the abutment of side 1752 of the double joint 1702 against side 1754 of the telescopic member 1720. When the two elements are in abutment, the design configuration prevents the double joint from rotating any further, hence locking the extension member 1713 from further rotation. The 270 degrees position of the extension member with respect to the body support member allows the display of the mobile device to be essentially perpendicular to the arm of the user; thereby allowing for a better and more ergonomically friendly way of accessing and viewing the mobile device.

The elements shown in this embodiment are explained in greater detail in FIG. 18 where like elements bear like numbers increased by 100 (i.e., element 1702 in FIG. 17 is like element 1802 in FIG. 18). Element 1716 is like element 1516 previously described in connection with FIG. 15.

FIGS. 18A-18L depict an embodiment of a joint element of this disclosure comprising a double joint 1802 including a first joint 1803 for providing a flipping rotation of the joint element around a front end of the telescopic member 1820 and a second joint 1805 providing rotation of the telescopic member 1813 about its linear axis.

A distal end 1822 of telescopic member 1820 defines an opening (see e.g. FIG. 18E) for receiving a thumb screw 1840 secured by a nut on one end during assembly for holding the first joint 1803 against the telescopic member 1820 in a tight engagement. Alternatively, an Allen wrench screw or other screw may be used. The screw may be torqued to provide an engagement between the telescopic member and the first joint that is loose enough to allow the first joint and hence extension member connected thereto to rotate about the telescopic member under the influence of a first force and yet tight enough to hold the extension member and first joint in a tight engagement with respect to the telescopic member when under the influence of a second force that is less than the force of the first force. Illustratively, the tighter the nut the harder it is to rotate the first joint and hence extension member about the telescopic member. So if the mobile device supported by the extension member is heavy a tighter torqueing of the nut is needed to support the mobile device and allow for its flip rotation.

Second joint 1803 receives a binding post 1830 comprising a threaded male end with a button head and a threaded female also with a button head. A distal end 1810 of extension member 1813 defines an opening 1831 (see e.g. FIG. 18B) for receiving the binding post 1830 during assembly so that the button heads of the binding post hold the second joint against the extension member in a tight engagement. A disc spring (not shown) is inserted around the shaft of the binding post prior to assembly so that when the male and female parts are connected the spring sits between the distal end 1810 of the extension member 1813 and the second joint 1805. The spring may be placed on the male or female end of the binding post or on both ends of the binding post. The spring provides preloading tension to the second joint so as to provide for a firmer rotation of the extension member about the second joint. Illustratively, a preloading of about 5 pounds of force is applied to the extension member when the extension member and the second joint of the double joint 1802 are connected together via the binding post. In other words, 5 pounds of resistance is applied to the rotation of the extension member with respect to the second joint.

Figure 18A:
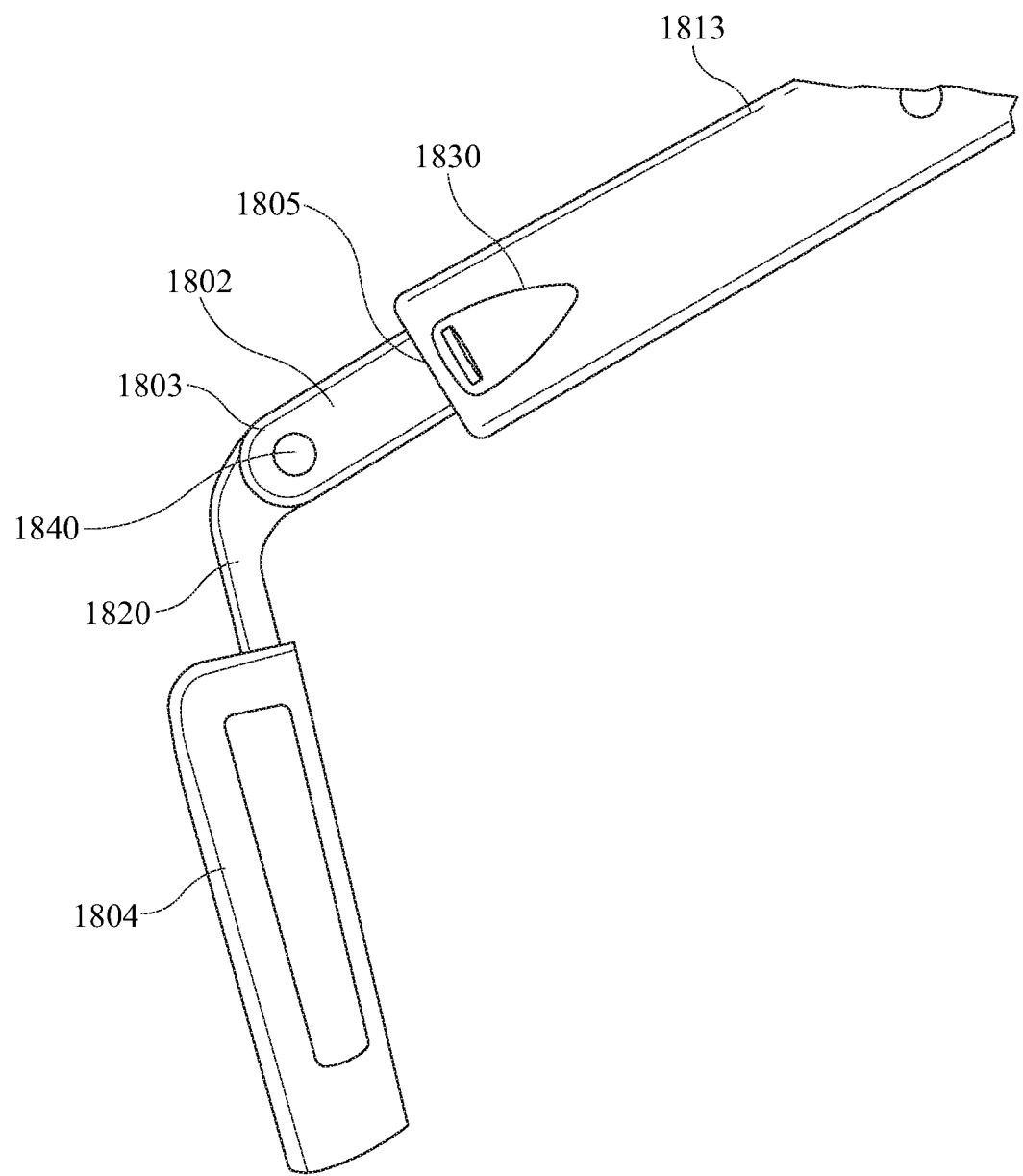
FIGS. 18A-18L depict an embodiment of a joint element comprising a double ball joint including a first joint for providing a flipping rotation of the joint element around a front end of the telescopic member and a second joint providing rotation of the mobile device support member about its linear axis, that is, about the linear axis of the mobile device support member.
Figure 18B:
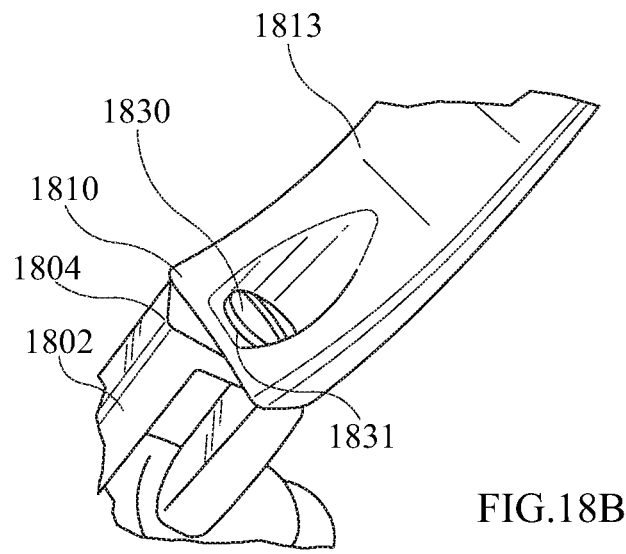
Figure 18C:
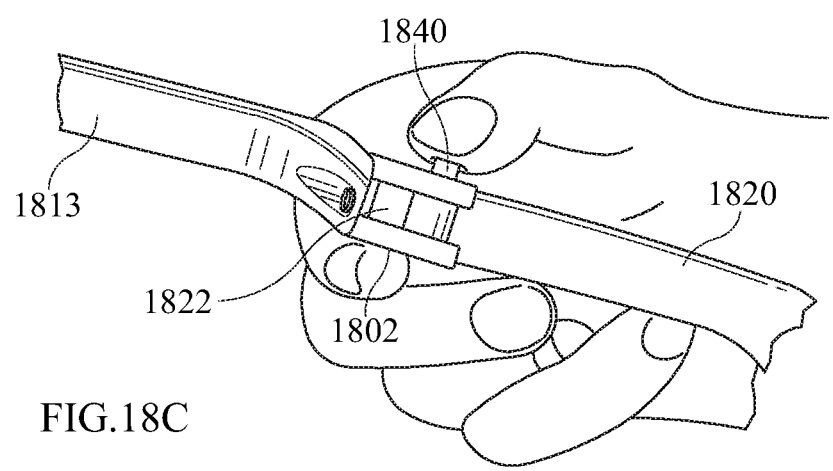
Figure 18D:
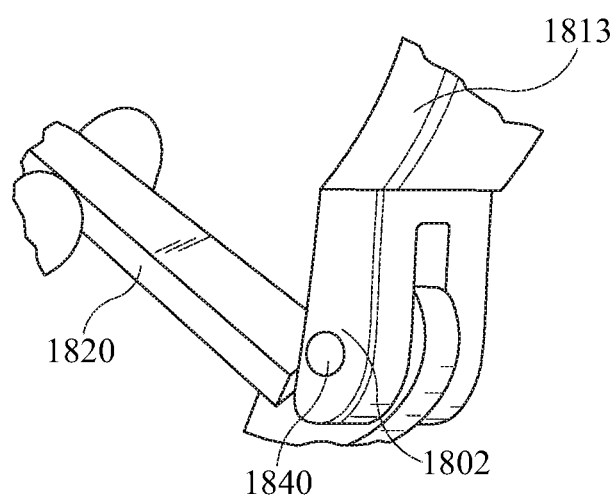
Figure 18E:
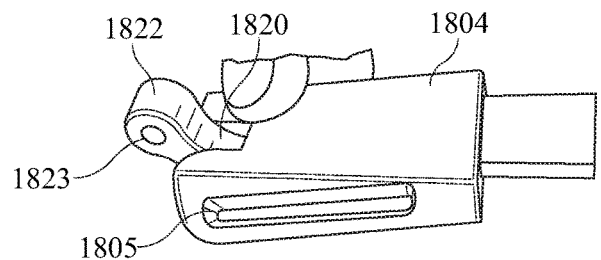

FIG. 18E shows an opening 1805 defined in one or opposite side of the arm support member for receiving a strap for use in holding the arm support member to the body. In the configuration where there is one opening, a strap fixedly attached to another side may be wrapped around the body, slipped through the opening illustratively from the inside out and then folded back onto itself where it may be held to the strap wrapping the body by a Velcro® strap or other attachment. Where opposite sides of the arm support member define an opening, a strap may be threaded through a first opening, around the body, through a second opening and then the portions of the strap lying outside the opening may be folded back over the strap wrapping the body and held thereto by Velcro or other attachment. Alternatively, buckles, buttons, snaps, magnets incorporated into the straps may be used. In addition, any type of fastener for use in fastening the strap may be employed. The strap may be made from nylon, cotton, spandex, polyester, denim, leather, rubber, silicone, metal or any other material suitable for holding the arm support firmly against a body.

Figure 18F:
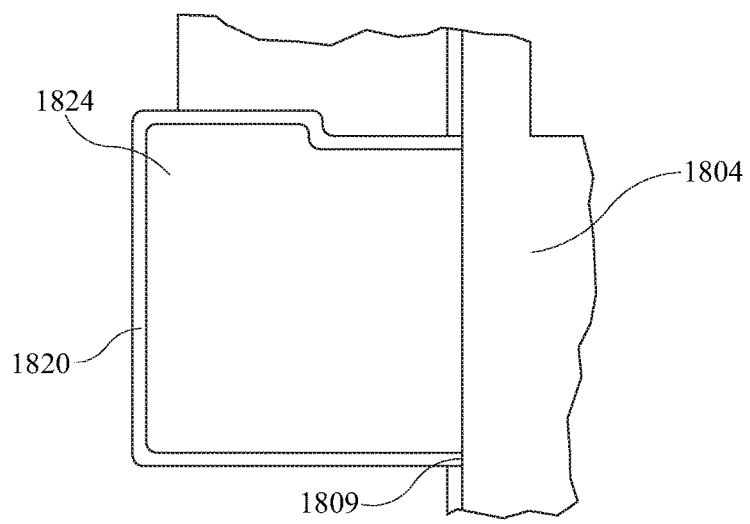
Figure 18G:
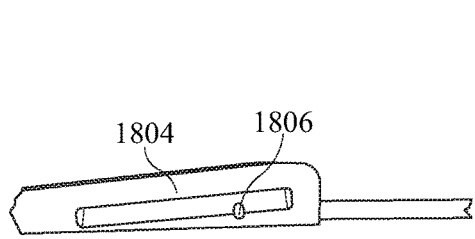
Figure 18H:
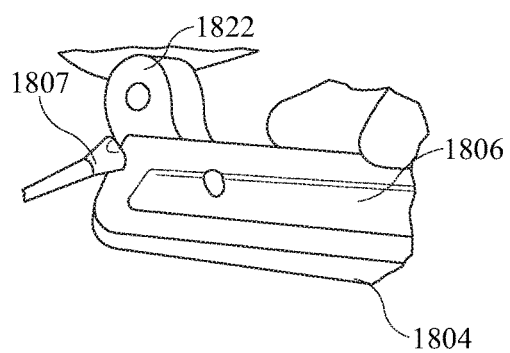

As shown in FIG. 18F, telescopic member 1820 slides into a channel 1809 defined by body support member 1804 or arm support 1804 as it may also be referred to. Telescopic member includes an extending shoulder 1824 on a distal end (i.e., the side facing the wrist). After assembly, a set screw 1807 is inserted into an opening 1806 on a side of the support. The set screw keeps the shoulder of telescopic member from leaving the arm support after assembly. This keeps telescopic member and the arm support integrally connected.

Figure 18I:
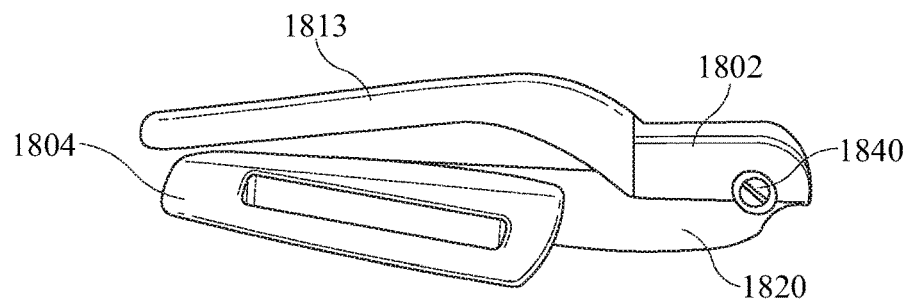
Figure 18J:
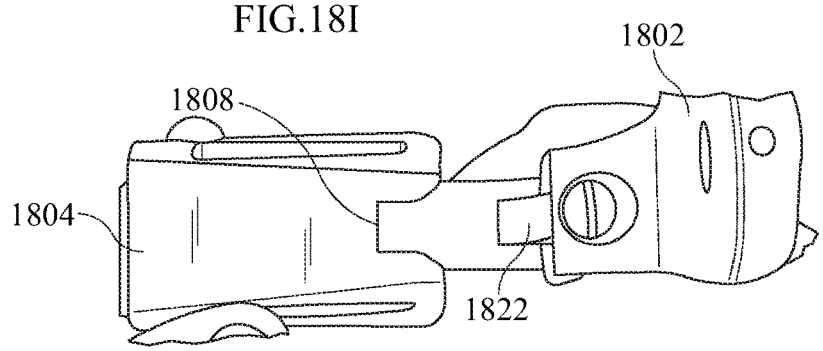
Figure 18K:
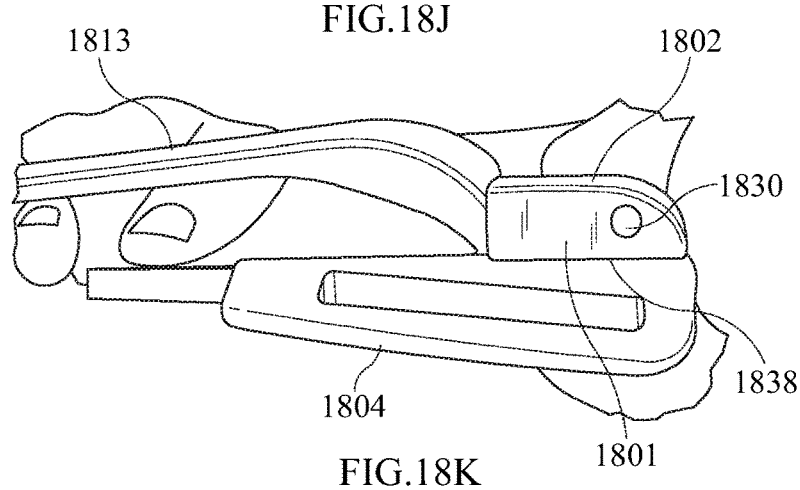
Figure 18L:
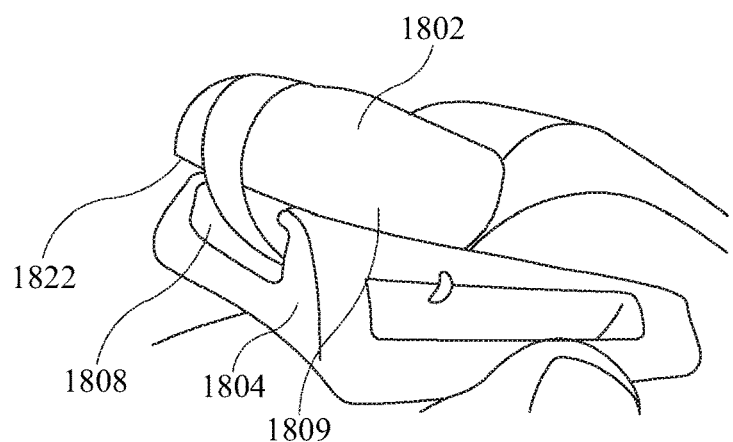

The tool for multi-positioning and holding a mobile device of a user shown in FIGS. 18A-L operate in a manner similar to the operation of previously described tools. The extension member 1820 may collapse onto arm support 1804 by flipping action of the arm. As shown in FIG. 18I, initially the double joint 1802 extends away from the arm support 1804 when in a collapsed position. In this position, telescopic member 1820 extends part way out of the arm support. As shown in FIG. 18J, arm support 1804 includes a notch 1808 which receives the distal end 1822 of telescopic member 1820. By pushing the double joint against the arm support 1804 after initially collapsing extension member onto arm support 1804, the telescopic member slides into the arm support until the distal end 1822 is firmly received and held by the notch 1808 formed in the arm support. The positive engagement of the two keeps the double joint from rotating. Additionally, as shown in FIG. 18K, the abutting of a linear surface 1838 of the double joint against a top surface 1801 of the arm support keeps the double joint, the extension member, and the mobile device connected thereto from flip action. This provides a firm positive lock that keeps extension member from sagging towards the ground under the weight of the mobile device when in the collapsed position. This also prevents any force from pulling the extension member away from the arm support when in the collapsed position when facing any direction. The positive lock of the double joint prevents the double joint from moving. To unlock, the telescopic member is moved outwardly from the arm support. Once the distal end 1822 of telescopic member 1820 is clear of the notch, the positive lock is unlocked and the double joint is freely movable.

In the foregoing embodiment, the double joint is seen to provide a first joint for rotating telescopic member perpendicularly around the screw 1840 so as to expand or collapse the extension member about the telescopic member and a second joint for allowing the extension member to rotate about its linear axis.

The extension member in the foregoing embodiment may include element 1516 depicted in FIG. 15 for attachment of the mobile device. Alternatively, the attachment may be accomplished with a binding post, a magnet, or a female button mechanism. These attachment mechanisms may be integrated into one or both of a terminal end of the extension member and the mobile device; the coaction of which allows a coaction between the mobile device and extension member according to the teachings of this disclosure.

To further illustrate, the attachment to the mobile device to the extension member may be selected from the group consisting of an adhesive, a magnet, a suction cup, a male female coupling button mechanism, and a casing for the mobile device. For example, a casing may be provided with any of the foregoing or other attachments for use in attaching the mobile device to the extension member.

The tool for multi-positioning and holding a mobile device of a user of this disclosure may be attached to any body including a person, an animal, and an inanimate object.

The tool may comprise a single support strap for attachment of the body support to the body. Alternatively, the device may comprise a large and a small support strap. Any number of support straps may be used to support the body support member to the body.

The robotic arm of this disclosure provides the user with a third arm for viewing electronic equipment. Advantageously, the robotic arm of this disclosure allows a user largely unrestricted use of both hands while accessing electronic equipment through the robotic arm. Thus, for example, a stocker in a store is free to use both hands to stock items on a shelf while viewing stocking information displayed on an electronic device attached to a robotic arm of this disclosure. In another illustrative example, the user may inventory products at a ware house using both hands while viewing information on the electronic device held by the third arm of the user, i.e., the robotic arm of this disclosure. In the examples of the stocker and the warehouse user, as well as other industrial applications, the electronic device may be a bar code reader or an RFID tag reader. In these examples, a user can more easily read the bar codes or ID tags of items while performing other tasks with the user's hands.

The device support member may be configured for supporting an electronic device for a wearer of the tool. The device support member may be configured for supporting an electronic display device for a wearer of the multi-positioning tool or robotic arm. The display device may be any mobile device including a smart phone, an MP3 player, an electronic reader, a tablet computer, an iPad, and an iTablet.

The exemplary embodiments described above are powered only by muscle-power of the user. That is, by flexing several muscles of the user's body, and taking advantage of freedom of movement of the user, a wide range of motion of the multi-positioning tool or robotic arm is possible. By way of example, the body movement or gesture of the wearer may be selected from the group consisting of a sliding movement, a flipping movement and a rotational movement.

Powered versions are also disclosed. For example, tiny linear or rotary actuators or motors may also be part of an alternate body support member. They may be powered by one or more batteries, which may be recharged. This is a practical application of the multi-positioning tool discussed herein, because the forces involved are small and the power required would also be small, and suitable for one or more small batteries.

The small force applied to the tool for a given movement may be generated by an actuator or motor that is activated by a voice command. The telescopic member may be adapted to respond to the voice command to adjust an expansion or contraction of the expandable member. Either of the double ball joints may be adapted to move to a desired pivot position so that the user's mobile electronic device is oriented as desired, including distance from the user, and desired position with respect to roll, pitch and yaw orientation.

The housing for multi-positioning and holding the device, i.e., the body support member, may include a near field communication antenna for transmitting and receiving signals from a near field communication antenna in the device. This may be helpful in circumstances in which the user mobile electronic device is a communications device, such as a smart phone, a cell phone, a personal digital assistant, an iTablet, or similar. The body support member may include a battery source and a near field communication circuit for translating power into an electrical signal for transmission using a near field communication protocol. The multi-positioning tool may further include a wired tether between the near field communication antenna of the housing and the near field communication circuit, the wired tether configured to communicate power from the battery through the near field communication antenna to the device. In an alternative embodiment, the wired tether may be broken along its path by a USB port that allows a USB compatible wire from the device grasped by the tool of this disclosure to be connected to the USB port to complete the tether for powering the device.

A tool for multi-positioning and holding a device according to this disclosure may include a body support member configured for attachment to a body of a person; a telescopic member configured for attachment to the body support member; a first double ball joint connecting the telescopic member and an extension member; an extension member further connecting the first double ball joint to a second double ball joint, the second double ball joint configured for attachment to a mobile electronic device of a user.

In another embodiment, the tool for multipositioning and holding a device includes a body support member and an expandable member configured for attachment to the body support member; a first torque hinge connecting the body support member and the expandable member. There is also a device support member configured for supporting a device; and at least one torque hinge connecting the expandable member and the device support member, the expandable member configured for adjusting a distance or a position between the device support member and the body support member. A body movement of the tool enables movement of the first torque hinge and the at least one torque hinge to open or close the torque hinge and the at least one torque hinge thus adjusting a position or an attitude of the expandable member or the device support member with respect to the body support member.

In torque hinge embodiments, the first torque hinge may be adapted for adjusting an angular position of the expandable member with respect to the body support member. The at least one torque hinge connecting the expandable member and the device support member may be for adjusting the device support member for a roll, a pitch, a yaw or a position of the device support member with respect to the expandable member.

The body support member may be adapted for wearing along an arm of the wearer of the tool, including at least one supporting strap. The body support member may also be attached to other parts of the body or clothing, e.g., a person's shoe, foot, leg, back, hat, belt buckle, and the like.

The device support member may be adapted for supporting an electronic display device or other device, such as a mechanical device, to the wearer of the tool. In powered versions of the device, with one or more motors or actuators, the tool may be adapted to respond to a voice command from a wearer of the tool. The tool may also include a microprocessor controller, a non-transitory memory, a computer program stored in the non-transitory memory, an interface for accepting a voice command from the wearer and at least one actuator responsive to the microprocessor controller. The actuator may be effective to adjust a position of the body support member, an expansion or contraction of the expandable member, an angular position of the first support hinge and an angular position of the at least one torque hinge. A Bluetooth® trigger may also be included to operate the device from a distance.

In powered versions, the actuator may be effective to adjust a position of the at least one torque hinge, and wherein the at least one torque hinge is effective to adjust a roll position of the device support member with respect to the body support, a yaw position of the device support member with respect to the body support member, or a pitch position of the device support member with respect to the body support member. The device may include a battery and a USB port to charge the battery.

As shown in the figures, the telescopic member may include a longitudinal portion. The first double ball joint, attached to the distal end of the telescopic member, acts as a pivoting mechanism and pivotally associates the distal end of the telescopic member with the proximal end of the extension member, described above. The extension member is associated with two pivoting mechanisms, i.e., two ball joints, referred to here as a double ball joint. The first double ball joint ties together the distal end of the telescopic member with the proximal end of the extension member. The second double ball joint ties together the distal end of the extension member with the support member, the support member in contact with the user's mobile electronic device.

There are many embodiments of the present disclosure. For example, in place of a three-degree of freedom joint, for yaw, pitch and roll, a spring joint may be used, or alternatively, a double ball joint by providing six degrees of freedom for rotation alone. Single ball joints may also be used. The telescoping or expanding motion of the telescopic member is another degree of freedom, a linear, sliding, back-and-forth motion. This allows a separate degree of freedom for distance alone, adding to the rotational degrees of freedom described above.

Additional features may be used to provide for a better cosmetic appearance. For example, as the body support member may be shrouded in a sleeve, a belt, and the like, for attaching the bodily-worn device and improving its appearance. The sleeve may include a pocket or other receptacle for storing a stylus and may also accommodate important papers or documents, such as currency, credit or debit cards, a person's driver's license, and so forth.

Having thus described this disclosure, it will be appreciated that disclosed is a mechanical tool which allows customizable positioning around a wearer. The tool holds a wide array of objects (phones, mirrors, PDA's, back-scratcher, etc.). The tool comfortably supports smart phones and mobile devices for hands free operation everywhere the wearer goes. The main support comes from the body to which the tool is attached, such as the forearm. The forearm, for example supports the tool with little discomfort. When supported by the forearm, the tool provides the wearer with a third arm.

The tool provides a retractable mechanical appendage, such as an arm that holds objects and allows free, customizable positioning around oneself. The tool design provides for comfort and sleekness. The can be used in most places, including in bed. Instead of the wearer holding up a device to do late night operations, the wearer can easily position the device to any desired position and the device is configured to remain in that position.

The device grasps mobile devices from a part of the human body other than the hand for use most everywhere the wearer may want to go. The device may find application in the industry. For example, a warehouse worker may wear the tool of this disclosure in using a device for inventorying, scanning, documenting, recording, and other purposes. The device may be held to the wearer by an arm band. For example straps on either side of the device may be held together by a hook-and-loop mechanism, such as a Velcro© band after the device is put into place on the wearer. The device allows a firm and comfortable placement of the device for intended use.

One embodiment of the disclosure is a tool for multipositioning and holding a mobile device of a user. In this embodiment, the tool includes a body support member configured for attachment to a body and a telescopic member movably attached to the body support member. The tool also includes a first pivoting mechanism attached to the telescopic member and a mobile device support member, including a support element configured for supporting the mobile device of the user, the mobile device support member configured for movable attachment to the first pivoting mechanism, wherein a motion by the user is effective to adjust an attitude of the mobile device of the user with respect to the body support member, the attitude selected from the group consisting of a linear movement, a pitch, a roll and a yaw.

In another embodiment, the tool further includes an extension member pivotably attached by a proximal end of the extension member to the first pivoting mechanism and a second pivoting mechanism pivotably attached to a distal end of the extension member, the mobile device support member configured for movable attachment to the second pivoting mechanism, the extension member and the second pivoting mechanism adapted for insertion between the first pivoting mechanism and the mobile device support member. In other embodiments, the motion of the user includes an applied force that is effective to adjust at least one of the pitch attitude, the yaw attitude, the roll attitude and an expansion or contraction of the telescopic member. In embodiments, the applied force is a body movement or a gesture. In embodiments, the applied force is a movement or gesture by a hand, a wrist, an arm, an elbow or a shoulder of a user. In an embodiment, the first pivoting mechanism is adapted to pivot the extension member relative to the telescopic member according to the motion by the user.

In embodiments, the telescopic member is in a collapsed configuration or an expanded configuration when the first pivoting mechanism pivots the extension member relative to the body support member under the influence of the force. In an embodiment, the first pivoting mechanism includes a double ball joint including a first housing, a first ball fixedly attached to the telescopic member and a second ball fixedly attached to the mobile device support member. In an embodiment, the first pivoting mechanism causes the mobile device to flip about the first pivoting mechanism so as to cause the mobile device to face the body support member. In an embodiment, the first pivoting mechanism causes the mobile device to roll about the first pivoting mechanism so as to cause the mobile device to effect a rolling motion with respect to the body support member. In an embodiment, the first pivoting mechanism causes the mobile device to yaw about the first pivoting mechanism so as to cause the mobile device to effect a yawing motion with respect to the body support member.

In another embodiment, the motion by the user is effective to allow the telescopic member to expand or retract under the influence of a force. In an embodiment, the telescopic member includes a linear slide, slidably mounted within the body support member, allowing the telescopic member to expand or with respect to the body support member under the influence of a force. In an embodiment, the second pivoting mechanism includes a double ball joint including a first housing, a first ball fixedly attached to the extension member and a second ball fixedly attached to the mobile device support member, whereby the second pivoting mechanism allows the extension member with mobile device to flip the mobile device of the user about the second pivoting mechanism so as to cause the mobile device to face the body support member.

In an embodiment, the mobile device support member is configured for adhesive attachment to the mobile device of the user. In an embodiment, the device support member is configured to move with respect to the body support member by sliding movement of the telescoping member and by rotational movement of the first pivoting mechanism. In an embodiment, the sliding movement is a forward or backward movement of the telescopic member, the forward or backward movement causing the device support member to move away from or towards the body support member, respectively. In an embodiment, the body support member includes a large support band and a small support band for attachment of the body support to the body. In an embodiment, the tool includes a body support sleeve pad for cushioning of the arm of the user within the body support member.

Another embodiment of the disclosure is a method for holding a mobile device. The method includes a step of providing a tool for multi-positioning and holding a mobile device of a user. In one embodiment, the tool includes a body support member configured for attachment to a body, a telescopic member movably attached to the body support member, a first pivoting mechanism attached to the telescopic member and a mobile device support member comprising a support element configured for supporting the mobile device of the user, the mobile device support member configured for movable attachment to the first pivoting mechanism, wherein a motion by the user is effective to adjust an attitude of the mobile device of the user with respect to the body support member, the attitude selected from the group consisting of a linear movement, a pitch, a roll and a yaw.

Another embodiment of the method is applying a force by a movement or gesture by a hand, a wrist, an arm, an elbow or a shoulder of a user to cause the movable device to flip about the first pivoting mechanism so as to cause the mobile device to face the body support member. In another embodiment, the method includes applying a force by a movement or gesture by a hand, a wrist, an arm, an elbow or a shoulder of a user to cause the movable device to roll about the first pivoting mechanism so as to cause the mobile device to effect a rolling motion with respect to the body support member. In another embodiment, the method includes applying a force by a movement or gesture by a hand, a wrist, an arm, an elbow or a shoulder of a user to cause the movable device the mobile device to yaw about the first pivoting mechanism so as to cause the mobile device to effect a yawing motion with respect to the body support member. In yet another embodiment, the method further includes applying a force by a movement or gesture by a hand, a wrist, an arm, an elbow or a shoulder of a user to cause the telescopic member to expand or contract under the influence of a force.

Another embodiment is a tool for multi-positioning and holding a mobile device. The tool includes a body support member configured for attachment to a body, a telescopic member movably attached to the body support member, a first means for pivoting attached to the telescopic member and a mobile device support member comprising a support element configured for supporting the mobile device of the user, the mobile device support member configured for movable attachment to the first means for pivoting, wherein a motion by the user is effective to adjust an attitude of the mobile device of the user with respect to the body support member, the attitude selected from the group consisting of a linear movement, a pitch, a roll and a yaw.

Different Ways the Device of this Disclosure May be Used:

The robotic arm or tool for multi-positioning and holding a device has many uses, as discussed here. These actions include a sliding action and a flipping action with its telescopic device. The device may also have a voice-activated sliding motion or may even be held or suspended by a magnetic field—in this embodiment, the device or phone would appear to float, with no rods for support. In one embodiment, there is a rod that acts as a handle, so that the device, such as a phone, may be held, tossed and caught.

In one application after a flipping action, the robotic arm disconnects from the device or phone and may be used to grab another object (like a pencil) while the user stays on the phone. The tool can be programmed as an individual accessory that may identify or be used to grab other objects. The may be used to hold different Objects in Space & Time. The disclosed device may grasp tools. Like a tape measure, pliers, etc. For example, the device may grasp a tool sleeve to hold tools of a wearer. As another example, a wearer may use the tool of this disclosure with voice activated assistance. The wearer may issue a voice command "Screwdriver" and the tool of this disclosure moves the screwdriver to the hand of the wearer. Alternatively, the wearer with screwdriver in hand may issue a voice command "Screwdriver Away" and the device of this disclosure pulls the screwdriver from his hand for placement back into the tool sleeve grasped by the tool of this disclosure. As another example, the tool of this disclosure with a Master double-ball-joint may allow for multiple arms to grasp different tools at the same time. In the illustrative example, the screwdriver is not disconnected or set down while another voice command activates another arm to grab another tool. The tool allows the wearer to track his tools so the wearer will not lose track of tools that are removed but not returned to the tool sleeve. In another example, the tool grasps for holding and or operating a flashlight, TV Remote, window cleaner bottle for cleaning, and so on.

In another use or application, the tool may be configured to support console video game controllers. It can be used to hold tools, game controllers, a favorite beer cozy, wallet, etc. In another use, a device grasped by the tool of this disclosure may be held to the tool by a chain support or alternatively, by a band or rope support. In one example, a model or device may have a little chain that keeps the phone from flying off. When the user wants to use that model, he or she either presses a button to release or gives a voice command to release and swing the phone into his or her hand. In another embodiment, a cloth sleeve holds the device with a rope. In this embodiment, the user uses the tool to hold a cloth sleeve as a lightweight holder. Alternatively, the cloth sleeve can have a simple cord attachment that lets the user easily undo a hook-and-loop fastener, e.g., VELCRO or other fastener to release the phone. In another embodiment, a simple hook or loop fastener stick-on is applied to a phone for attachment to a mating loop or hook sleeve for holding by the tool of this disclosure.

Illustrative Uses, Functions, and Relative Positions for the Tool of this Disclosure Include:

There are many uses for the tool for multi-positioning and holding a device, such as the uses listed here. This is not intended to be an exhaustive list.

1. Bike Riding—e.g., hands on bike handle and device, e.g., smartphone grasped by tool of this disclosure.

2. Video Recording Position—e.g., hands on video recording and device, e.g., smartphone grasped by tool of this disclosure.

3. Cooking—e.g., hands on cooking and device, e.g., smartphone grasped by tool of this disclosure.

4. Pushing a child on a swing set—e.g., hands on swing and device, e.g., smartphone grasped by tool of this disclosure 5. As you shoot a bow and arrow—e.g., hands on bow and arrow and device, e.g., smartphone grasped by tool of this disclosure.

6. Doctor doing surgery—e.g., hands on surgery and device, e.g., smartphone grasped by tool of this disclosure. The doctor can use the phone to zoom in on certain areas and take video or photos when needed of what he actually sees.

7. Playing a game of Chess—e.g., hands at rest or moving chess pieces and device, e.g., smartphone grasped by tool of this disclosure.

8. Fishing—e.g., hands on fishing pole and device, e.g., smartphone grasped by tool of this disclosure.

9. A mechanical technician who needs to use both hands while following instructions on a PDA or Mobile Device. (Electrician, Computer Tech, Construction.)—e.g., hands on object requiring hands and device, e.g., smartphone grasped by tool of this disclosure.

Lady walking her dog and still being able to use her phone—e.g., hands on holding dog and device, e.g., smartphone grasped by tool of this disclosure.

Couple sleeping in bed, holding hands, the man is wearing the tool of this disclosure and they are both interested in the display.

General Computer/Keyboard use in an office environment.—e.g., hands on computer and device, e.g., smartphone grasped by tool of this disclosure. The tool of this disclosure provides an extended desktop.

A man or woman walking and operating his or her device. Posture is improved because of greater freedom of movement while wearing a tool according to this disclosure. Since the device feels weightless, the user has no problem raising the device to eye-level.—e.g., hands on video recording and device, e.g., smartphone grasped by tool of this disclosure.

Jogger—a man or woman running with the tool of this disclosure attached to a leg. When it rings, the person stops jogging, lift the leg, and easily detach the mobile devices to check his or her calls or messages.

Jogger—a man and woman may mount the body support sleeve of this disclosure on his or her forearm. One of them has it put away while the other has it in a "Side Operating Mode," as if he or she were watching a video on full screen.

Man/Woman on treadmill with tool of this disclosure on bicep. The man or woman is talking on skype-video with a friend while jogging.

A surfer mounts a tool as described in this disclosure on an arm extended forward. The mobile electronic device records as the surfer hits the waves.

Skateboarder may use it to get interesting camera angles.

Teenagers may enjoy the "flipping action" during lunch at a public school or elsewhere.

Golfer recording his swings then reviewing them afterwards.

Basketball player recording his slam dunks.

Children or Teenagers holding their fingers like guns and shooting each other with their mobile devices, e.g., "Laser Tag with Phones."

A lady with a sleek model of the tool of this disclosure. She may use it to check her make-up. She is able to use both hands while her tool holds either a mirror or mobile device.

A man can use the tool of this disclosure to hold his razor while he holds a mirror with his hands. Working in sync with the stable arm holding the tool of this disclosure he is easily able to shave the back of his neck for a neat trim.

Teenager playing a video game, but actually talking to his Mom because he does not have to use his hands to hold his phone.

Man doing bench presses while watching a movie.

Man sitting back in recliner while device is grasped by tool of this disclosure is extended in front of his face while he enjoys the latest Netflix® episode.

People may miss calls on a cell phone when it's in their pocket but when not when the cell phone is mounted on an arm—they will now never miss an important call.

While doing first aid. While a normal civilian needs to call 9-1-1 and deliver first aid, he/she can use SKYPE to link with the medics and show them what his hands are doing as he helps deliver first aid to an injured person.

With this device, a person is able to talk with and be directed in any actions for training or anything with one's hands. The hands will be free to, for example: play the piano on SKYPE, while the teacher gets to see exactly what keys are being pressed with both hands. Gaps in communication, learning, and teaching may thus be minimized. Students and teachers could cooperate over great distances. Teachers could even watch recorded videos and critique them.

Tool of this disclosure can hold a paint brush allowing painters to create new work that they were unable to before.

Women can use the tool of this disclosure to help zip up their formal dress. They no longer need another person to do it for them.

Imagine holding a Tape Measurer. Your left hand is holding the 0" marker and your right hand is holding the Tape Measurer. Using the tool of this disclosure, a pipefitter or carpenter is able to hold the tape to the ground with both hands. He has a pencil attached to his third arm. He is able to mark his target easily using the tool of this disclosure.

Woman pulling an earbud out of a bag held by the tool of this disclosure for a more discreet call.

An Astronaut using a tool according to this disclosure to hold a special tool or camera so he or she can operate hands-free while NASA watches every move from the ground.

Person on beach using the tool of this disclosure to position the phone to block the direct sunlight.

Army veteran or ex-soldier or even a civilian with an amputated limb using the tool of this disclosure to actually be able to play games and/or easily operate a mobile device anywhere with only one hand, or even no hands. In another example, one could flip it out with the leg, then text or operate their phone with their toes.

The tool of this disclosure could be used by a person to hold a glass of iced tea while sitting in an arm chair.

The tool of this disclosure could shoot an object into the hand of a user on the push of a button. The entire support system may be used anywhere on the body where it may be strapped on. May be attached as a belt buckle or as another accessory or attachment point. Attachment to a hat or a belt buckle may be used, or it may even be attached to a shoe. The tool of this disclosure can attach to numerous places.

The body support member of this tool is illustratively for attachment to a person. In another embodiment, the body support member may be attached to a support, such as a bed post, so a person may manipulate the tool from that body, e.g., the bed post in this example. In another illustrative example, a person at the gym may not wish to wear the robotic arm, but the person can still strap it to his or her exercise equipment. One may not want to wear it in bed, but it can be strapped to the bed post. A driver in an 18-wheeler or other vehicle may prefer to strap the robotic arm to the vehicle, e.g., a sun visor or dashboard. The tool of this disclosure may be attached to any body member or any existing support structure.

Illustrative Fields of Use

There are many fields of use for the robotic arm or multipositioning and holding device according to this disclosure. At a minimum, the fields include:
1. Bicycle riding
2. Computer operation
3. Cooking
4. Surgery, e.g., holding phone, camera, or surgery tools. In one example, a doctor commands "Scalpel" and the tool of this disclosure provides the scalpel to the doctor.)
5. Recording (Frees up the hands)
6. Storage (for almost any object. Tools, Toothbrush, Cup, etc.)
7. Jogging
8. Walking
9. Sitting
10. Reclining
11. Driving (GPS Navigation)
12. Sleeping (Watching Movie)
13. Sleeping (Browsing)
14. Sleeping, e.g., Girl lying down talking to boyfriend on SKYPE.
15. Video Streaming from PC without PC Camera
16. Knife Holster
17. Gun Holster (Fast Action Gun Holster)
18. Backscratcher
19. Could be used to grab things out of reach.
20. Woman putting on Make-up. (Uses phone camera, as a third arm with two free hands to apply easily.)
21. TV Remote
22. Grasping anything to hold near a person's face, such as a cell phone.
23. Drinking
24. Better Posture during Phone use
25. Amputee using tool of this disclosure.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A tool for multi-positioning and holding a mobile device, the tool comprising:
   a body support member configured for attachment to a lower arm of a body of a person upstream of a hand of the person;
   an expandable member movably attached to the body support member, the expandable member configured to move solely in a direction parallel to a longitudinal axis of the body support member and also parallel to the lower arm of the body;
   a pivoting mechanism attached to a first end of the expandable member; and
   an extension member pivotably attached at a proximal end of the extension member to the pivoting mechanism, the extension member configured for supporting a mobile device including a display;
   wherein, in a first position the expandable member is retracted whereby the extension member is configured to position the mobile device against the body support member and the display of the mobile device is positioned to face the body support member;
   wherein, in a second position, the expandable member is expanded to linearly move the extension member and the mobile device away from the body support member.

2. The tool of claim 1 wherein the position of the mobile device away from the body support member is downstream of the hand.

3. The tool of claim 1 wherein, in a third position, the expandable member is configured to pivot under the action of the pivoting mechanism to position the mobile device and the display of the mobile phone from a downward to an upward position with respect to a plane of the body support member.

4. The tool of claim 3 wherein in going from the second position to the third position the expandable member pivots 180 degrees.

5. The tool of claim 1 wherein, in a fourth position, the expandable member is configured to pivot under the action of the pivoting mechanism to position the mobile device and the display of the mobile phone to face a palm of the hand of the person.

6. The tool of claim 1 wherein, in a fourth position, the expandable member is configured to pivot under the action of the pivoting mechanism to position the mobile device and the display of the mobile phone to be viewable by the person.

7. The tool of claim 1 further comprising a second pivoting mechanism attached to a second end of the expandable member.

8. The tool of claim 1 wherein, in a fifth position, the expandable member is configured to pivot under the action of the pivoting mechanism to position the mobile device and the display of the mobile phone to the left or right of the perpendicular of a plane of the body support member.

9. The tool of claim 2 wherein the positioning of the mobile device away from the body support member downstream of the hand is by a flip of the arm, the flip of the arm being in a longitudinal direction of the arm.

10. The tool of claim 3 wherein the pivoting of the expandable member to position the mobile device and the display of the mobile phone upward with respect to the plane of the body support member is by a flip of the arm, the flip of the arm being in a widthwise direction of the arm.

11. The tool of claim 4 wherein in going from the second position to the third position the expandable member pivots 180 degrees is by a flip of the arm, the flip of the arm being in a widthwise direction of the arm.

12. The tool of claim 4 wherein the going from the second position to the third position the expandable member pivots 180 degrees is by a flip of the arm, the flip of the arm being in a widthwise direction of the arm.

13. The tool of claim 6 wherein the pivoting of the expandable member to position the mobile device and the display of the mobile phone to be viewable by the person is by a flip of the arm, the flip of the arm being in a height-wise direction of the arm.

14. The tool of claim 7 wherein the pivoting of the expandable member to position the mobile device and the display of the mobile phone to the left or right of the perpendicular of a plane of the body support member, is by a flip of the arm, the flip of the arm being in a width-wise direction of the arm.

15. The tool of claim 1 wherein the support of a mobile device including a display to the extension member may be selected from the group consisting of an adhesive, a magnet, a suction cup, a male female coupling button mechanism, and a casing for the mobile device.

16. The tool of claim 1 wherein the mobile device for which the extension member is configured to be attached to is selected from the group consisting of an RFID reader and a bar code reader.

17. The tool of claim 1 wherein the mobile device for which the extension member is configured to be attached to is selected from the group consisting of a smart phone, an MP3 player, an electronic reader, a tablet computer, an iPad, and an iTablet.

18. The tool of claim 1 wherein the tool further comprises an actuator adapted to at least one of the expander member or the pivoting mechanism for actuating a motion.

19. The tool of claim 18 wherein actuation of motion is by voice command.

20. A tool for multi-positioning and holding a mobile device, the tool comprising:
- a body support member configured for attachment to a body;
- an expandable member movably attached to the body support member, the expandable member configured to move solely in a direction parallel to the body support member and also parallel to a lower arm of the body;
- a pivoting mechanism attached to a first end of the expandable member; and
- an extension member pivotably attached at a proximal end of the expandable member to the pivoting mechanism, the extension member configured for supporting a mobile device including a display;
- wherein, in a first position the expandable member is retracted whereby the extension member is configured to position the mobile device against the body support member, the display of the mobile device facing the body support member.

21. The tool of claim 20 wherein, in a second position, the expandable member is expanded whereby the extension member is configured to position the mobile device away from the body support member.

22. The tool of claim 21 wherein, in a third position, the expandable member is configured to pivot under the action of the pivoting mechanism to position the mobile device and the display of the mobile phone from a downward to an upward position with respect to the plane of the body support member.

23. The tool of claim 20 wherein, in a fourth position, the expandable member is configured to pivot under the action of the pivoting mechanism to position the mobile device and the display of the mobile phone to face a palm of the hand.

24. The tool of claim 20 further comprising a second pivoting mechanism attached to a second end of the expandable member, wherein, in a fifth position, the expandable member is configured to pivot under the action of the pivoting mechanism to position the mobile device and the display of the mobile phone to the left or right of the perpendicular of a plane of the body support member.

* * * * *